United States Patent [19]

Shinoda et al.

[11] 4,103,307
[45] Jul. 25, 1978

[54] EXPOSURE CONTROL DEVICE

[75] Inventors: Nobuhiko Shinoda, Tokyo; Tadashi Ito, Yokohama; Soichi Nakamoto, Machida; Fumio Ito, Yokohama, all of Japan

[73] Assignee: Canon Kabushiki Kaisha, Tokyo, Japan

[21] Appl. No.: 799,568

[22] Filed: May 23, 1977

Related U.S. Application Data

[63] Continuation of Ser. No. 611,806, Sep. 9, 1975, which is a continuation of Ser. No. 488,849, Jul. 15, 1974.

[30] Foreign Application Priority Data

Jul. 16, 1973 [JP] Japan .................................. 48-80087
Aug. 27, 1973 [JP] Japan .................................. 48-95916
Aug. 28, 1973 [JP] Japan .................................. 48-96502

[51] Int. Cl.$^2$ ............................................. G03B 7/08
[52] U.S. Cl. ................................. 354/23 D; 354/50; 354/60 R; 354/60 A; 364/525
[58] Field of Search ............ 354/23 D, 50, 5 Y, 60 R, 354/60 A; 235/151

[56] References Cited

U.S. PATENT DOCUMENTS 3,842,587 10/1974 Strauss et al. ...................... 354/23 D
3,928,858 12/1975 Sakurada et al. .................. 354/23 D Primary Examiner—Russell E. Adams
Attorney, Agent, or Firm—Toren, McGeady and Stanger

[57] ABSTRACT

An automatic exposure control device to convert the analogue value of an object to be photographed, to digital value for controlling appropriate exposure value using said digital value. The device has a photo-sensing means to sense the light from the object digitally, a photographing information setting means to digitally set various photographing information such as film sensitivity, diaphragm aperture value, shutter speed, etc., a calculating means to digitally calculate diaphragm aperture value, shutter speed value means corresponding to the output of the above mentioned photo-sensing means and the photographing information setting means, a function detecting and setting means to detect and set each functional state, and a sequence control means having an instructional function for various calculating operations to control sequence-wise the computation operation of the above mentioned computation device, corresponding to the output of said function detecting and setting means, wherein the sequence control means determines the photographing mode corresponding to the output of the above mentioned function detecting and setting means. At the same time, appropriate exposure value is calculated by the calculating means in accordance with the content of the above mentioned photographing means and the output of the photo-sensing means is converted to digital value.

97 Claims, 56 Drawing Figures

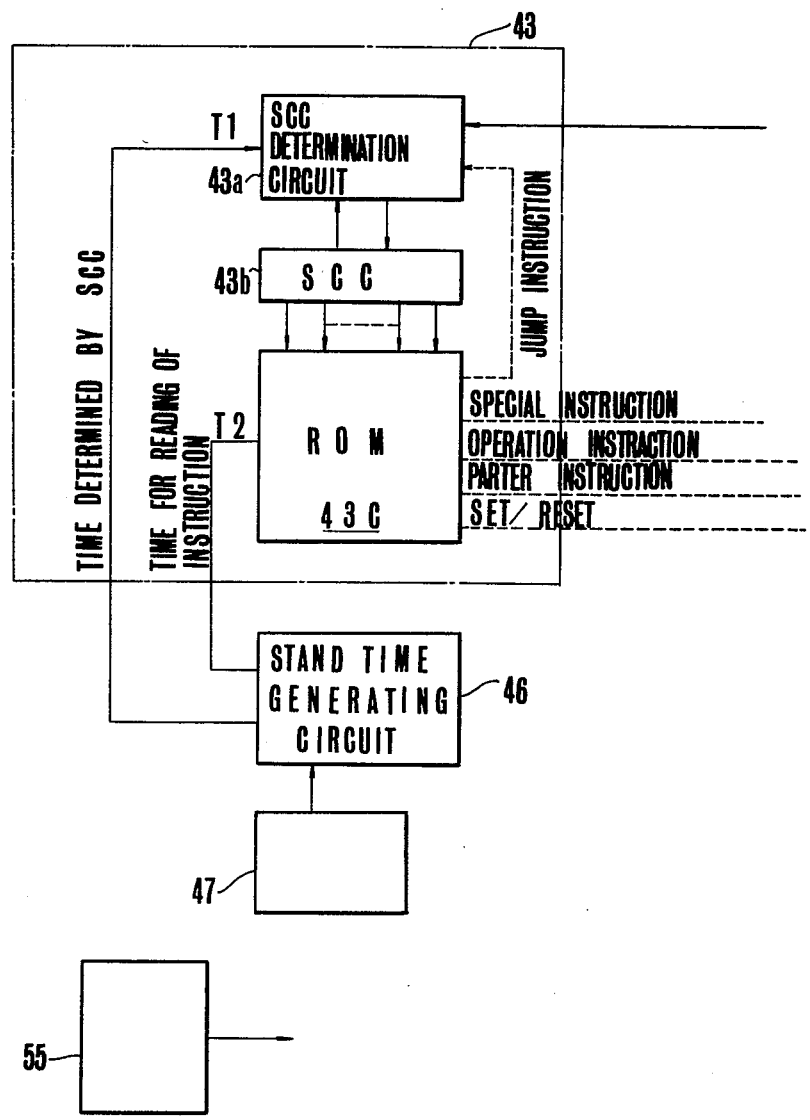

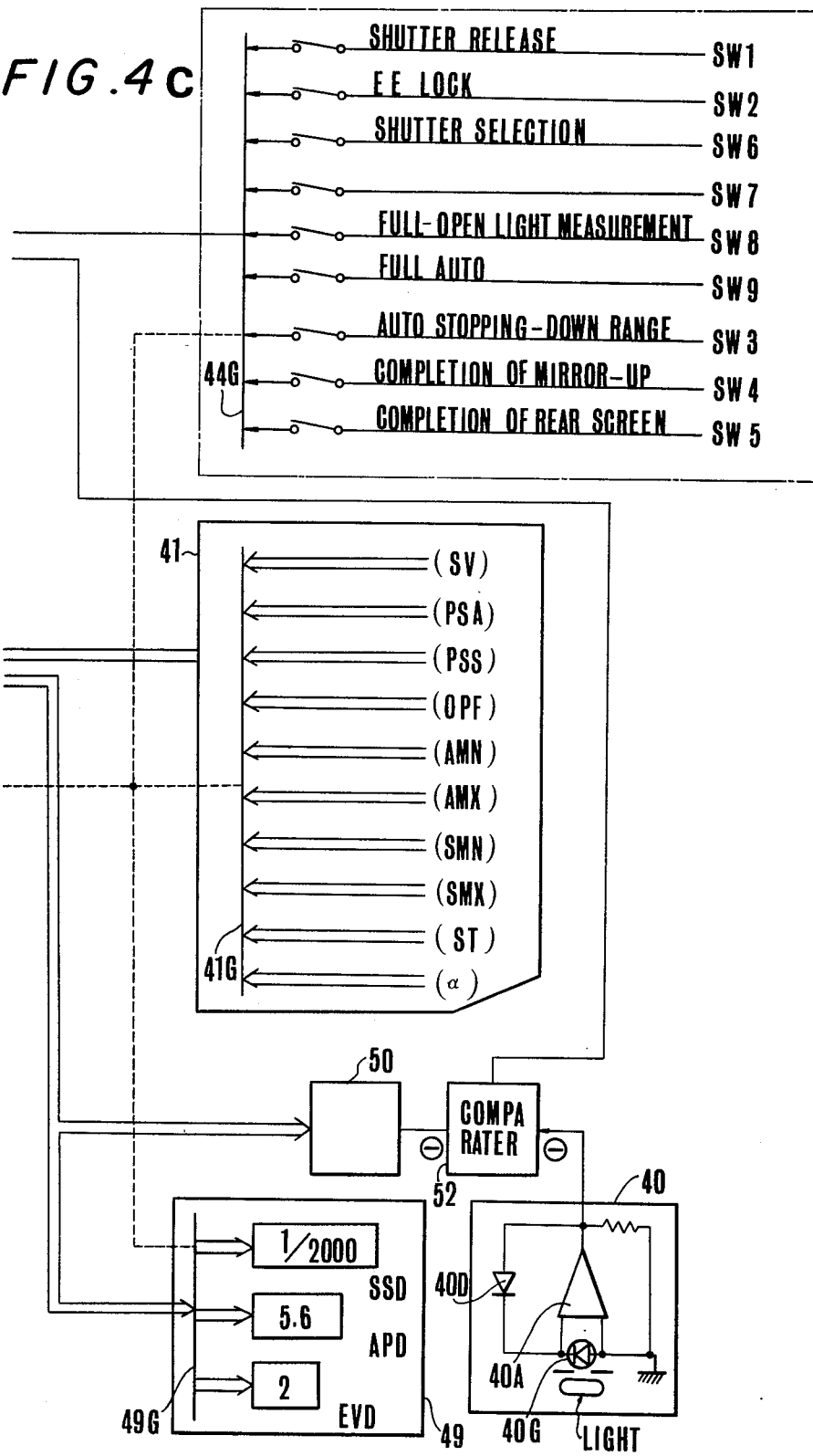

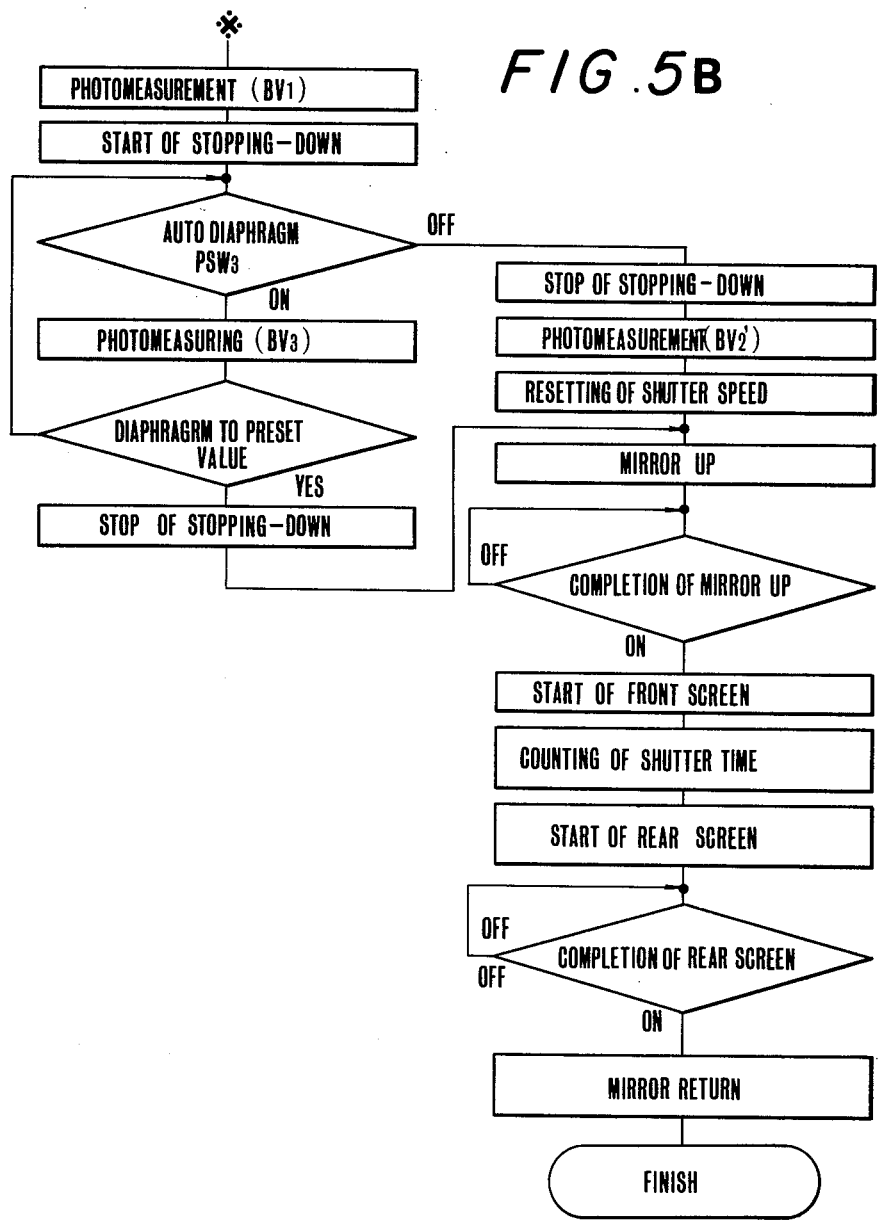

FIG.11-1

| OCTONAL NUMERICAL VALUE CODE | | | OBJECT BRIGHTNESS SENSITIVITY | ASA FILM SENSITIVITY | | TV, TMN, TMX SHUTTER SPEED | | | APV, OPF, AMN, AMX SELF DIAPHRAGM VALUE SELF TIME | | | PRCN PROGRAM CONSTANT | | MAP NUMBER OF STEPS OF DIAPHRAGM CONTROL | |
|---|---|---|---|---|---|---|---|---|---|---|---|---|---|---|---|
| 8 | 1 | 1/8 | APEX $B_v$ | APEX $S_v$ | ASA SENSITIVITY | APEX $S_v$ | TIME | APEX $T_v$ | F NUMBER | APEX $A_v$, $A_{vo}$ | TIME | $\frac{8\alpha}{1+\alpha}$ | | NUMBER OF STEPS | |
| 0 | 0 | 0 | −15 | | 0.4 | −3 | 256 | −8 | 1.0 | 0 | 0 | 0 | | 0 | |
| 0 | 0 | 1 | | | | | | | | | | | | | |
| 0 | 0 | 2 | | | | | | | | | | | | | |
| 0 | 0 | 3 | | | | | | | | | | | | | |
| 0 | 0 | 4 | | | | | | | | | | | | | |
| 0 | 0 | 5 | | | | | | | | | | | | | |
| 0 | 0 | 6 | | | | | | | | | | | | | |
| 0 | 0 | 7 | | | | | | | | | | | | | |
| 0 | 1 | 0 | −14 | | 0.8 | −2 | 128 | −7 | 1.4 | 1 | 1 | 1 | | 1 | |
| 0 | 2 | 0 | −13 | | 1.5 | −1 | 64 | −6 | 2 | 2 | 2 | 2 | | 2 | |
| 0 | 3 | 0 | −12 | | 3 | 0 | 32 | −5 | 2.8 | 3 | 3 | 3 | | 3 | |
| 0 | 4 | 0 | −11 | | 6 | 1 | 16 | −4 | 4 | 4 | 4 | 4 | | 4 | |
| 0 | 5 | 0 | −10 | | 12 | 2 | 8 | −3 | 5.6 | 5 | 5 | 5 | | 5 | |
| 0 | 6 | 0 | −9 | | 25 | 3 | 4 | −2 | 8 | 6 | 6 | 6 | | 6 | |
| 0 | 7 | 0 | −8 | | 50 | 4 | 2 | −1 | 11 | 7 | 7 | 7 | | 7 | |
| 1 | 0 | 0 | −7 | | 100 | 5 | 1 | 0 | 16 | 8 | 8 | | | 8 | |
| 1 | 1 | 0 | −6 | | 200 | 6 | 1/2 | 1 | 22 | 9 | 9 | | | 9 | |
| 1 | 2 | 0 | −5 | | 400 | 7 | 4 | 2 | 32 | 10 | 10 | | | 10 | |

| | | | | | | | |
|---|---|---|---|---|---|---|---|
| -4 | 0 | 3 | 1 | 800 | 8 | 8 | |
| -3 | 0 | 4 | 1 | 1600 | 9 | 16 | 3 |
| -2 | 0 | 5 | 1 | 3200 | 10 | 32 | 4 |
| -1 | 0 | 6 | 1 | 6400 | 11 | 64 | 5 |
| 0 | 0 | 7 | 1 | 12800 | 12 | 128 | 6 |
| 1 | 0 | 0 | 2 | | | 256 | 7 |
| 2 | 0 | 1 | 2 | | | 512 | 8 |
| 3 | 0 | 2 | 2 | | | 1024 | 9 |
| 4 | 0 | 3 | 2 | | | 2048 | 10 |
| 5 | 0 | 4 | 2 | | | 4096 | 11 |
| 6 | 0 | 5 | 2 | | | | 12 |
| 7 | 0 | 6 | 2 | | | | |
| 8 | 0 | 7 | 2 | | | | |
| 9 | 0 | 0 | 3 | | | | |
| 10 | 0 | 1 | 3 | | | | |
| 11 | 0 | 2 | 3 | | | | |
| 12 | 0 | 3 | 3 | | | | |
| 13 | 0 | 4 | 3 | | | | |
| 14 | 0 | 5 | 3 | | | | |
| 15 | 0 | 6 | 3 | | | | |
| 16 | 0 | 7 | 3 | | | | |

| | | | |
|---|---|---|---|
| 45 | 11 | | 11 |
| 64 | 12 | 2 | 12 |
| | | 4 | |
| | | 8 | |
| | | 16 | |
| | | 32 | |

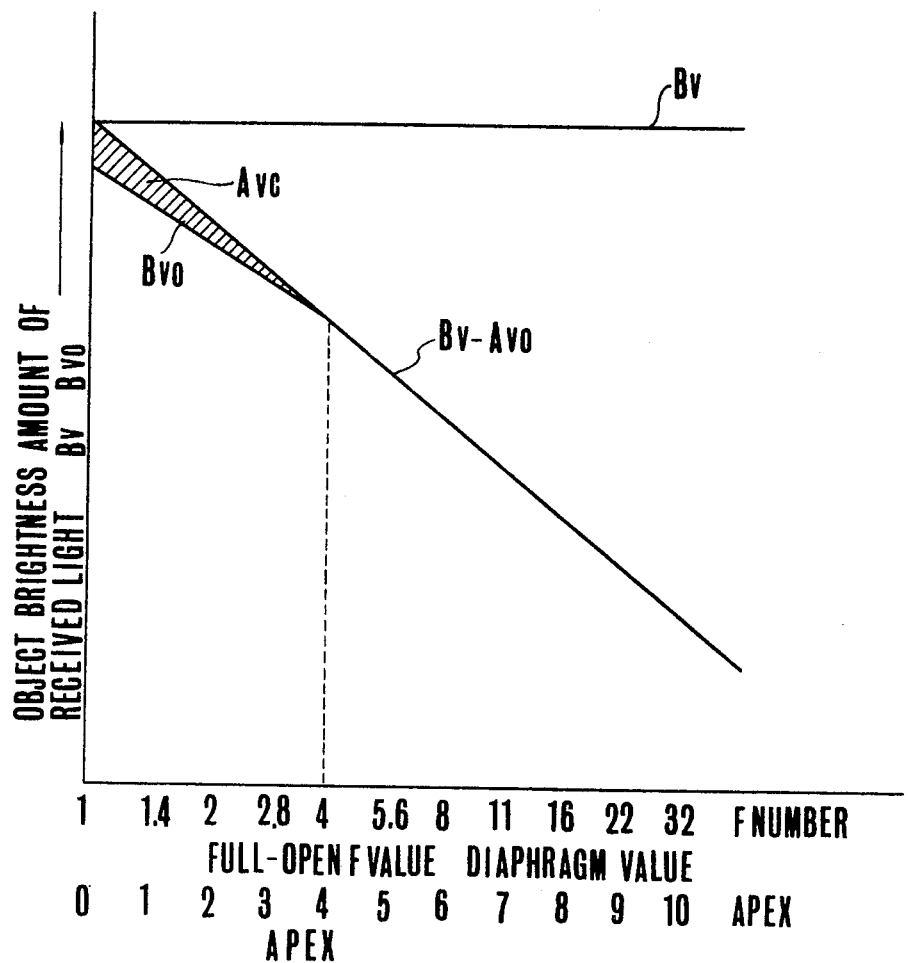

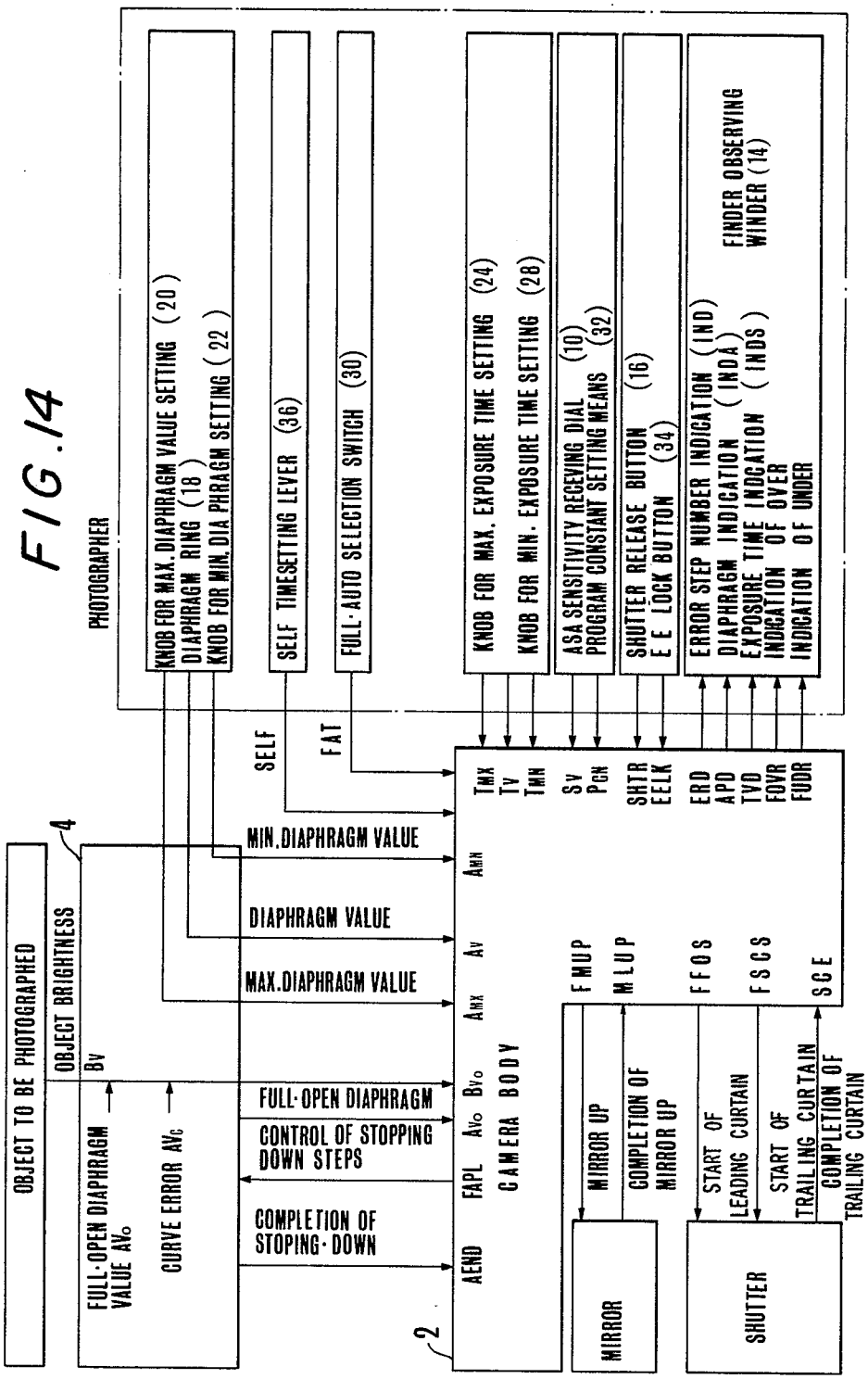

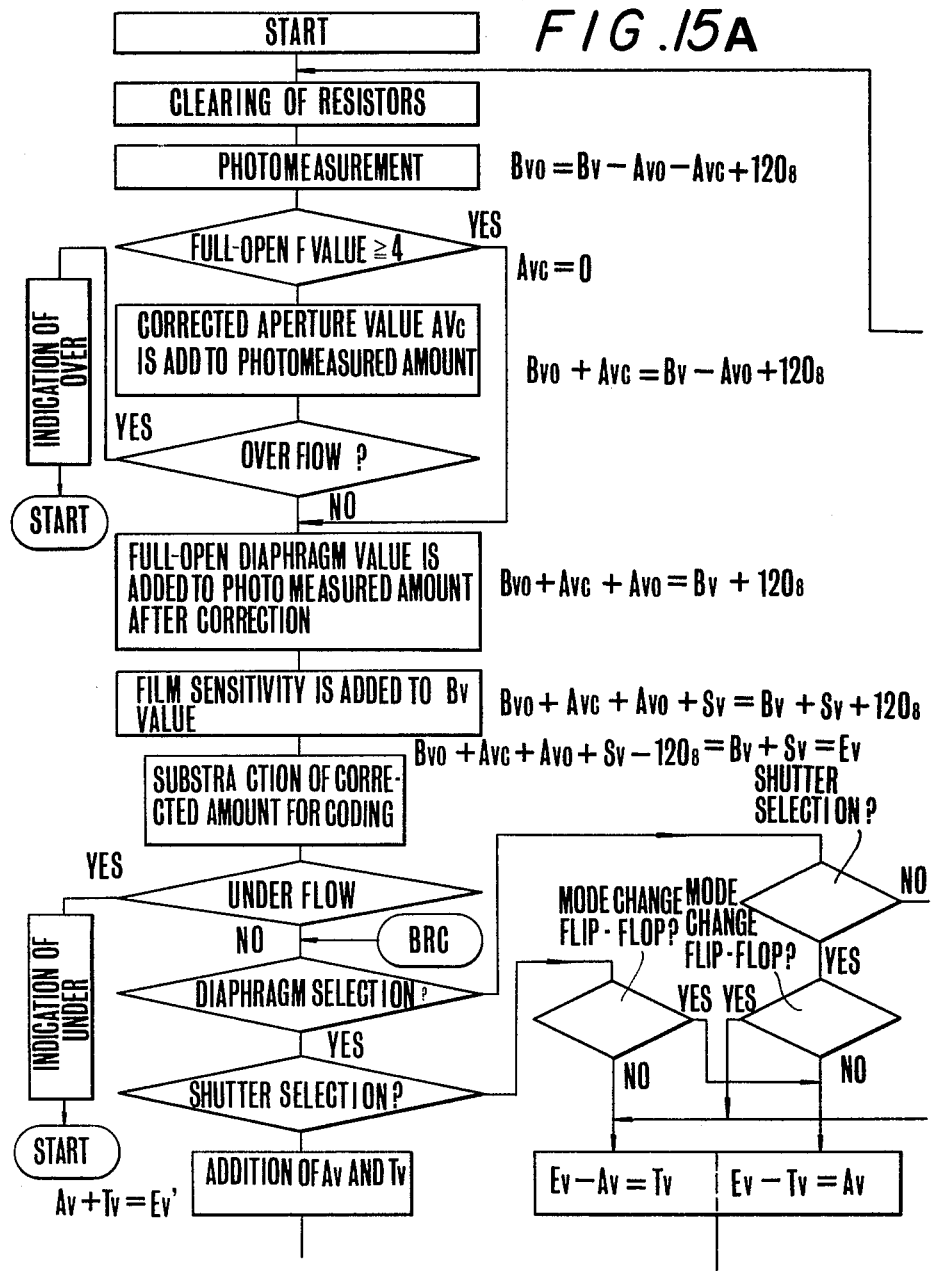

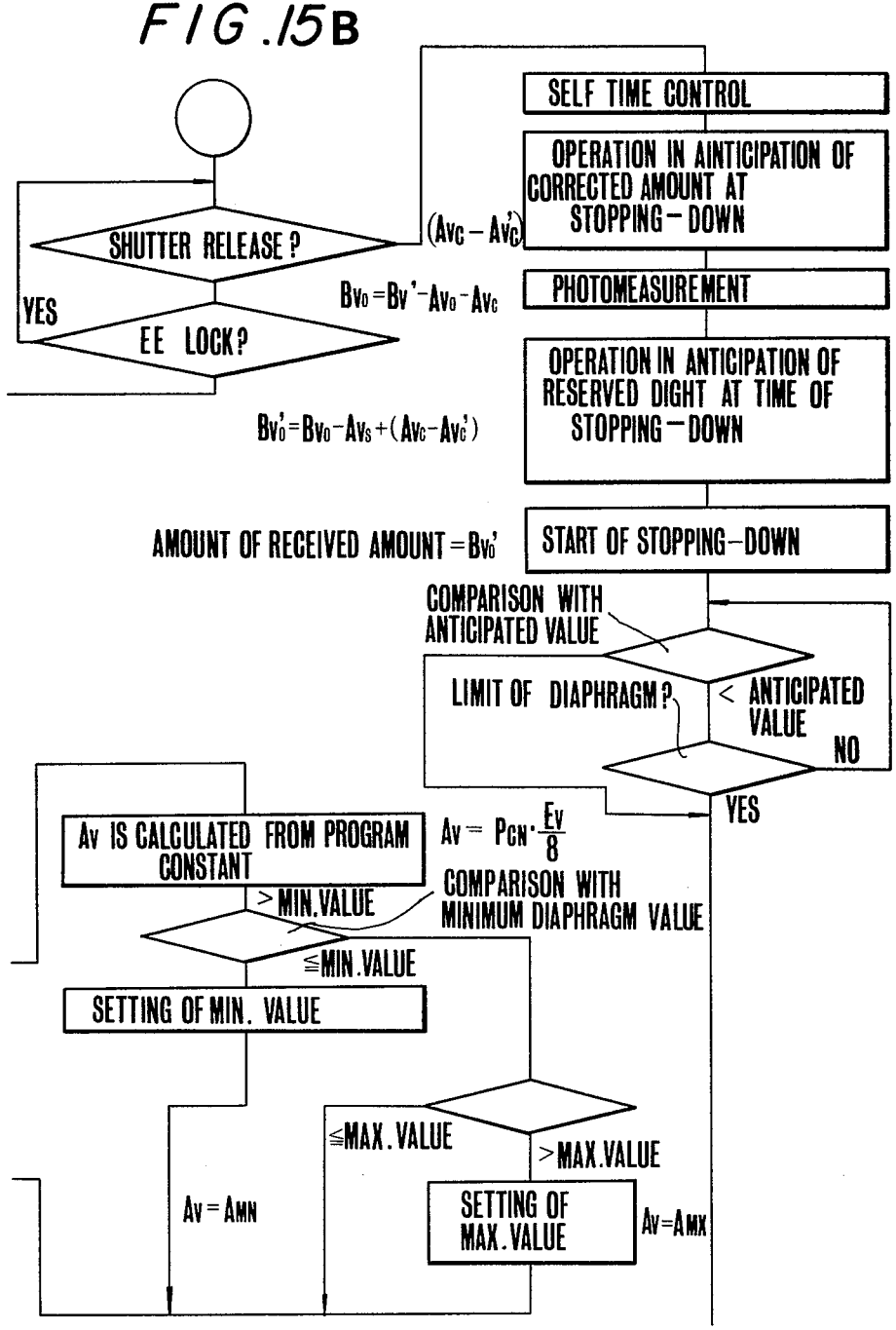

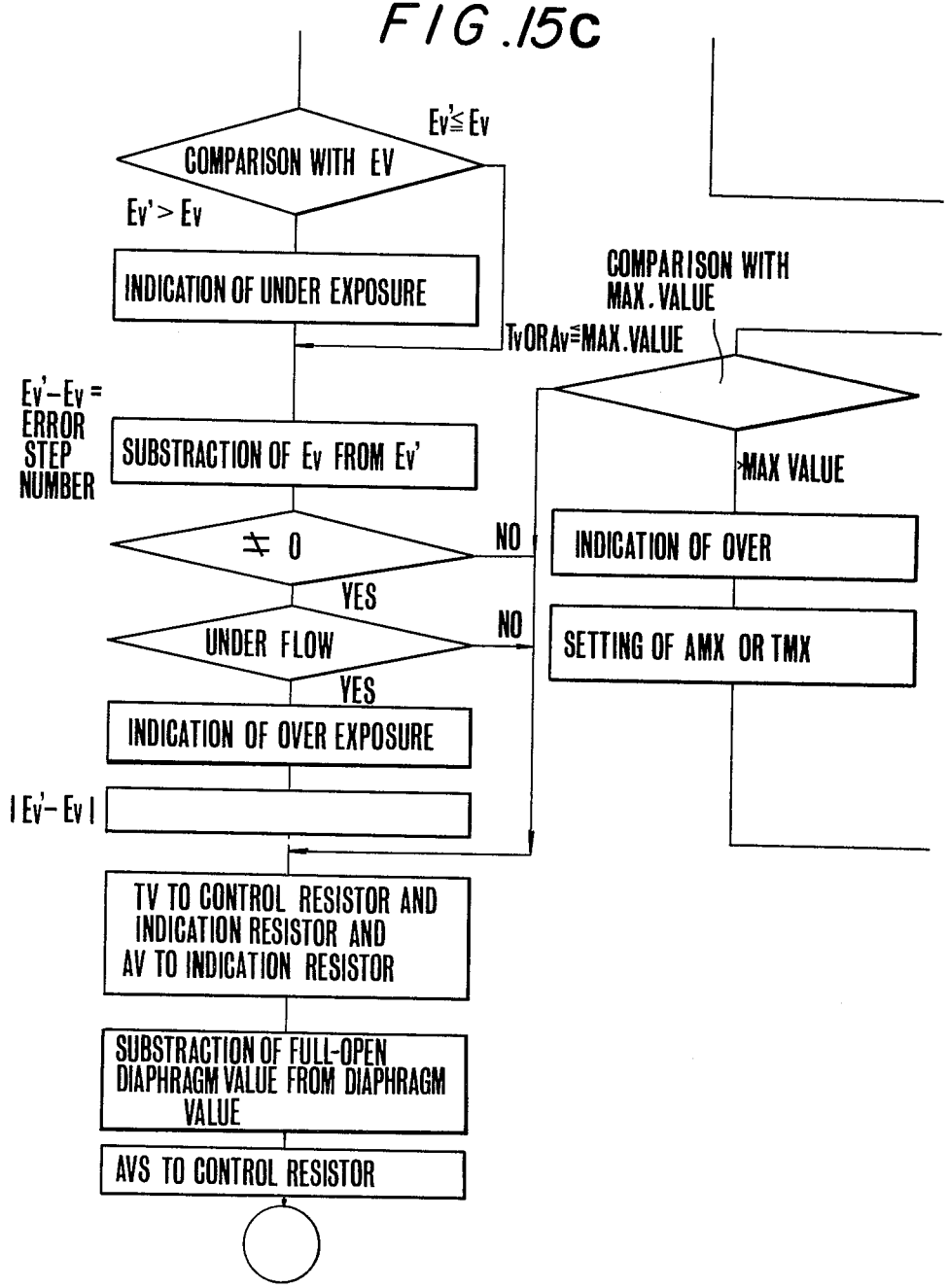

FIG.16-1

| PART I REGISTER CODE | | | | PART II NUMERICAL CODE | | | PART III MEANINGS | | OPERAND 1 | OPERAND II |
|---|---|---|---|---|---|---|---|---|---|---|
| OP I | OP II | OPE-RAND I | OPE-RAND II | OP I OP II | OPE-RAND I | OPE-RAND II | OP I | OP II | | |
| ZYX 9 | 8 7 | 6 5 4 | 3 2 1 | | | | | | | |
| 0 0 0 0 | | | 0 0 0 | 0 | 0 | 0 | RSF OPERAND SHIFTED TO RIGHT | OPERATION ETC. IN RESISTOR | INSIDE REGISTER | AR |
| 0 0 0 1 | | | 0 0 1 | 1 | | 1 | LSF OPERAND SHIFTED TO LEFT | | | BR |
| 0 0 1 0 | | | 0 1 0 | 2 | | 2 | ICR OPERAND +1 | | | CR |
| 0 0 1 1 | | | 0 1 1 | 3 | | 3 | DCR OPERAND −1 | | | DR |
| 0 1 0 0 | | | 1 0 0 | 4 | | 4 | CMP COMPLEMENT OF OPERAND | | | ER |
| 0 1 0 1 | | | 1 0 1 | | | 5 | | | | FR |
| 0 1 1 1 | | | 1 1 1 | 7 | | 7 | RTN SUB-ROUTINE RETARN | | | GR |
| 0 0 0 0 | 0 1 | 0 0 0 | 0 0 0 | 0 | 0 | 0 | LD OPERAND → AR | DATA OPERATION TREATMENT BETWEEN A RESISTOR AND OPERAND | INSIDE REGISTER | AR |
| | | | 0 0 1 | | | 1 | | | | BR |
| | | | 0 1 0 | | | 2 | | | | CR |
| | | | 0 1 1 | | | 3 | | | | DR |
| | | | 1 0 0 | | | 4 | | | | ER |
| | | | 1 0 1 | | | 5 | | | | FR |
| | | | 1 1 1 | | | 7 | | | | GR |
| 0 0 0 1 | | 0 0 0 | 0 0 0 | 1 | 0 | 0 | STR AR → OPERAND | | MEMORY REGISTER | MAP |
| | | | 0 0 1 | | | 1 | | | | MTV |
| | | | 0 1 0 | | | 2 | | | | APD |
| | | | 0 1 1 | | | 3 | | | INDICATION REGISTER | TVD |
| | | | 1 0 0 | | | 4 | | | | ERD |
| 0 0 1 0 | | 0 0 1 | 0 0 0 | 2 | 1 | 0 | SWP AR → OPERAND | | OUTSIDE INPUT DATA (I) | APV |
| | | | 0 0 1 | | | 1 | | | | AMN |
| | | | 0 1 0 | | | 2 | | | | AMX |
| | | | 0 1 1 | | | 3 | | | | OPF |
| 0 0 1 1 | | 0 1 0 | 0 0 0 | 3 | 2 | 0 | ADD AR + OPERAND → AR | | OUTSIDE INPUT DATA (II) | PRCN |
| | | | 0 0 1 | | | 1 | | | | TV |
| | | | 0 1 0 | | | 2 | | | | TMN |
| 0 1 0 0 | | 0 1 1 | 0 0 0 | 4 | 3 | 0 | SUB AR − OPERAND → AR | | | TMX |
| | | | 0 0 1 | | | 1 | | | | ASA |
| | | | 0 1 0 | | | 2 | | | | SELF |
| 0 1 0 1 | | 1 0 0 | 0 0 0 | 5 | 4 | 0 | GT IF AR > OPERAND FC=1 | | | |
| | | | 0 0 1 | | | 1 | | | | |
| 0 1 1 0 | | | 0 1 0 | 6 | | 2 | SRG IF OPERAND ≠ 0 FC = 1 | | | |
| | | | 0 1 1 | | | 3 | | | | |
| | | | 1 0 0 | | | 4 | | | | |

| REGISTER CODE | NUMERICAL CODE | | | KIND OF INSTRUCTIONS | MEANINGS |
|---|---|---|---|---|---|
| 0000 | 000 000 | 0 | 0 | RST | RESET |
| | | | 1 | | |
| 0001 | 001 001 | 1 | 0 | SET | SET |
| | 010 | | 1 | | |
| | 011 | 2 | 2 | SWT | 0 WHEN OPERAND = 1 |
| | | | 3 | | 1 WHEN OPFRAND = 0 |
| 0010 | 000 001 | 2 | 0 | SFG | SENSE FLAG |
| | | | 1 | | |
| 0011 | 010 011 | 3 | 0 | SUTM | 1 STANDS FOR THE LOWEST UNIT OF TMR |
| | | | 1 | | |
| 0100 | | 4 | | LSTM | TMR SHIFTED TO LEFT |
| | | | 3 | | |
| 0101 | 100 100 | | 4 | DCTM | TMR − 1 |
| | 101 | | 5 | | |
| 0110 | 110 | | 6 | SZTM | IF TMR = 0     FC = 1 |
| 0111 | 111 000 | 5 | 7 | | |
| | | | 0 | LDI | READ IN DATA TO AR |
| 1000 | 000 000 | 0 | 0 | ADI | ADD DATA TO AR |
| 1001 | | 9 | | SUBI | SUBSTRACT DADA FROM AR |
| 1010 | | A | | GTI | COMPARE DATA WITH AR |
| 1011 | | B | 3 | BU | JUMP IN ALL CASES |
| 1100 | | C | | BCF | JUMP IF FC = 0 |
| 1101 | | D | 7 | BCT | JUMP IF FC = 1 |
| 1110 | | E | | BL | SUB-ROUTINE JUMP |
| 1111 | 111 111 | F | | | |
| ZYX9 | 87 654 321 | | | | |
| KIND OF INSTRUCTIONS | NUMERICAL DATA OR ADDRESS | NUMERICAL DATA OR ADDRESS | NUMERICAL DATA OR ADDRESS | KIND OF INSTRUCTIONS | MEANINGS |

CONTROL OF FLIP-FLOP ETC.

| | INSIDE FLAG | CA |
|---|---|---|
| | | FMDC |
| | FLIP-FLOP FOR PLUNGER | FAPL |
| | | FMUP |
| | | FFCS |
| | FLIP-FLOP FOR INDICATION | FSCS |
| | | FOVR |
| | | HUDR |
| | SELECT GATE | COMP |
| | | CTP |
| | SWITCH (I) | ASLC |
| | | SSLC |
| | | FAT |
| | | EELK |
| | | SHTR |
| | | AEND |
| | | MLUP |
| | SWITCH (II) | SCE |

| No. | ADDRESS | INSTRUCTION CODE | INSTRUCTION | OPERAND | BRANCH | JUMP DESTINATION |
|---|---|---|---|---|---|---|
| 1 | 000 | 8000 | LDI000 | | START | |
| 2 | 001 | 1201 | STR | BR | | |
| 3 | 002 | 1202 | STR | CR | | |
| 4 | 003 | 1203 | STR | DR | | |
| 5 | 004 | 1204 | STR | ER | | |
| 6 | 005 | 1205 | STR | FR | | |
| 7 | 006 | 1206 | STR | GR | | |
| 8 | 007 | F022 | BL | | | MLV |
| 9 | 010 | 0233 | LD | OPF | | |
| 10 | 011 | B037 | GTI037 | | CROPF | |
| 11 | 012 | E057 | BCT | | | EVRTN |
| 12 | 013 | 2201 | SWP | BR | | |
| 13 | 014 | 9001 | ADI001 | | | |
| 14 | 015 | 3300 | SFG | CA | | |
| 15 | 016 | E055 | BCT | | | |
| 16 | 017 | 2201 | SWP | BR | | OVFLW |
| 17 | 020 | 9004 | ADI004 | | | |
| 18 | 021 | C011 | BU | | | CROPF |
| 19 | 022 | 8200 | LDI200 | | MLV | |
| 20 | 023 | 1201 | STR | BR | | |
| 21 | 024 | 3330 | SFG | COMP | MLV1 | |
| 22 | 025 | E027 | BCT | | | MLV2 |
| 23 | 026 | 4201 | SUB | BR | | |
| 24 | 027 | 2201 | SWP | BR | MLV2 | |
| 25 | 030 | 0100 | RSF | AR | | |
| 26 | 031 | 6200 | SRG | AR | | |
| 27 | 032 | D036 | BCF | | | RETN |
| 28 | 033 | 2201 | SWP | BR | | |
| 29 | 034 | 3201 | ADD | BR | | |
| 30 | 035 | C024 | BU | | | MLV1 |
| 31 | 036 | 7100 | RTN | | RETN | |
| 32 | 037 | 4300 | SUTM | | ST. TM | |

| | | | | | | |
|---|---|---|---|---|---|---|
| 33 | 040 | 3300 | SFG | CA | STI | |
| 34 | 041 | B036 | BCT | | | RETN |
| 35 | 042 | A010 | SBI010 | | | |
| 36 | 043 | 5300 | LSTM | | | |
| 37 | 044 | C040 | BU | | | ST1 |
| 38 | 045 | 7300 | SZTM | | EX. TM | |
| 39 | 046 | E036 | BCT | | | RETN |
| 40 | 047 | 3331 | SFG | CTP | EX1 | |
| 41 | 050 | D047 | BCF | | | EX1 |
| 42 | 051 | 6300 | DCTM | | | |
| 43 | 052 | 3331 | SFG | CTP | EX2 | |
| 44 | 053 | E052 | BCT | | | EX2 |
| 45 | 054 | C045 | BU | | | EX. TM |
| 46 | 055 | 1320 | SET | FOVR | OVFLW | |
| 47 | 056 | C000 | BU | | | SRT |
| 48 | 057 | 0201 | LD | BR | EVRTN | |
| 49 | 060 | 3233 | ADD | OPF | | |
| 50 | 061 | 3243 | ADD | ASA | | |
| 51 | 062 | 0300 | RST | CA | | |
| 52 | 063 | A120 | SBI120 | | | |
| 53 | 064 | 3300 | SFG | CA | | |
| 54 | 065 | D070 | BCF | | | CAL |
| 55 | 066 | 1321 | SET | FUDR | | |
| 56 | 067 | C000 | BU | | | SRT |
| 57 | 070 | 0320 | RST | FOVR | CAL | |
| 58 | 071 | 0321 | RST | FUDR | | |
| 59 | 072 | 1202 | STR | CR | | |
| 60 | 073 | 3340 | SFG | ASLC | BRC | |
| 61 | 074 | D122 | BCF | | | BRC1 |
| 62 | 075 | 3341 | SFG | SSLC | | |
| 63 | 076 | D134 | BCF | | | BRC2 |
| 64 | 077 | 0230 | LD | APV | | |
| 65 | 100 | 1203 | STR | DR | | |
| 66 | 101 | 3240 | ADD | TV | | |

| | | | | | | |
|---|---|---|---|---|---|---|
| 67 | 102 | 5202 | GT | CR | | |
| 68 | 103 | D105 | BCF | | | FAP |
| 69 | 104 | 1321 | SET | FUDR | | |
| 70 | 105 | 4202 | SUB | CR | FAP | |
| 71 | 106 | 6200 | SRG | AR | | |
| 72 | 107 | D117 | BCF | | | FAP1 |
| 73 | 110 | 3300 | SFG | CA | | |
| 74 | 111 | D114 | BCF | | | FAP2 |
| 75 | 112 | 1320 | SET | FOVR | | |
| 76 | 113 | 4100 | CMP | AR | | |
| 77 | 114 | 1222 | STR | ERD | FAP2 | |
| 78 | 115 | 0240 | LD | TV | | |
| 79 | 116 | C173 | BU | | | DISP |
| 80 | 117 | 0320 | RST | FOVR | FAP1 | |
| 81 | 120 | 0321 | RST | FUDR | | |
| 82 | 121 | C114 | BU | | | FAP2 |
| 83 | 122 | 3341 | SFG | SSLC | BRC1 | |
| 84 | 123 | D220 | BCF | | | PRG |
| 85 | 124 | 3301 | SFG | FMDC | | |
| 86 | 125 | E137 | BCT | | | AP1 |
| 87 | 126 | 0240 | LD | TV | | |
| 88 | 127 | 1203 | STR | DR | SS1 | |
| 89 | 130 | 0231 | LD | AMN | | |
| 90 | 131 | 1204 | STR | ER | | |
| 91 | 132 | 0232 | LD | AMX | | |
| 92 | 133 | C143 | BU | | | CAL1 |
| 93 | 134 | 3301 | SFG | FMDC | BRC2 | |
| 94 | 135 | E127 | BCT | | | SS1 |
| 95 | 136 | 0230 | LD | APV | | |
| 96 | 137 | 1203 | STR | DR | AP1 | |
| 97 | 140 | 0241 | LD | TMN | | |
| 98 | 141 | 1204 | STR | ER | | |
| 99 | 142 | 0242 | LD | TMX | | |

| | | | | | | |
|---|---|---|---|---|---|---|
| 100 | 143 | 1205 | STR | FR | CAL1 | |
| 101 | 144 | 0202 | LD | CR | | |
| 102 | 145 | 4203 | SUB | DR | | |
| 103 | 146 | 3300 | SFG | CA | | |
| 104 | 147 | E152 | BCT | | | CAL2 |
| 105 | 150 | 5204 | GT | ER | | |
| 106 | 151 | E162 | BCT | | | CAL3 |
| 107 | 152 | 1321 | SET | FUDR | CAL2 | |
| 108 | 153 | 0204 | LD | ER | | |
| 109 | 154 | 3343 | SFG | FAT | CAL5 | |
| 110 | 155 | D000 | BCF | | | SRT |
| 111 | 156 | 2301 | SWT | FMDC | | |
| 112 | 157 | 3301 | SFG | FMDC | | |
| 113 | 160 | D000 | BCF | | | SRT |
| 114 | 161 | C073 | BU | | | BRC |
| 115 | 162 | 5205 | GT | FR | CAL3 | |
| 116 | 163 | D167 | BCF | | | CAL4 |
| 117 | 164 | 1320 | SET | FOVR | | |
| 118 | 165 | 0205 | LD | FR | | |
| 119 | 166 | C154 | BU | | | CAL5 |
| 120 | 167 | 3301 | SFG | FMDC | CAL4 | |
| 121 | 170 | E173 | BCT | | | DISP |
| 122 | 171 | 0320 | RST | FOVR | | |
| 123 | 172 | 0321 | RST | FUDR | | |
| 124 | 173 | 3341 | SFG | SSLC | DISP | |
| 125 | 174 | D215 | BCF | | | DISP1 |
| 126 | 175 | 3301 | SFG | FMDC | | |
| 127 | 176 | E202 | BCT | | | DISP3 |
| 128 | 177 | 3340 | SFG | ASLC | | |
| 129 | 200 | E202 | BCT | | | DISP3 |
| 130 | 201 | 2203 | SWP | DR | DISP2 | |
| 131 | 202 | 1211 | STR | MTV | DISP3 | |
| 132 | 203 | 1221 | STR | TVD | | |

| | | | | | | |
|---|---|---|---|---|---|---|
| 133 | 204 | 0203 | LD | DR | | |
| 134 | 205 | 1220 | STR | APD | | |
| 135 | 206 | 4233 | SUB | OPF | | |
| 136 | 207 | 1210 | STR | MAP | | |
| 137 | 210 | 3345 | SFG | SHTR | CNTR | |
| 138 | 211 | E245 | BCT | | | SELF |
| 139 | 212 | 3344 | SFG | EELK | | |
| 140 | 213 | E210 | ECT | | | CNIR |
| 141 | 214 | C000 | BU | | | START |
| 142 | 215 | 3301 | SFG | FMDC | DISP1 | |
| 143 | 216 | D202 | BCF | | | DISP3 |
| 144 | 217 | C201 | BU | | | DISP2 |
| 145 | 220 | 0234 | LD | PRCN | PRG | |
| 146 | 221 | 1204 | STR | ER | | |
| 147 | 222 | 0202 | LD | CR | | |
| 148 | 223 | 0100 | RSF | AR | | |
| 149 | 224 | 0100 | RSF | AR | | |
| 150 | 225 | 0100 | RSF | AR | | |
| 151 | 226 | 1203 | STR | DR | | |
| 152 | 227 | 8000 | LDI000 | | | |
| 153 | 230 | 6204 | SRG | ER | PRG1 | |
| 154 | 231 | D235 | BCF | | | PRG2 |
| 155 | 232 | 3203 | ADD | DR | | |
| 156 | 233 | 3104 | DCR | ER | | |
| 157 | 234 | C230 | BU | | | PRG1 |
| 158 | 235 | 5231 | GT | AMN | PRG2 | |
| 159 | 236 | E241 | BCT | | | PRG3 |
| 160 | 237 | 0231 | LD | AMN | | |
| 161 | 240 | C137 | BU | | | AP1 |
| 162 | 241 | 5232 | GT | AMX | PRG3 | |
| 163 | 242 | D137 | BCF | | | AP1 |
| 164 | 243 | 0232 | LD | AMX | | |
| 165 | 244 | C137 | BU | | | AP1 |

| | | | | | | |
|---|---|---|---|---|---|---|
| 166 | 245 | 0244 | LD | SELF | SELF | |
| 167 | 246 | 6200 | SRG | AR | | |
| 168 | 247 | D252 | BCF | | | ESELF |
| 169 | 250 | F037 | BL | | | ST, TM |
| 170 | 251 | F045 | BL | | | EX, TM |
| 171 | 252 | 0233 | LD | OPF | RCR | |
| 172 | 253 | B037 | GTI037 | | RCR1 | |
| 173 | 254 | E260 | BCT | | | RCR2 |
| 174 | 255 | 2106 | ICR | GR | | |
| 175 | 256 | 9004 | ADI004 | | | |
| 176 | 257 | C253 | BU | | | RCR1 |
| 177 | 260 | 0210 | LD | MAP | RCR2 | |
| 178 | 261 | 3233 | ADD | OPF | | |
| 179 | 262 | B037 | GTI037 | | RCR3 | |
| 180 | 263 | E267 | BCT | | | STAP |
| 181 | 264 | 3106 | DCR | GR | | |
| 182 | 265 | 9004 | ADI004 | | | |
| 183 | 266 | C262 | BU | | | RCR3 |
| 184 | 267 | F022 | BL | | STAP | MLV |
| 185 | 270 | 0201 | LD | BR | | |
| 186 | 271 | 4210 | SUB | MAP | | |
| 187 | 272 | 3206 | ADD | GR | | |
| 188 | 273 | 1310 | SET | FAPL | | |
| 189 | 274 | 3330 | SFG | COMP | STAP1 | |
| 190 | 275 | D300 | BCF | | | STAP2 |
| 191 | 276 | 3346 | SFG | AEND | | |
| 192 | 277 | D274 | BCF | | | STAP1 |
| 193 | 300 | 0310 | RST | FAPL | STAP2 | |
| 194 | 301 | 1311 | SET | FMUP | | |
| 195 | 302 | 3347 | SFG | MLUP | MLUP | |
| 196 | 303 | D302 | BCF | | | MLUP |
| 197 | 304 | 0311 | RST | FMUP | | |
| 198 | 305 | 8240 | LDI240 | | | |

| | | | | | | |
|---|---|---|---|---|---|---|
| 199 | 306 | 4211 | SUB | MTV | | |
| 200 | 307 | F037 | BL | | | ST. TM |
| 201 | 310 | 1312 | SET | FFCS | | |
| 202 | 311 | F045 | BL | | | EX. TM |
| 203 | 312 | 0312 | RST | FFCS | | |
| 204 | 313 | 1313 | SET | FSCS | | |
| 205 | 314 | 3350 | SFG | SCE | DSCE | |
| 206 | 315 | D314 | BCF | | | DSCE |
| 207 | 316 | 0313 | RST | FSCS | | |
| 208 | 317 | 0301 | RST | FMDC | | |
| 209 | 320 | 0320 | RST | FOVR | | |
| 210 | 321 | 0321 | RST | FUDR | | |
| 211 | 322 | 8000 | LDI000 | | | |
| 212 | 323 | 1201 | STR | MAP | | |
| 213 | 324 | 1211 | STR | MTV | | |
| 214 | 325 | 1222 | STR | ERD | | |
| 215 | 326 | 1221 | STR | TVD | | |
| 216 | 327 | 1220 | STR | APD | | |
| 217 | 330 | C000 | BU | | | STR |

FIG.19

| N | $2^{\frac{N}{8}}$ | $1 + \frac{N}{8}$ | $1 + \frac{\frac{N}{8}}{2^8}$ | $\log_2(1 + \frac{\frac{N}{8}}{2^8})$ |
|---|---|---|---|---|
| 1 | 1.0905077732 | 1.125000000 | 1.0316229548 | 0.049250014 |
| 2 | 1.1892071115 | 1.250000000 | 1.0511205519 | 0.071928094 |
| 3 | 1.2968395554 | 1.375000000 | 1.0602699942 | 0.084431618 |
| 4 | 1.4142135562 | 1.500000000 | 1.0606660171 | 0.084962500 |
| 5 | 1.5422210825 | 1.625000000 | 1.0536682138 | 0.075439718 |
| 6 | 1.6817922830 | 1.750000000 | 1.0405562225 | 0.057354922 |
| 7 | 1.8340080086 | 1.875000000 | 1.0223509999 | 0.031890595 |

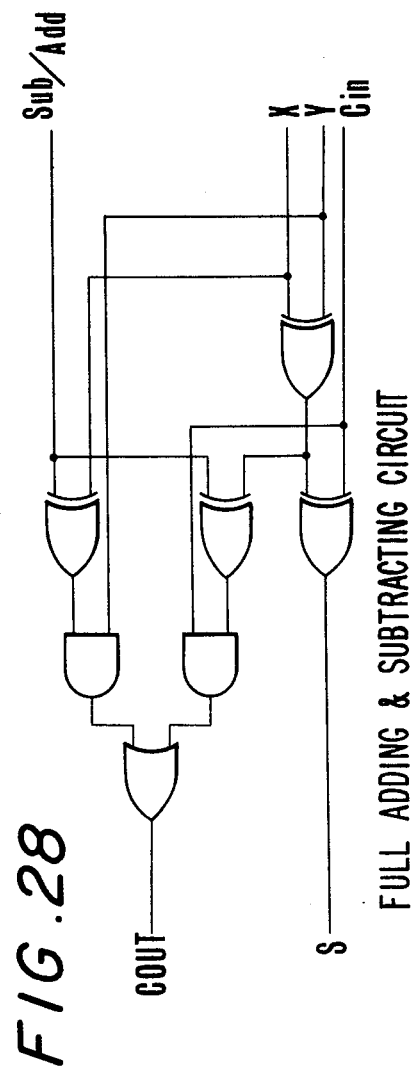
FIG.28 FULL ADDING & SUBTRACTING CIRCUIT
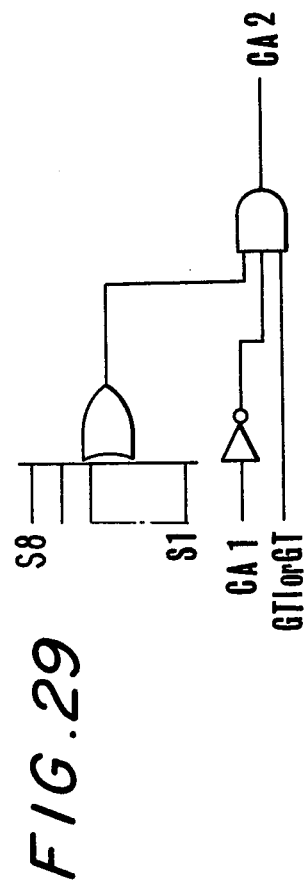
FIG.29

ICR  DCR

EXPOSURE CONTROL DEVICE

This is a continuation of application Ser. No. 611,806, filed Sep. 9, 1975, which in turn is a continuation of application Ser. No. 488,849, filed Jul. 15, 1974.

BACKGROUND OF THE INVENTION

1. Field of the Invention

The present invention relates to an automatic exposure control device to automatically control the exposure value of a camera, and more particularly, to an automatic exposure control device to convert the analogue value of an object, to digital value for obtaining appropriate exposure amount based on said digital value.

2. Description of the Prior Art

Heretofore there have been a number of patent application related to a method to automatically control exposure of camera. Many of them can be classified into the following three kinds. That is:

(1) A method to control aperture value of a taking lens as a result of computation of brightness of an object to be photographed, film sensitivity and shutter speed;

(2) A method to control shutter speed as a result of computation of brightness of an object to be photographed, film sensitivity and aperture value of a taking lens, and (3) A method to control predetermined combination of the aperture value of a taking lens and shutter time as a result of computation of object brightness and film sensitivity.

While each of these methods has special features and has been placed in practical use, it has shortcomings, also. That is, in the method of (1), since a photographer has the freedom to select freely shutter speed beforehand, he can relate the movement of an object to the shutter speed by selecting fast shutter speed for an object with fast movement. As far as the depth of field is concerned, however, the result obtained by the aperture value of a photographing lens determined automatically within the device according to the predetermined shutter time must be followed. When a stationary object is to be photographed, the depth of field is the most important element for composition of picture, therefore the method (1) is not satisfactory in this respect.

In the method of (2), the situation is totally reverse to the case of (1). That is, since shutter time is not left to the choice of a photographer, longer exposure time is given to an object with fast motion resulting in a picture with blur.

In the method of (3) since the combination of diaphragm aperture value and shutter speed will be determined simply for a given brightness of the field of photographing, no considerations are given for providing appropriate exposure. As a counter measure for such situation, such exposure control device has been proposed that the above mentioned shortcomings of the conventional device is eliminated, wherein a change over means is provided on an exposure control mechanism to enable the photographer to make so-called diaphragm aperture preference photographing, that is, as film sensitivity an diaphragm aperture value are set beforehand corresponding to the state of an object, exposure time can be controlled corresponding to the brightness of an object also to enable the photographer to make so-called shutter time preference photographing, that is, as film sensitivity and exposure time are set, the diaphragm aperture value can be controlled corresponding to the brightness of an object.

However, such conventional device which enables said two kinds of preference photographing to be done has its exposure control mechanism mechanically composed. therefore it has shortcomings that it becomes very complicated and the device itself become large in size.

Also a method to exercise said exposure control electrically has been proposed, but since majority of its control circuit is analogical electrical circuit, functional properties vary depending on the temperature of each circuit thus exposure control with high degree of accuracy could not have been done. An element with high degree of accuracy should be used for each position required to obtained high degree of accuracy in exposure control, but said element will cost high pushing the cost up thus it has a shortcoming of being uneconomical.

Further, to apply the above mentioned exposure control system having double preference function to a single lends reflex camera with TTL photo-sensing system which is now widely used for photographing of high level is considered to be very difficult because of its structure . Thus such camera with double preference function has not been placed in practical use although the need and advantages for the same have been recognized.

SUMMARY OF THE PRESENT INVENTION

An object of the present invention is to eliminate the above mentioned shortcomings of the conventional device by composing the entire automatic exposure control devie with digital electric circuits and by making said circuits with large scale integrated circuits (so called LSI) etc. to make the device compact.

Another object of the present invention is to provide a digital automatic exposure control device by which such photographing methods shown in the (1), (2) and (3) above (so-called shutter time preference photographing, diaphragm aperture photographing, program photographing) and manual photographing can be made by providing a simple information setting means.

Another object of the present invention is to provide a unique digital exposure control device by which free selection of various exposure control systems can be made by employing such sequence control means as ROM (read only memory), which arried out a micro program, at an exposure control circuit, and at the same time said device can be easily applied to a single lens reflex camera of a through the lens photo-sensing system and has good mass-production characteristics.

Further objects of the present invention will become clear through detailed explanation of the present invention which will be made in reference to drawings.

BRIEF DESCRIPTION OF THE DRAWINGS:

FIG. 11 is a schematic drawing to show the correspondence between each photographing information and code used in the device shown in FIG. 8.

FIG. 12 is properties diagram to show properties of a photographing lens used in the device shown in FIG. 8.

FIG. 14 is a schematic diagram to show a transmitting system for various data and control signals in the device shown in FIG. 8.

FIG. 16 is a schematic drawing to show an instruction system of the instruction register shown in FIG. 8.

FIG. 17 is a relation tble to show the relationship between the address and the instruction code in the ROM of the device shown in FIG. 8.

FIG. 19 is a relation table to show the relationship between the value being 1 step down from the shutter speed used in the device shown in FIG. 8 and its approximate value.

FIG. 28 shows full addition an substraction circuit applied to the circuit shown in FIG. 27.

FIG. 29 shows a carry detection circuit used in the device shown in FIG. 8, and shows the circuit which corresponds to greater than instruction.

Figure 1:
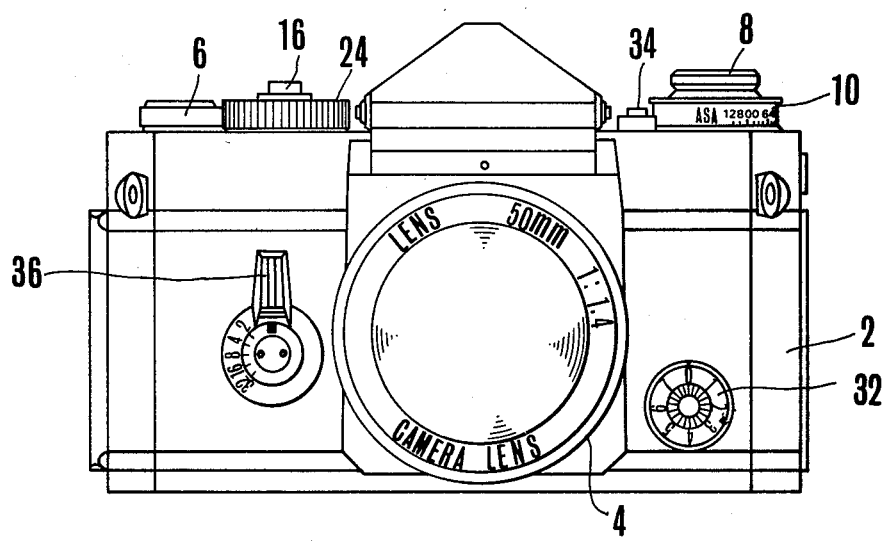
FIG. 1 is a front view of an example of a single lends reflex camera to which the automatic exposure control device of the present invention can be applied.

DESCRIPTION OF THE PREFERRED EMBODIMENTS;

FIG. 1 is to show composition drawing of important parts of a single lens reflex camera of TTL (through-the-lens) photo-sensing system to which an exposure control device which is a first embodiment of the present invention is applied, wherein FIG. 1(a) shows a front view, FIG. 1(b) shows a plan view and FIG. 1(c) shows a rear view. In the drawing, 2 is a camera main body which houses a shutter mechanism, a film advancing mechanism, a finder mechanism, an exposure control mechanism, etc. which compose a camera. 4 is a lens device which is mounted to the above mentioned camera main body 2 and has a mechanism to transmit the information at the lens side for example fully open diapgragm aperture value and diaphragm aperture value of lens, etc. to the above mentioned camera main body 2 side, beside a diaphragm adjusting mechanism and a range finder mechanism. 6 is a film wind up lever which is linked with the film advancig mechanism provided at the above mentioned camera main body 2. 8 is a film rewinding mechanism to rewind the film taken up by the above mentioned film wind up mechanism. 10 is an ASA film sensitivity input dial to set and input the ASA sensitivity of the film used. 12 is a counter of film taken up by the above mentioned film wind up mechanism. 14 is a finder viewing window provided in connection with the above mentioned finder mechanism. 16 is a shutter release button provided in an association with the above mentioned shutter mechanism. 18 is a aperture ring provided at the above mentioned lens device 4 to select and set diaphragm aperture value. 20 is a maximum diaphragm aperture value setting knob to provide upper limit by the decision of a photographer to the diaphragm aperture value determined automatically as a result of computation. 22 is a minimum diaphragm aperture value setting knob to provide lower limit by the decision of a photographer to the diaphragm aperture value determined automatically as a result of calculation. 24 is a shutter speed setting dial provided on the above mentioned main body 2 to select and set shutter speed. 26 is a maximum shutter speed setting knob to provide the limit of the shortest time that is so-called the maximum exposure time in Appex value by the decision of a photographer to the exposure time determined automatically as a result of calculation. 28 is a minumum shutter speed setting knob to provide the limit of the longest time, that is, so-called minimum exposure time in Appex value, by the decision of a photographer to the exposure time which is automatically determined as a result of computation. 30 is a full automatic selection switch which is placed in ON state when so-called full autmtic photographing is to be done, that is, in the case when so-called diaphragm aperture preference photographing is to be done, wherein required diaphragm aperture is selected and set by the diaphragm ring 18 and at the same time the position of "AUTO" is set at the shutter speed setting dial 24 for having it to determine automatically the exposure time and the desired maximum exposure time and the minimum exposure time are set respectively by the maximum shutter speed knob 26 and the minimum shutter speed setting knob 28, and when the exposure time obtained as a result of computation is not between the maximum value and the minimum value originally set, the maximum value (when the result obtained by computation exceeds the maximum value) or the minimum value (when said result is lower than the minimum value) is used as a newly set exposure time to compute and modify the diaphragm aperture value which is set originally, thus obtaining finally appropriate exposure time, or in the case when so-called shutter speed preference photographing is to be done, that is, desired exposure time is selected and set by the shutter speed setting means 24 and at the same time the position of "AUTO" is set at the diaphragm ring 18 for having it to determine automatically the diaphragm aperture value, and the desired maximum diaphragm aperture value and the minimum diaphragm aperture value are set respectively by the maximum diaphragm aperture value setting knob 20 and the minimum diaphragm aperture setting knob 22, and when the diaphragm aperture value obtained by calculation is not between the originally set maximum value and the minimum value, the maximum value (when the result obtained by computation exceeds the maximum value) or the minimum value (when the result is lower than the minimum value) is used as a newly set diaphragm aperture value to compute and modify the exposure time originally set, thus finally appropriate exposure is obtained. 32 is a program constant setting means to set and input the program constant in the case when both the diaphragm aperture value setting ring 18 and the shutter speed setting ring 24 are set to the position of "AUTO" and when only the maximum value and the minimum value are set by the decision of a photographer, the optimum diaphragm aperture value and the optimum exposure time are calculated according to the constant being set beforehand. 34 is an EE lock button to perform so-called EE lock that is when the picture to make photo-sensing and the picture to make photographing are different from each other the diaphragm aperture value or exposure time information being determined by computation based on the result of photo-sensing are retained until shutter release or photographing is completed. 36 is a self time setting lever to set self time when photographing by a self timer is to be done. 38 is a power source switch which is to be put in for activating the exposure control mechanism.

Figure 4:
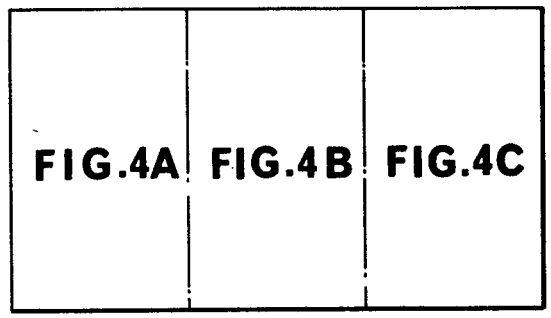
FIG. 4 is a block diagram showing an example of the automatic exposure control evice of the camera shown in FIG. 1.

FIG. 4 is a block diagram of an example of the automatic exposure control device for a camera shown in FIG. 1. In the drawing, 40 is a conventionally known photo-sensing circuit to sense the light from an object, wherein an amplifier 40A is connected to the output terminal of a light receiving element 40G and a log diode 40D having logarithmic characteristics is connected between the output terminal and the input terminal of the amplifier 40A. 41 is a photographing information setting means. SV is a film sensitivity setting means linked with the ASA sensitivity setting dial 10 in FIG. 1. PSA is a diaphragm value setting means linked with the diaphragm ring 18. PSS is a shutter speed setting means linked with the shutter speed setting dial 24. OPF is a fully open aperture value setting means to set the fully open aperture value of the photographing lens used. AMN is a minimum diaphragm aperture value setting means linked with the minimum diaphragm aperture value setting knob 22. AMX is a maximum diaphragm aperture value setting means linked with the maximum diaphragm aperture setting knob 20. SMN is a minimum shutter speed setting means linked with the minimum shutter speed setting knob 28. SMX is a maximum shutter speed setting knob 26. ST is a self timer time setting means being linked with 36. α is a setting means being linked with 32 to set program constant, for example, being made of a digital switch, etc. The device is also so composed that a gate circuit 41G is connected to the output terminal of said switch and the output terminal of said circuit 41G is connected to a calculating device 42 so that the state of each of above mentioned switches is transmitted to the calculating device 42 depending on the output of a sequence control circuit 43. 44 is a function detecting and setting circuit to set the state of each function in a camera, for example the position at which a mirror is positioned, or predetermined photographing conditions such as shutter time preference photographing, diaphragm aperture preference photographing. Said circuit comprises a switch $SW_1$ which is connected through in an association with pressing down of the shutter button 16, a switch $SW_2$ to record and retain the brightness of an object obtained by photo-sensing at a register, a switch $SW_3$ to select either automatic diaphragm or preset diaphragm, a switch $SW_4$ which is connected through in an association with reaching of the mirror to upper limit, a switch $SW_5$ which is connected through in an association with reaching of a rear screen to its rearest end, a switch $SW_6$ to select shutter preference photographing, a switch $SW_7$ to select diaphragm aperture preference photographing, a switch $SW_8$ to select fully open photo-sensing, and a switch $SW_9$ being linked with the full automatic selection switch 30 to select full automatic exposure, wherein the output terminal of each switch is connected to the gate circuit 44G. Also the output terminal of the gate circuit 44G is connected to the gate circuit 45 so that said gate circuit 44G selectively output the signal of each of the above mentioned switches $SW_1$ to $SW_9$ to the gate circuit 45 corresponding to the output of the sequence control circuit 43. The switch $SW_1$ is so made as being locked at OFF position when the shutter speed and the diaphragm aperture value are not indicated at the indicators SSD, APD to be described below. 45 is a conventional gate circuit having plural number of input terminals and output terminals and a function detecting signal circuit is composed by the above mentioned function judgement setting circuit 44 and the gate circuit 45. 43 is a sequence control circuit being composed of a SCC determination circuit 43a to call the address of a sequence control counter (hereinafter called as SCC) which contains the address of the instruction conversion circuit (hereinafter called as ROM) and the above mentioned SCC 43b and ROM 43c. And as the instruction within ROM the content of such instructions as addition and subtraction instructions, or designation instructions to designate the party to/from which addition or deduction is to be made, and jump instructions are contained. Also when the output from the ROM 43c is other than the jump instructions the SCC determination circuit 43a calls next address within the SCC after the function instructed by ROM 43c is completed, while when a jump instruction is produced by ROM 43c said output is fed back to the SCC determination circuit and such address of the SCC 43b as corresponding to the jump instructions and the output of the gate circuit is called. 46 is a conventionally known reference time generation circuit to control the function time of the sequence control circuit 43 and has an input terminal to which the putput of a conventionally known clock pulse oscillator 47 is inputted and plural number of output terminals. 42 is a calculating device and comprises a circuit 42a to perform calculating and ACC 42b which memorizes digitallized data. The calculating circuit 42a has an addition and subtraction circuit to add or subtract to/from the content of the ACC 42b any one register of the data memorizing device 48 selected by the party designation instruction or any one photographing information content of the photographing information setting means 41, when the calculation instruction and the party designation instruction are produced from the above mentioned sequence control circuit 43, and has a conventionally known gate circuit for transmitting the data of the ACC 42b to any one register of the data memorizing device 48 selected by the above mentioned party designation instruction or to any one of the indication device 49, besides the circuit 42a has a circuit to add or subtract the logic signal "1" to/from the content of the ACC 42b and a circuit to set "1", "0" (hereinafter "1" or "0" will show logic signal at any desired bit of the ACC 42b.

The ACC 42b is composed of a register of 5 bits in this example, and in the following explanations the least significant bit is called P and each of the subsequent bits is called $q, r, s, t$, respectively. Each register of the data memorizing device 48 is composed of a register of 5 bits corresponding to the ACC 42b. The data memorizing device 48 containing result of calculation, the D-A converter 50 and the calculation result judging circuit 51 are connected to the output terminal of the above mentioned computation device 42, while the photographing information setting means 41, the data memorizing device 48, and the sequence control circuit 43 are connected to the input terminal of the same. 48 is a data memorizing device having such plural number of registers as a register SSR storing shutter speed valve, a register APR storing diaphragm aperture value, a register BR temporarily storing the calculation result, and a register BVO storing brightness, etc. 52 is a conventionally known comparator which composes the A-D converter converting the analog amount of a photo-sensing circuit 40 to the digital amount together with the D-A converter 50 and the calculating device 42. 49 is an indication device and includes an indicator SSD to indicate the content of the register SSR, an indicator APD to indicate the content of the register APR, an indicator EVD to indicate EV error step number and a gate circuit 49G to control each of the above mentioned indicators corresponding to the output of the sequence control circuit 43. 53 is a driving circuit, in which an ever exposure indication lamp LM1, an under exposure indication lamp LM2, a solenoid L1 to conduct automatic step down, a solenoid L2 for up-driving a solenoid a solenoid L3 for starting a leading curtain, a solenoid L4 for starting a trailing curtain, and a solenoid L5 for down-driving a mirror are provided and flip flop (hereinafter called F.F). $F.F_{1-7}$ are connected to the input terminal thereof and at the same time a gate 53G which controls each of said $F.F_{1-7}$ by the output of the sequence control circuit 43 is provided. 54 is an internal state memorizing circuit to memorize functional sequence. 55 is a reset circuit to clear the content of all registers and FF circuit in response to the throwing of the power source switch 38. It is possible to gather integrally the above mentioned calculating device 42, the data memorizing device 48 and the sequence control circuit 43, etc. into one piece.

Next, explanations will be made on the operation of FIG. 4. The explanation will be made on said operation while referring to FIG. 5, FIG. 6(a)(b) and a Table 1 shown below for explaining the codes used in FIG. 6(a)(b). Now, Table 1 is shown below.

Table 1

| Code | Content |
|---|---|
| DR ⟵⟶ Apt | To exchange the content of DR and the content of all bits of Acc. |
| DR ⟶ Apt | The content of DR (BR, SSR, APR, S, PSA ... α, etc.) is given to the total bits of Acc. But the content of DR is unchanged. |
| Apt ⟶ DR | The content of Acc is given to the total bits of DR to renew the content of DR. |
| Apt ± DR | The content of the total bits of DR is added/deducted to/from the content of Acc and the results thereof is left at Acc. The content of DR is unchanged. |
| 0 ⟶ Apt | Total figures of the content of Acc is made as 0 (zero ... same hereinafter). |
| 1 ⟶ Apt | Total figures of the content of Acc is made as 1 (zero ... same hereinafter). |
| 0 ⟶ Ai | The bit of i of Acc is made as 0 (i = p. q ... t). |
| 1 ⟶ Ai | The bit of i of Acc is made as 1 (i = p. q ... t). |
| 0 ⟶ Apt | The content of Acc is deducted from 0 to secure complement of Acc and leave the result thereof in Acc. |
| OFF ⟨Swi⟩ ON | The content of Swi (i = 1 – 9) is detected, and when the switch is OFF the sequence flowing to the direction of arrow is carried out, while when the switch is ON the sequence flowing to the direction of ON is carried out. |
| 1 ⟨comp⟩ 0 | The content of the comparator 52 is detected and when the output of the DA converter 50 is smaller than the analogue voltage output of the photo-sensing circuit, the sequence jumps to the direction of arrow of 1. |
| 1 ⟨CA=⟩ 0 | When the advancing of the figure in addition or borrow in deduction takes place in the result of computation carried out in the preceeding step, the sequence jumps to the arrow mark of 1. |
| YES ⟨AT≠0⟩ ON | If the content of bit of T of Acc (T = p. q. r. s. t. pt (total figures)) is 1, the sequence jumps to the direction of arrow mark. |

Table 1-continued

| Code | Content |
|---|---|
| ⟨XXXX⟩ | Mark to show continuance in the flow chart. |
| FFnSET | FFn (n = 1 – 7) is set. |
| FFnRESET | FFn (n = 1 –7) is reset. |
| [t│s│y│q│p]<br>16 8 4 2 1<br>pt | The arrangement drawing of total bits of Acc. |

When the power source switch 38 is thrown, reset signal is produced by the reset circuit 55. By this each register of the photographing information setting means 41, the function detecting and setting circuit 44, the gate circuit, the calculating device 42, and the content of FF in the driving circuit 53 are all cleared. Then after an elapse of a certain period of time determined by the sequence control circuit, "1" is registered successively at the Acc 42b of the calculating device 42 while being controlled by the gate circuit 45 and the sequence control circuit 43, and the output corresponding to its digital amount is converted to analogue amount by the DA converter 50. And the analogue output of the photo-sensing circuit 40 and the analogue amount being converted by the above mentioned DA converter 50 are compared by the comparator 52, and the amount of light of an object is supplied in a digital form to the calculating device 42, thus the amount of sensed light BV is determined. As the film sensitivity information SV being set at the switch SV of the photographing information setting means 41 is transmitted to the calculating device 42 through the gate circuit 41G in response to the output of the sequence control circuit 43, the addition (BV + SV) = EV between the above mentioned photo-sensing amount BV and the film sensitivity information SV is done in the calculating device 42, to calculate the exposure amount EV, and said exposure amount EV is transmitted to the register BR of the data memorizing device 48 with such timing as determined by the output of the sequence control circuit and stored. Based on said exposure amount EV, appropriate shutter speed and diaphragm aperture value are determined by the operation to be described below.

Explanations will be made on each of the four photographing modes, that is, shutter time preference photographing, diaphragm aperture preference photographing, program photographing and manual photographing.

Figure 5A:
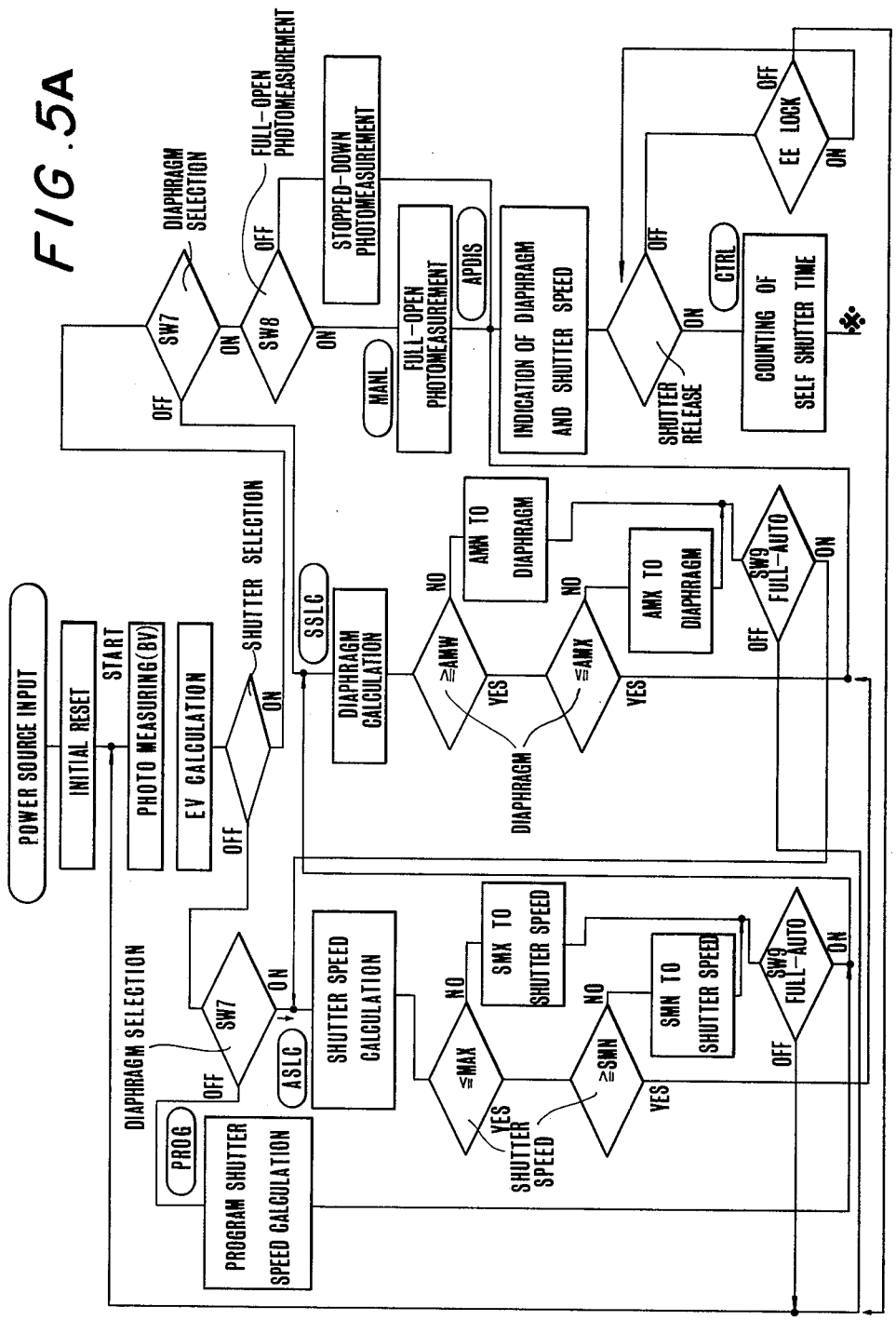
FIG. 5 is a flow chart to explain the function of the device shown in FIG. 4.
Figure 6A:
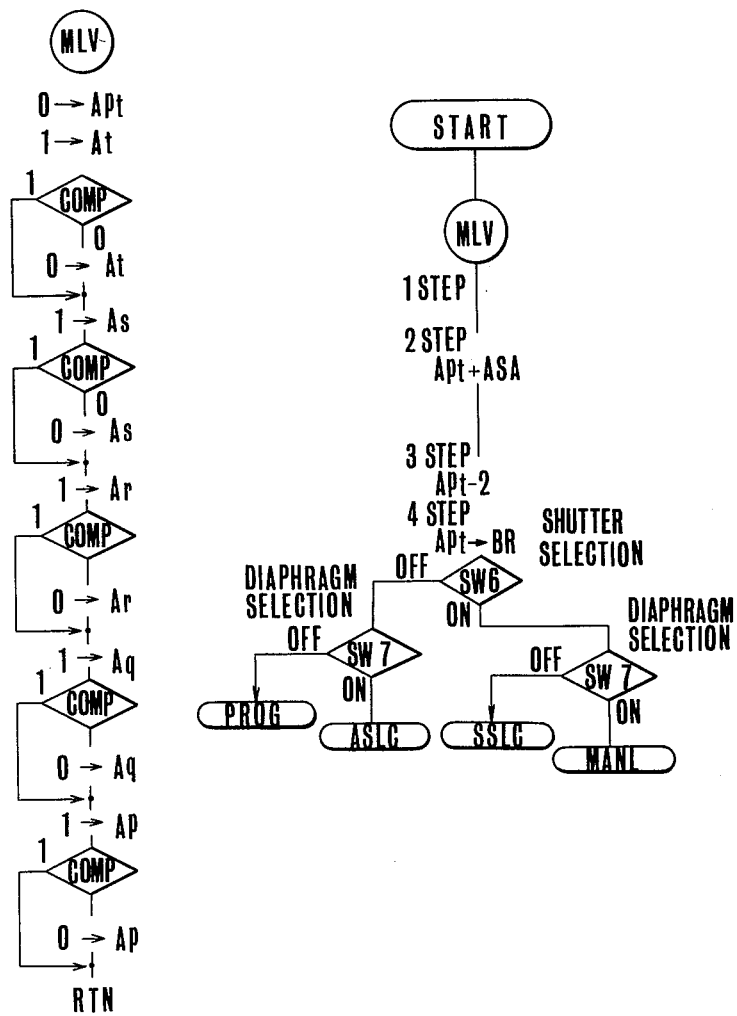
FIG. 6 (a), (b) are flow charts to describe in detail the process of calculation of exposure in the FIG. 5.
Figure 6B:
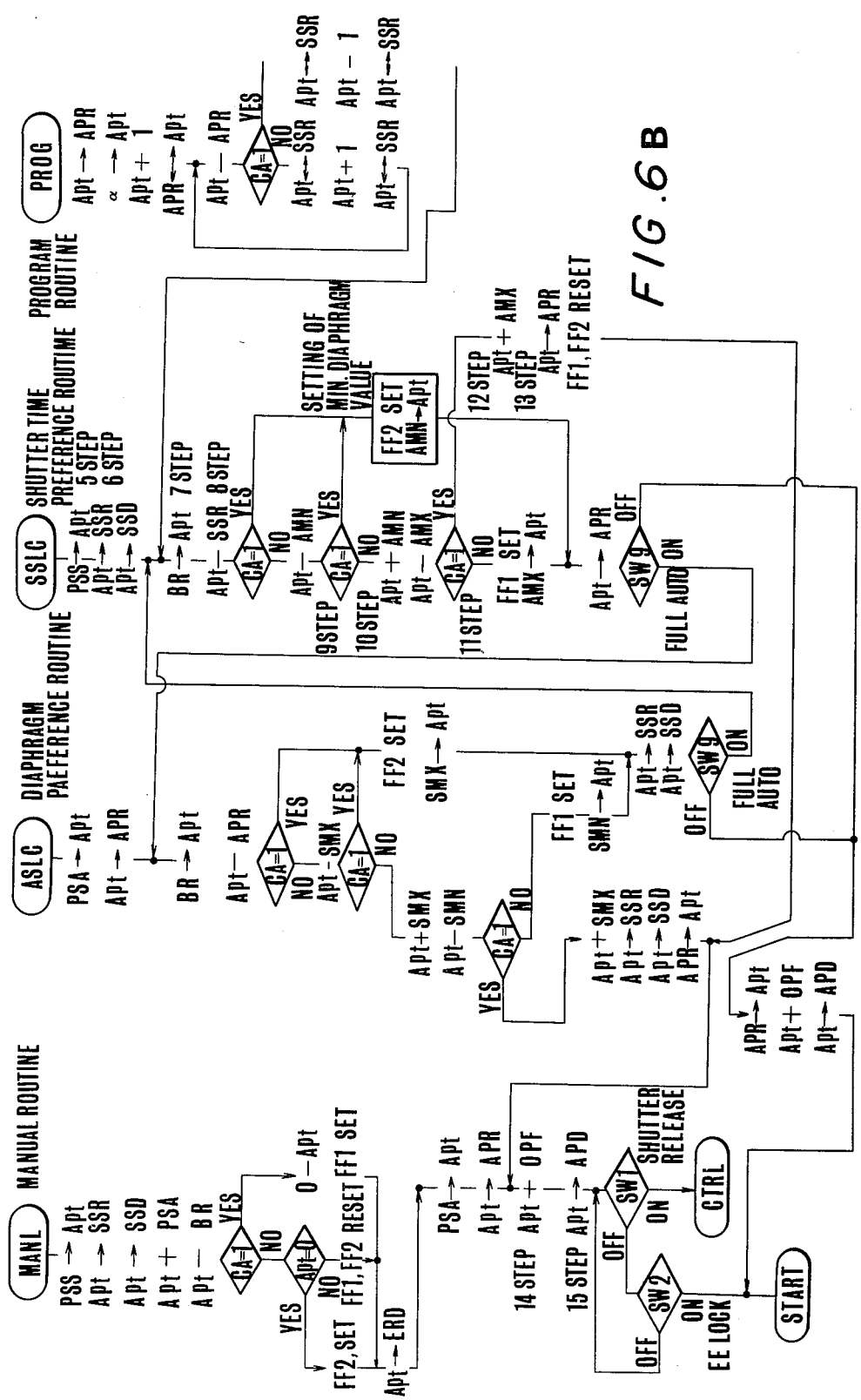

(1) The case of so-called shutter time preference photographing, that is when shutter time is set beforehand and diaphragm aperture value is automatically controlled (refer to the route SSLC in FIG. 5 and FIG. 6(b));

When the shutter selection switch $SW_6$ is turned in On state and the diaphragm aperture selection switch $SW_7$ is held in OFF state, said signal is given to the sequence control circuit 43 through the gate circuit 45. By the output of this sequence control circuit 43 the content of the switch PSS which sets the shutter speed TV is trammsitted to the calculating device 42. And by the output of the sequence control circuit 43 the substraction (EV−TV) = AV between said shutter speed and the above mentioned exposure volume EV is done in the calculating device 42, thus diaphragm aperture value AV is determined. At this time the content of the calculating device 42 becomes AV. This diaphragm aperture value AV is transmitted to the computation result judging circuit 51 and is compared with the minimum diaphragm aperture value AMND, the maximum diaphragm aperture value AMXD which are the content of the switches AMN, AMX of the photographing information setting means 41 which have been transmitted through the calculating device 42. When the determined diaphragm aperture value AV is between the above mentioned minimum diaphragm aperture value and the maximum diaphragm aperture value, said diaphragm aperture value AV is stored in the register APR and, at the same time, is transmitted to the diaphragm aperture value indicator APD through the calculating device 42 and is indicated there. And in this case the shutter time value which is the content of the switch PSS is transmitted to the indicator SSD through the calculating device 42 and is indicated there.

On the other hand when an object to be photographed is too dark or too bright and the diaphragm aperture value AV determined by the calculating device 42 is compared by the computation result judging circuit 51 and is outside of the scope within the above mentioned minimum diaphragm aperture value and the maximum diaphragm aperture value, said diaphragm aperture value AV will not be transmitted to indicator APD of the register APR, instead the content of the above mentioned switch AMN or of the switch AMX is transmitted from the computation device 42 to the register APR and is stored therein. That is, the content of the register APR becomes the marginal diaphragm aperture value set beforehand. Next when the full automatic switch $SW_9$ is held in ON state, said signal is given to the sequence control circuit 43 through the gate circuit 45. As a result, by the output of said sequence control circuit 43 the substraction between the content of the register BR and the content of the register APR, that is, the substraction between the diaphragm aperture marginal value and the exposure volume (EV − AMND) or (EV − AMXD) is done in the calculating device 42, thus shutter speed is determined. The shutter speed thus determined is transmitted to the computation result judging circuit 51 and is compared with the minimum time value SMND and the maximum time value SMXD which are the content of the switches SMN · SMX of the photographing information setting means 41 which has been transmitted through the computation device 42, and when it is between said minimum time value and the maximum time value, that is within the shutter speed limit of the shutter device, said shutter speed TV is stored in the register SSR and at the same time is transmitted to the indicator SSD and is indicated there.

That is, when $SW_9$ is held in ON state and the object brightness is too bright against the set shutter speed or too dark and appropriate exposure is not obtained even when the determined diaphragm aperture value is the marginal value, the shutter speed set beforehand is automatically adjusted.

And when the full automatic switch $SW_9$ is held in OFF state after either one of the marginal diaphragm aperture value is set, the light from an object is sensed anew and the exposure volume EV' based on thus sensed amount of light is registered in the register BR. That is, the content of the register BR is replaced from the exposure volume, EV to EV'. Then the same operations as mentioned above will be repeated based on this exposure volume EV'.

(2) The case of so-called diaphragm aperture preference photographing, that is, when the diaphragm aperture amount is set beforehand and the shutter speed is automatically controlled (refer to FIG. 5 and the route ASLC of FIG. 6(b)):

When the shutter selection switch $SW_6$ is turned OFF and the diaphragm aperture selection switch $SW_7$ is turned ON while diaphragm aperture value is pre-set at the switch PSA, the above mentioned diaphragm aperture preference photographing is done in the following manner.

As the shutter selection switch $SW_6$ and the diaphragm aperture selection switch $SW_7$ are held in OFF and ON states, respectively, said signal is given to the sequence control circuit 43 through the gate circuit 45. As a result by the output of said sequence control circuit 43 the content of the switch PSA being set as the diaphragm aperture value AV is transmitted to the calculating device 42. Also by the output of the sequence control circuit 43 the substraction between the above mentioned diaphragm aperture value AV and the exposure volume EV (EV − AV) = TV is done in the calculating device 42, thus the shutter time TV is determined. At this time the content of the calculating device 42 becomes TV. This shutter time TV is transmitted to the computation result judging circuit 51 and is compared with the minimum time value SMND and the maximum time value SMXD which are contents of the switches SMN, SMX, which have been transmitted through the calculating device 42, and when the determined shutter time TV is within the scope of the above mentioned SMND and SMXD, said shutter speed TV is stored in the register SSR and at the same time is transmitted to the indicator SSD which indicates the shutter speed through the calculating device 42 and is indicated there. And in this case the diaphragm value which is the content of the switch PSA is transmitted through the calculating device 42 to the indicator APD and is indicated there. On the other hand when the object brightness is too bright or too dark against the set diaphragm aperture value and appropriate exposure is not obtained even if the shutter speed is at its marginal value, the preset diaphragm aperture value is automatically adjusted, thus the operation thereafter will be same as in the case of shutter speed preference photographing.

Figure 7:
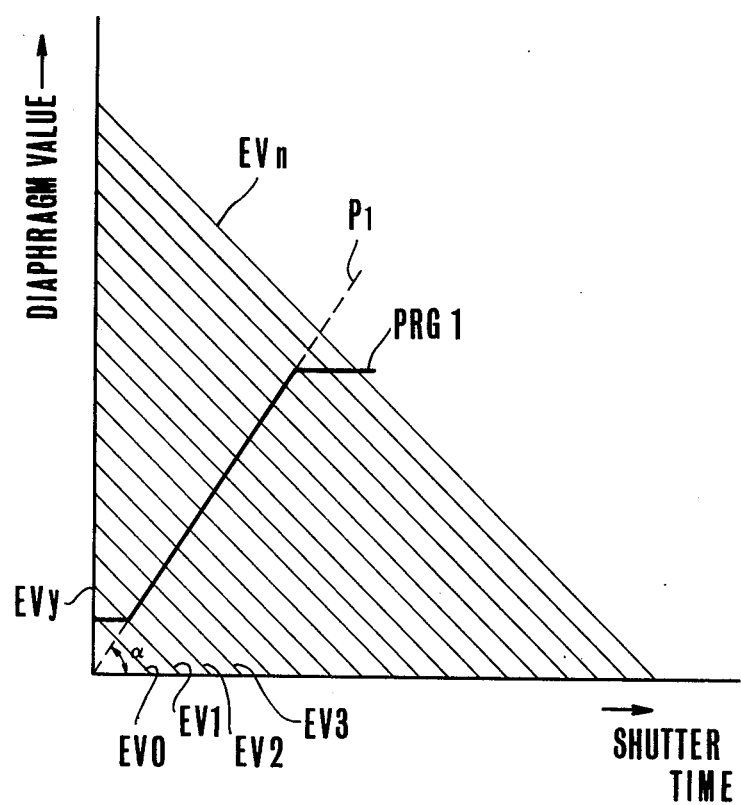
FIG. 7 is a schematic drawing to explain the exposure control principle in program photographing.

(3) The case of so-called program photographing, that is, when the predetermined combination of the diaphragm aperture value of a photographing lens and the shutter speed as a computation result of the object brightness and the film sensitivity is automatically controlled (refer to FIG. 5 and the route PROG in FIG. 6):

While FIG. 7 is a schematic drawing to explain the principle of exposure control of program photographing, first said principle will be explained referring to said FIG. 7. In the drawing, the axis of abscissa (axis X) indicates shutter speed while the axis of ordinate (axis Y) indicates the diaphragm aperture value, and $EV_o$, $EV_1$, $EV_2$ ... $EV_n$ are exposure volume and a conventionally known EV characteristics diagram is composed thereby. PRG1 is a program curve and P1 is a straight line with a slant $\alpha$. Said straight line is expressed as commonly known by;

$$Y = \alpha X \qquad (1)$$

and the above mentioned EV characteristics straight line $EV_1$ is expressed by;

$$Y = -X + (EVy) \qquad (2),$$

As X, Y are calculated from equations (1), (2), $$X = (EVy/\alpha + 1) \qquad (3),$$

$$Y = \alpha(EVy/\alpha + 1) \qquad (4)$$

are obtained. That is, from the equations (3), (4) the shutter speed can be obtained by dividing the output EVy of the light sensing circuit by the sum of the constant $\alpha$ set beforehand and the constant 1, that is, $\alpha + 1$, while the diaphragm aperture value y can be obtained as the product of thus obtained shutter speed and the constant $\alpha$. Thus it reveals that they can be obtained in the case of program photographing by giving the constant $\alpha$ to the calculating device 42 to conduct, within said device, multiplication and division based on the exposure volume EVy.

In the present invention the calculating shown in the equation (3) is done by the calculating device 42 and the data memorizing device 48, and after calculating X, that is, shutter speed it proceeds to the route of the shutter preference photographing, then same calculating as in the photographing mode of (1) is done, thus optimum exposure is determined. That is, when both of the switch $SW_6$ for shutter time selection and the switch $SW_7$ for diaphragm aperture selection are held in OFF state, the signal thereof is given to the sequence control circuit 43 through the gate circuit 45 and the output of said circuit 43 is given to the calculating device 42, thereby the exposure volume EV being sensed by the above mentioned photo-sensing circuit 40 is transmitted to the register APR by the calculating device 42 and the constant $\alpha$ which constitutes the content of the switch $\alpha$ is registered at the calculating device 42. After that "1" is added to the computation device 42. That is, at this time the content of the computation device 42 becomes $(\alpha + 1)$. Then the exposure volume EV being stored in the above mentioned register APR is divided by the content $(\alpha + 1)$ of the above mentioned calculating device 42. This division is done by conventionally known method by the register APR and the calculating device 42. As a result of this division the shutter speed TV is transmitted from the calculating device 42 to the register SSR and is stored therein. Also in the calculating device 42 the diaphragm aperture value AV is determined through the route of the above mentioned shutter preference based on said shutter speed TV, and this diaphragm aperture value AV is transmitted to the register APR and is stored therein and at the same time said diaphragm aperture value AV and the abovementioned shutter speed TV are transmitted to the indicators APD, SPD, corresponding thereto respectively and indicated therein.

While the above has explained on the three photographing modes the manual photographing which is the fourth photographing mode can also be made in the following manner. (Refer to the route MANL in FIG. 6(b)).

That is, when the shutter selection switch $SW_6$ is placed in ON state and the diaphragm aperture selection switch is also selected at ON, the content of the switch PSS of the photographing information setting circuit 41 is transmitted through the computation device 42 to the register SSR and at the same time and is transmitted to the indicator SSD. By the output of sequence control circuit 43 said shutter speed and the content of the switch PSA are added in the calculating device 42. That is, calculation of PSS + PSA = PEV is done. Then the content of BR, that is, the exposure volume EV and the above mentioned preset exposure volume PEV are compared, and over, under error step number is calculated and is indicated.

By the above process the optimum diaphragm exposure value and shutter speed in each photographing mode are calculated and are stored in each of registers APR, SSR.

In the event the EE lock switch $SW_2$ which is linked with the EE lock button 34 is not closed the computation of appropriate exposure volume is done in the above mentioned process with such timing (each several tens of (ms)) as determined by the sequence control circuit, and the content of each register APR, SSR is renewed in turn and is memorized. Also when the EE lock switch $SW_2$ is closed the appropriate exposure volume just before the closing is memorized in each register APR, SSR and after said closing even if object brightness varies the content of said registers will not be renewed.

Figure 2:
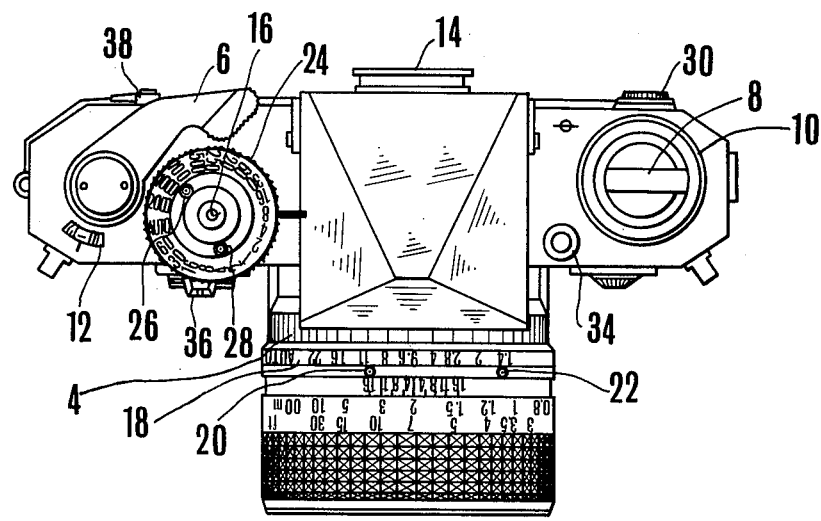
FIG. 2 is a plan view of the camera shown in FIG. 1.
Figure 3:
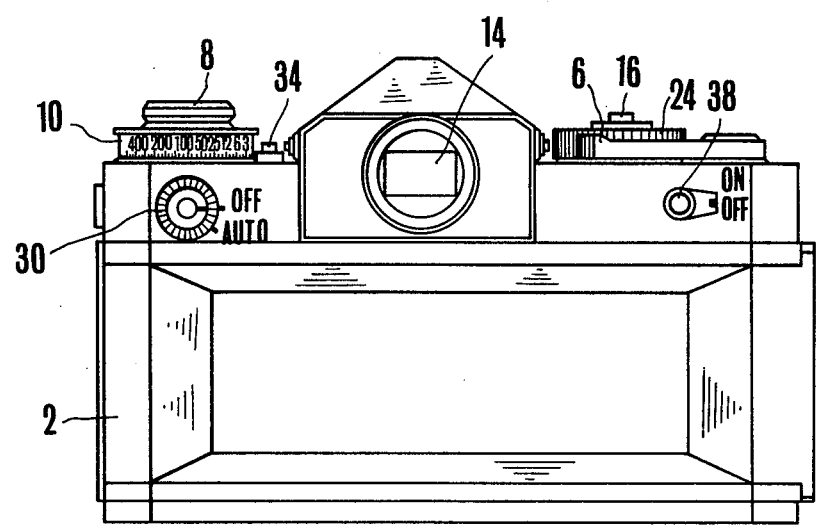
FIG. 3 is a rear view of the camera shown in FIG. 1.

Next, as the shutter release switch $SW_1$ is placed in ON state the mechanism of a camera is controlled in a sequence shown after CTRL in FIG. 2.

First, the time of a self timer being set at the switch ST is transmitted to the calculating device 42 and is counted, and after it is counted up photo-sensing is done again to obtain the amount of light $BV_1$. Said amount of light $BV_1$ sensed is stored in one of the registers (not shown in the drawing) of the data memorizing device 48. As the switch $SW_3$ is placed in ON state during automatic stop down, the $F.F_3$ for automatic stop down is set and automatic stop down is started. During said automatic stop down the light from an object which has passed through diaphragm blade is sensed in turn and stop down is donw until its amount of light sensed becomes $BV_1$ − APR. As the amount of light sensed $BV_2$ becomes $BV_1$ 31 APR = $BV_2$ as mentioned above, reset signal is produced by the sequence control circuit and the above mentioned $F.F_3$ are reset, thus stop down operation is completed. In the case of diaphragm mechanism of preset type which has been used after conventionally, the switch $SW_3$ is made OFF during automatic stop down. By this the diaphragm aperture value is preset to such value as corresponding to the above mentioned register APR. However, as there is such case that said preset diaphragm aperture value is not set at an optimum diaphragm aperture value by mechanical error, etc. of the automatic stop down mechanism, in the present invention as presetting of diaphragm is completed photo-sensing is done again based on said diaphragm aperture value. And the shutter speed is calculated again based on the amount of light sensed $BV_2$, at that time as the result of said computation is stored in the register SSR. That is, when diaphragm is set by the automatic stop down mechanism of preset type, the correction of shutter speed for correcting the shutter speed computed as mentioned above is done here.

When the above operation is completed, mirror up signal is produced from the sequence control circuit 43. By this $F.F_4$ are set and $L_2$ is energized to effect mirror up operation, then as switch $SW_4$ becomes ON upon completion of mirror up $F.F_3$ for starting the leading curtain is set. By this $L_3$ is energized and the leading curtain is started. After that the content of the register SSR is counted and after counting up $F.F_6$ for starting the trailing curtain is set by the output of the sequence control circuit 43 and $L_4$ is energized then the trailing curtain is started. As the trailing curtain reaches the prescribed extreme end, the switch $SW_5$ becomes ON and $F.F_7$ is set. By this solenoid $L_5$ for mirror down is excited and mirror descends, thus photographing is completed.

Next, actual figures will be used for substitution and the automatic exposure device of the present invention will be further explained in detail.

Now, such case is taken up that a film of ASA = 100 sensitivity is used with fully open F value of F = 1.4 and shutter speed is preset at 1/125 (sec.) for an object brightness of BV = 5.

When the object brightness is represented by BV, diaphragm aperture value by AV, film sensitivity by SV and shutter speed by TV (while these codes are index codes being well known in computation formula in photography), optimum exposure condition will be expressed by;

$$SV + BV = TV + AV \qquad (5)$$

The appropriate diaphragm aperture value can be easily obtained by substituting the elements in the above equation (5) with the above mentioned photographing conditions. And in the present invention as the above mentioned photographing conditions are expressed in binary system as in Code Table 1 shown below for facilitating computation process, such correction as will be described later is done for the equation (5) to obtain appropriate diaphragm aperture value. Now, the Code Table 1 will be shown below:

| Code Table 1 | | | | |
|---|---|---|---|---|
| Ampex volume determined by AV, BV, TV, SV values | Film sensitivity SVd | Shutter time TVd (sec.) | Diaphragm aperture value AVd | Code |
| −8 | 12 | 16 | 1 | 00000 |
| −7 | 25 | 8 | 1.4 | 00001 |
| −6 | 50 | 4 | 2 | 00010 |
| −5 | 100 | 2 | 2.8 | 00011 |
| −4 | 200 | 1 | 4 | 00100 |
| −3 | 400 | 1/2 | 5.6 | 00101 |
| −2 | 800 | 1/4 | 8 | 00110 |
| −1 | 1000 | 1/8 | 11 | 00111 |
| 0 | 3200 | 1/15 | 16 | 01000 |
| 1 | 6400 | 1/30 | 22 | 01001 |
| 2 | | 1/60 | 32 | 01010 |
| 3 | | 1/125 | | 01011 |
| 4 | | 1/250 | | 01100 |
| 5 | | 1/500 | | 01101 |
| 6 | | 1/1000 | | 01110 |
| 7 | | 1/2000 | | 01111 |
| 8 | | | | 10000 |
| 9 | | | | 10001 |
| 10 | | | | 10010 |
| 11 | | | | 10011 |
| 12 | | | | 10100 |
| 13 | | | | 10101 |
| 14 | | | | 10110 |
| 15 | | | | 10111 |

When the fully open F-value AV of a lens is taken into considerations in the equation (5), the equation (5) will become;

$$(BV - AV_o) + SV = TV + (Av - Av_o) \qquad (6)$$

In the above what is shown in parenthesis in left side shows the intensity of illumination on the plane of the light receiving element 40G in index codes while what is shown in parenthesis in right side indicates the stop down step number from the fully open F-value of the photographing lens used. As each photographing condition is expressed in the binary system as in the Code Table 1 in the present invention it is necessary to provide 10 steps of correction volume for film sensitivity, 4 steps of the same for shutter time and 8 steps of the same for diaphragm aperture value. Therefore the equation (6) becomes;

$$(BVd + Avod) + (Svd + 10) = (Tvd + 4) + (Avd + 8 - Avod) \quad (7)$$

In the above equation the reason why small letter ($d$) is added to each code is to denote that each code is substituted by figures in the binary system. (Especially the Avod indicates the stop down step number from the reference fully open F-value F = 1).

The equation (7) may be rewritten from the Code Table 1 as:

$$(Bvd - Avod) + Svd = Tvd + (Avd - Avod) + 2 = Tvd + (Avd - Avod) + 00010 \quad (8)$$

Also each photographing condition mentioned above will be as follows as per the Code Table 1.
Object brightness BVd = 01101
Fully open F value of lens Avod = 00001
Film sensitivity Svd = 00011
Shutter time Tvd = 01011 \quad (9)

When the elements in the equation (8) are substituted by the equation (9), $$(01101 - 00001) + 00011 = 01011 + (Avd - 00001) + 00010 \quad (10)$$

Therefore, $$(Avd - 00001) = 00010 \quad (11)$$

The left side of the equation (11) indicates the number of stop down step from the fully open F-value, while the right side means (2) as converted into decimal system.

That is, it indicates that under each photographing condition mentioned above at 2 steps down from the fully open F value F = 1.4, that is, at the diaphragm aperture value of F = 2.8, appropriate exposure can be obtained. It is well known that appropriate exposure can be obtained by photographing with said diaphragm aperture value F = 2.8. In the present invention the computations in the equations (8) to (11) are done in the following manner to obtain appropriate exposure.

FIG. 6(a) and FIG. 6(b) which are the flow charts to explain the exposure computation process of the present invention and the content of each resister in the above mentioned computation process will be explained together with FIG. 4.

Now, the function of the automatic exposure control device to which the present invention shown in FIG. 4 is applied when each photographing condition shown above is used will be explained using the Table 2 shown below.

Table 2

| Step | Computation device 42 Apt | Register BR | Register SSR | Register APR | Register APD |
|---|---|---|---|---|---|
| 1 | 01100 | | | | |

Table 2-continued

| Step | Computation device 42 Apt | Register BR | Register SSR | Register APR | Register APD |
|---|---|---|---|---|---|
| 2 | 01111 (Apt + ASA) | | | | |
| 3 | 01101 (Apt - 2) | | | | |
| 4 | 01101 From here SSLC (going into shutter preference route) | 01101 | | | |
| 5 | 01011 | 01101 | | | |
| 6 | 01011 | 01101 | 01011 | | |
| 7 | 01101 ←----- | 01101 | | | |
| 8 | 00010 (01101 - 01011) ◇CA◇ | | | | |
| 9 | 00001 (00010 - 00001) ◇CA◇ | | | | |
| 10 | 00010 | | | | |
| 11 | |CA| 11011 (00010 - 00111) ◇CA◇→ | | | | |
| 12 | 00010 | | | | |
| 13 | 00010 | | | 00010 | |
| 14 | 00011 (00010 + 00001) | | | | |
| 15 | 00011 | | | | 00011 |

That is such brightness Bvd — Avod as adding the object brightness and the fully opened diaphragm aperture value is sensed by the photo-sensing circuit 40, and said sensed amount of light is converted to digital amount by the calculating device 42, the D - A converter 50 and the comparator 52 and is registered in the Acc 42b within the calculating device 42 as binary code (01100). Said state is shown in step 1 of Table 2. The film sensitivity information (00011) which constitutes the content of the switch Sv is transmitted to said Acc 42b in the calculating device 42, and the addition:

$$(Bvd - Avod) + Svd = 01100 + 00011 = 01111$$

is done.

Said state is shown in Step 2 of Table 2.

Further, although not shown in FIG. 4, the correction coefficient 2 shown in the equation (8) is subtracted from the content of the Acc 42b in the calculating device 42 and the content of the Acc 42b in the calculating device 42b becomes (01111 - 00010 = 01101), then the content of said Acc 42b is transmitted to the register BR and is stored as exposure volume.

Now, explanations will be made referring to the shutter time preference photographing route SSLC of FIG. 6(b).

While the shutter time Tvd = 01011 which has been set at the switch PSS beforehand is transmitted to Acc 42b, said shutter time Tvd = 01011 is immediately transmitted to the register SSR and is stored therein. Therefore at this time such data as corresponding to the register BR and the register SSR respectively is stored as shown in Step 6 of Table 2. After that the content of the register BR, that is, (Bvd − Avod + Svd − 00010) is transmitted to Acc 42b, and Acc − SSR is carried out by the calculating device 42. That is, (Bvd − Avod + Svd − 00010 − Tvd = 01101 − 01011 = 00010 = Avd − Avod) is done and the diaphragm aperture value Avd is determined. (Refer to Step 8 of Table 2). The minimum diaphragm aperture value is supposed to be F = 2, that is, the value being one step stopped down from F = 1.4. The content of the register AMN, that is, the minimum diaphragm aperture value is subtracted from Acc 42b, and {(Avd − Avod) − (the minimum diaphragm aperture value) = 00010 − 00001 = 00001 } is carried out, then the result of said calculation is transmitted to the computation result judging circuit 51 and it is identified whether or not a unit borrow signal is generated. In this case the unit borrow signal is not generated as shown in Step 9 of Table 2, the above mentioned minimum diaphragm aperture value is added to the Acc 42b and the diaphragm aperture value Avd is registered again at the Acc 42b. (Refer to Step 10 of Table 2). Next the content of the switch AMX, that is, the maximum diaphragm aperture value is subtracted from Acc 42b and the above mentioned diaphragm aperture value Avd is identified again. Step 11 of the Table 2 shows the result of identification when the maximum diaphragm aperture value is made to be F = 16. And in this case F = 16 means that the number of stopping down steps from the fully open diaphagm aperture value F = 1.4 to F = 16, that is, 00111 is supplied to the switch AMX, therefore the calculation of 00010 − 00111 = 11011 is done in the arithmetic device 42, and in this case, as the unit borrow signal is generated the calculation jumps to the step 12 of FIG. 6(b) and the maximum diaphragm aperture value (00111) is added to the content of Acc 42b and the diaphragm aperture value Avd is registered at Acc 42b and at the same time is stored in the register APR. (Refer to Steps 12, 13 in the Table 2). After that the fully open diaphragm aperture value OPF (00001) is added to the Acc 42b. Therefore the content of the Acc 42b becomes (00010 + 00001 = 00011). Said content of the Acc 42b is transmitted to the indicator ABD and indicated there. Diaphragm aperture is determined based on the above mentioned aperture value Avd = 00010 as mentioned above and exposure is done for the shutter time of Tvd = 01011, thus appropriate exposure can be obtained.

And in the present invention the number of stop down steps from the fully open diaphragm aperture value Avod (that is, F = 2.8) is stored in the register APR, and when said appropriate aperture value is indicated the number of stop down steps from the aperture value F 1.0 (that is F = 2.8) is indicated by the indicator APD, therefore the operation of steps 14,15 in the Table 2 is done.

While the case of shutter speed preference photographing is explained above, as the cases of diaphragm aperture preference photographing, program photographing and manual photographing will have almost same operations, explanations on the operations in said three kinds of photographing modes will be omitted.

Figure 8:
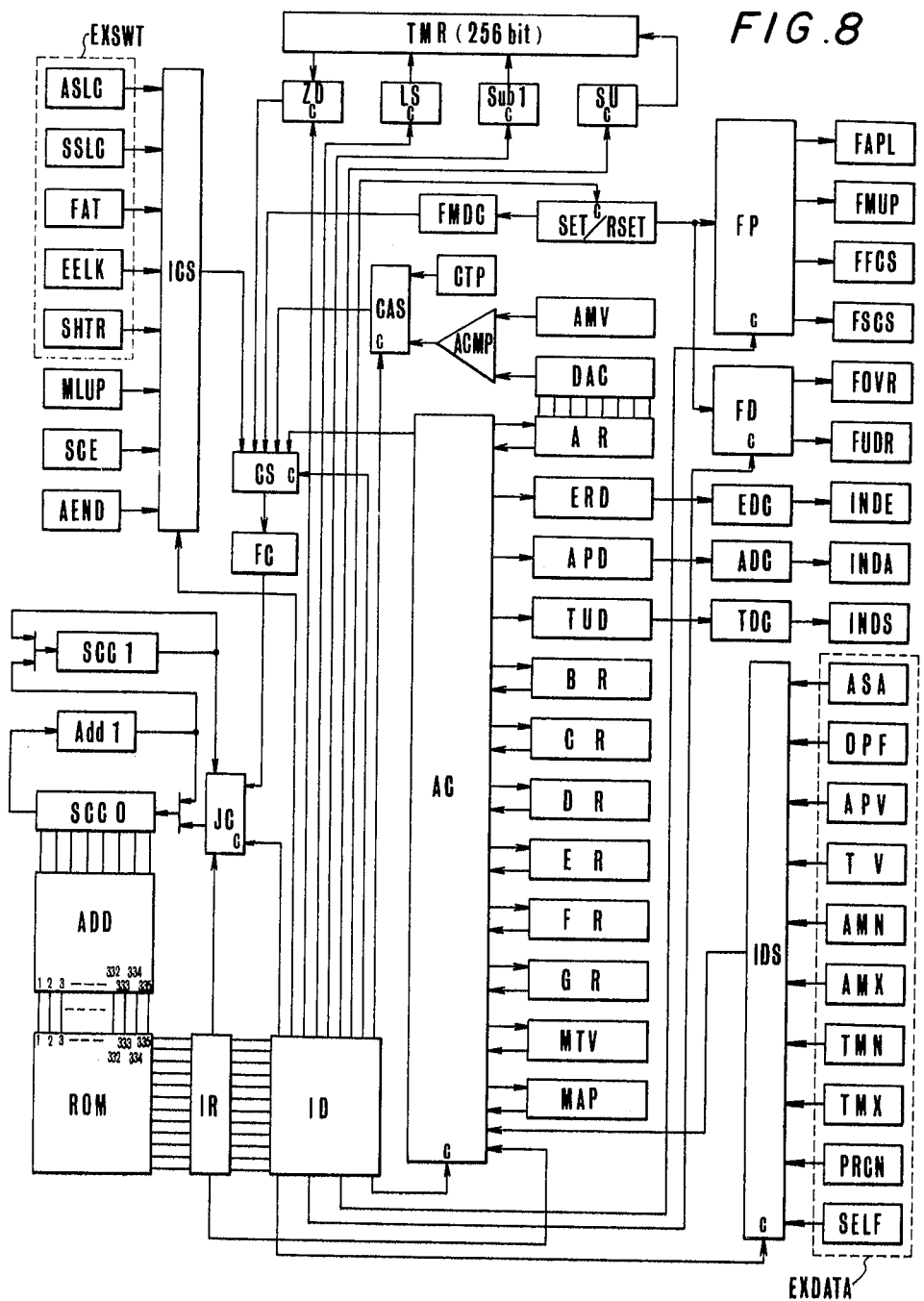
FIG. 8 is a block diagram of the single lens reflex camera shown in FIG. 1 to which another automatic exposure control device of the present invention is applied.

FIG. 8 is a block diagram of one example of a single lens reflex camera shown in FIG. 1 to which another automatic exposure control device of the present invention is applied. In this drawing EXSWT is a group of selection switches for various conditions. ASLC is a switch to show that diaphragm aperture value is set by the choice of a photographer, and constitutes a switching means to issue such signal output as showing the fact that "auto" by which diaphragm aperture value is automatically selected is not picked up, but the diaphragm aperture value is selected by the diaphragm ring 18 shown in FIG. 1.

SSLC is a switch to indicate that the exposure time is set by the choice of a photographer and constitutes a switching means to indicate that "auto" by which exposure time is automatically determined is not picked up by the shutter speed setting dial 24 of the camera shown in FIG. 1, instead exposure time is left to be selected.

FAT is a switch directly connected to the full automatic selection switch 30 of the camera shown in FIG. 1 and constitutes a switching means to issue signal output when the full automatic is selected.

EELK is a switch directly connected to the EE lock button 34 of the camera shown in FIG. 1 and constitutes a switching means to issue signal output when said button is pressed down.

SHTR is a switch directly connected to the shutter release button 16 of the camera shown in FIG. 1 and constitutes a switching means to issue signal output when said button is pressed down.

EXDATA is a data input means to input various data, and ASA is a means to input ASA sensitivity of a film used in digital value in an association with the ASA sensitivity input dial 10 of the camera shown in FIG. 1.

OPF is a means to take up into the main body 2 the fully open F-number of the lens used through a mechanical link mechanism or an electrical means and to input the value thereof in a digital manner when the lens unit 4 is mounted to the main body 2, in the camera shown in FIG. 1.

APV is a means to take in the diaphragm aperture value in digital manner when the aperture value is set by the diaphragm ring 18 in the camera shown in FIG. 1.

TV is a means to take in exposure time in digital manner when the exposure time is set by the shutter speed setting dial 24 in the camera shown in FIG. 1.

AMN is a means to set the minimum diaphragm aperture value in digital manner for restricting the diaphragm aperture value less than a predetermined level by the choice of a photographer when the diaphragm aperture value is automatically computed in an association with the minimum diaphragm aperture value setting knob 22 of the diaphragm ring 18 of the camera shown in FIG. 1.

AMX is a means to set the maximum diaphragm aperture value in digital manner for restricting the diaphragm aperture value more than a prescribed level by the choice of a photographer when the diaphragm aperture value is automatically computed in an association with the maximum diaphragm aperture value setting lever 20 of the diaphragm ring 18 of the camera shown in FIG. 1.

TMN is a means to set the minimum exposure time in digital manner for restricting such exposure time as longer than a prescribed exposure time that is, being less than the predetermined level in apex value by the choice of a photographer when the exposure time is automatically computed in an association with the minimum shutter speed setting knob 28 of the exposure time setting dial 24 of the camera shown in FIG. 1.

TMX is a means to set the maximum exposure time in digital manner for restricting such exposure time as being shorter than a prescribed exposure time that is, such exposure time being more than a predetermined level in apex value by the choice of a photographer when the exposure time is automatically computed in an association with the maximum shutter speed setting knob 26 of the shutter speed setting means 24 of the camera shown in FIG. 1.

PRCN is a means to input and set the program constant, in digital manner, for conducting program photographing in an association with the program constant setting means of the camera shown in FIG. 1.

SELF is a means to input and set the self timer time in a digital manner for operating a self timer in an association with the self timer time setting means 36 of the camera shown in FIG. 1.

The above mentioned various data are handled in digital values of 8 bits with binary system, being specially coded as will be described below.

Also FP is a means to select and control a flip-flop to control various mechanical operations, for example, an electro-magnetic driving device.

FAPL is a flip-flop for controlling the diaphragm driving device, being provided to conduct stop down of the lens device 4 in the camera shown in FIG. 1 and being so composed as initiating lens stop down operation at the time of signal input and stopping the stop down operation at the time of signal stop. FMUP is a flip-flop for controlling the mirror driving device, being provided to push up a mirror for swing up which is not shown in the drawing but is housed in the main body of the camera shown in FIG. 1, and being so composed as initiating mirror up operation at the time of signal input and stopping mirror up operation at the time of signal stop.

FFCS is a flip-flop to drive a plunger to start a shutter leading curtain of focal plane type, not being shown in the drawing but is housed in the main body 2 of the camera shown in FIG. 1.

FSCS is a flip-flop to drive a plunger for starting shutter trailing curtain of a focal plane system shown in FIG. 1.

AEND is a means to detect that the lens diaphragm aperture value being stopped down by the above mentioned control means FAPL becomes the maximum diaphragm aperture value of said lens.

MLUP is a means to detect that the push up of the mirror for swing up which is pushed up by the above mentioned control means FMUP is completed.

SCE is a means to detect that the shutter trailing curtain which is started by the above mentioned control means FSCS completed its running.

FD is a means to select and control the flip-flops FOVR, FUDR for controlling various indications.

FUDR is a flip-flop to drive a lamp which is lighted in the case of underexposure when calculation is performed from the set photographing information.

FOVR is a flip-flop to drive a lamp which is lighted in the case of overexposure when calculation is performed from the set photographing information.

The above mentioned lamps can be directly seen through the finder of camera shown in FIG. 1.

AMU is a conventionally known photo-sensing circuit provided within the main body 2 of the camera shown in FIG. 1 and is so composed that the object light being incident on the circle of the main body 2 through the lens device 4 is outputted in a logarithmically compressed value after converting the same into electric signal.

AC is an calculation control circuit and is connected to the main register AR, general purpose registers BR, CR, DR, ER, FR, GR, the indication register ERD for indicating step number in error from the appropriate exposure when diaphragm aperture and shutter speed are set manually, aperture value indication register APD for indicating diaphragm aperture value which has been set or obtained as a result of arithmetic, a shutter speed indication register TVD for indicating the shutter speed which has been set or obtained as a result of arithmetic, a register MTV for controlling shutter speed to memorize the finally obtained exposure time, and a diaphragm aperture value control register MAP to set the stop down step number of the lens used against the finally obtained diaphragm aperture value.

DAC is a digital-analogue converter to convert the data memorized in the above mentioned main register AR to analogue volume.

ACMP is an analogue comparator to compare the output of the AMV of the above mentioned photo-sensing circuit and the output of the ditigal analogue converter DAC and when the data of the main register AR is larger than the output of the above mentioned digital-analogue converter DAC to generate such signal output as indicating the same.

CTP is a reference pulse generator which generates the reference pulse for conducting the actual time counting by the shutter speed data and to count self timer time.

CAS is a select gate to select the output of the above mentioned analogue comparator ACMP and the reference pulse generator CTP.

ICS is a select gate to select the output of the selection switch group EXSWT and the output of each of the mirror up completion detection switch MLUP, the trailing curtain running completion detection switch SCE, etc.

IDS is a select gate to select various data, from the data input means EXDATA.

EDC is an indication decoder to decode the output of the above mentioned error step number indication register ERD for indicating the same in the error step number indication device INDE after converting the same from mechanical code to actual figure.

ADC is an indication decoder to decode the output of the above mentioned diaphragm aperture value indication register APD for indicating it in the diaphragm aperture indication device INDA after converting the same from mechanical code to practical figure.

FDC is an indication decoder to decode the output of the above mentioned shutter speed indication register TUD for indicating it at the shutter speed indication device INDS after converting the same from mechanical code to actual figure.

SET/RSET is a flip-flop control means applied for control of the selection control means FP and FD for flip-flop and applied for control of a mode conversion flip-flop FMDC which conducts conversion of mode from shutter time preference mode to diaphragm aperture preference mode or, in reverse thereto, from diaphragm aperture preference mode to shutter time preference mode when the full automatic selection switch FAT is selected and appropriate exposure can not be obtained by the set photographing information.

TMR is a timer register to memorize the exposure time or self time, which has been set or obtained as arithmetic result being given in logarithmically compressed figure, in the figure extended to actual time, and at the same time, to count actual exposure time or self time by the reference time pulse.

SU is a set up circuit to set up "1" in the least significant bit of the above mentioned timer register TMR.

LS is a left shift circuit to conduct index extension virtually by left shifting "1" set up at the least significant bit (unit) of the timer register TMR by the above mentioned set up circuit according to the exposure time data or the self time data memorized by logarithmically compressed data.

Sub 1 is a subtraction circuit to virtually conduct time counting by conducting subtraction one by one in synchronism with the pulse from the reference time pulse generator CTP against the exposure time or the self time memorized in the data being extended to actual time at the above mentioned timer register TMR.

ZD is a zero detection circuit to detect the virtual completion of the time counting of the exposure time of self time by detecting that the content of the above mentioned timer register TMR becomes "zero" and generating signal output, as a result of the above subtraction.

And, CS is a sensing gate to selectively sense the state of the output signal of the above mentioned select gates ICS, CAS, the zero detection circuit ZD, the mode conversion flip-flop FMDC, and the arithmetic circuit AC.

SCC0 is a sequence control counter to control each of the above mentioned elements and to appoint the address of the control step to proceed the exposure control function in turn.

Add 1 is an addition circuit to add "1" to the above mentioned address appointed by the sequence control counter SCC0 for proceeding the control step by one step.

SCC 1 is an auxiliary sequence control counter which temporarily memorizes the address one step after the address of the above mentioned SCC0.

ADD is an address decoder to decode the address appointed by the above mentioned sequence control counter SCC0 and to give the address appointing signal to the ROM (read only memory) to be described later.

ROM is a read only memory which has 220 pieces of instruction step from "000" address to "333" address in octal digit as the address and outputs for each address, the instruction and performance location, data and the address to which jump is to be made.

IR is an instruction register which temporarily memorizes the output of the above mentioned ROM, holding the instruction contained therein, and transmits the constant data to the arithmetic circuit AC, further transmits the address to which jump is made to the jump control circuit JC to be described later.

ID is an instruction decoder to give the control signal, according to the content of instruction of the above mentioned instruction register IR, to control input terminals C of the arithmetic circuit AC, the flip-flop control circuits FP, FD, the flip-flop control circuit SET/RSET, the set-up circuit SU, the subtraction circuit Sub 1, the left-shift circuit LS, the zero detection circuit ZD, the select gates ICS, IDS, CAS, the sensing gate CS and the jump control circuit JC.

JC is a jump control circuit which inputs the address, to which jump is made from the instruction register IR, to the above mentioned sequence control counter SCC0 at the time of jump, and reads out the address one step after the address before jump from the auxiliary sequence control counter SCC1 and inputs the same into the sequence control counter SCC0.

FC is a conditional flip-flop which is set or reset according to the signal from the above mentioned sensing gate CS and inputs the conditional signal to the above mentioned jump control circuit JC.

Figure 9:
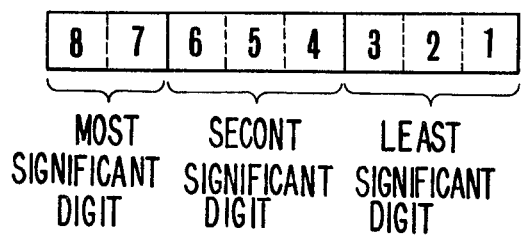
FIG. 9 is an arrangement drawing of a sequence control counter SCCO and an auxiliary sequence control counter SSC1 shown in FIG. 8.

FIG. 9 is a composition drawing of the sequence control counter SCC0 and the auxiliary sequence control counter SCC1, wherein said counter is composed of 8 bits of 1 to 8 and is so arranged as composing the figure of 3 digits which have the bits of 1 - 3 at its least significant digit and the bits 4 - 6 at the second significant digit and the bits of 7, 8 at its most significant digit and said counter can appoint (designate) 256 pieces of addresses in octal notation system from "$000_8$" address to "$377_8$" address.

And the main register AR, the general purpose registers BR, CR, DR, ER, FR, GR, the indication registers ERD, APD, TUD, the diaphragm aperture value memory MAP, and the exposure time memory MTV also have the composition similar to that of the above mentioned sequence control counter SCC0 and is so made as can memorize the digital data in octal notation system from "$000_8$" to "$377_8$".

Figure 10:
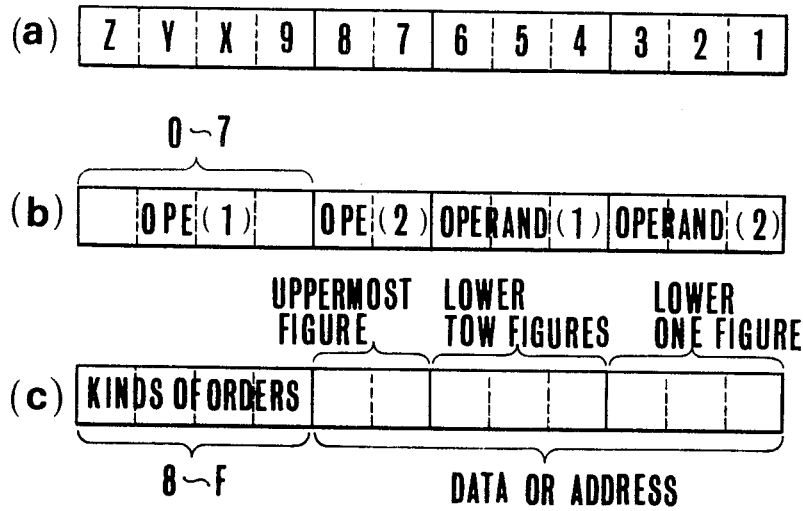
FIG. 10 is an arrangement drawing of an instruction register IR shown in FIG. 8.

FIG. 10 is an arrangement drawing of the instruction register IR, which is so made that said register is made of 12 bits of 1 to 9 and X to Z as shown in FIG. 10(a), and when the sexadecimal digits shown by the 4 bits of 9 X Y Z are at "0" to "7", the instruction register IR is at the arithmetic control mode, and as shown in FIG. 10(b), the kinds of OPI and OPII of the arithmetic control instruction are expressed by sexadecimal notation digits indicated by the bits 9 X Y Z and base-4 system digits indicated by 2 bits of 7, 8, while appointment of approximate OPERAND I is done by octal notation digits indicated by 3 bits of 4 to 6, and the appointment of final OPERAND II is done by octal notation digits indicated by 3 bits of 1 to 3.

Said register is also so composed that when the sexadecimal digits indicated by 4 bits of 9 X Y Z are at "8", "9", "A to F", the instruction register IR is at immediate or jump mode, and the kind of instruction is expressed by the sexdadecimal digits indicated by 4 bits of 9 X Y Z as shown in FIG. 10(c), while the octal notation digits in 3 bits from "$000_8$" to "$377_8$" having the octal notation digits shown by 3 of 1 to 3 at its least significant digit, the octal notation digits shown by 3 bits of 4 to 6 at its lower two places and base-4 system digits shown by 2 unit figures of 7 - 8 at its highest place are used as figure data in the case of immediate and as the address to which jump is made in the case of jump.

In this example, all data information accompanying with the exposure control is so arranged as handled in digital amount, and all information data concerning photographing such as object brightness, film sensitivity, shutter speed, diaphragm aperture value, fully open aperture value of lens used, number of stop down steps from fully open state of lens, and self-timer time, etc. are defined in correspondence with the octal notation digits in 3 unit figures from "$000_8$" to "$377_8$" provided the weight of "$\frac{1}{8}$" at the lowest place being composed of bits, 1 to 3 in the register shown in FIG. 8, and the weight of "1" in the lower two places being composed of bits, 4 to 6 in the same, further with the weight of "8" at the highest place being composed of bits, 7 to 8 in the same. And the absolute value and apex equivalent value, etc. of each data is related with the above mentioned figure codes as shown in the Table of FIG. 11. Also in this example the object brightness, film sensitivity, shutter speed, diaphragm aperture value, and fully open aperture value, etc. are all handled in apex value and are so arranged that the arithmetic for exposure control can be done only by addition and subtraction.

In FIG. 11 the object brightness $Bv$, film sensitivity $Sv$, and the shutter speed $Tv$, etc. will have such portions as being in minus in apex value, but for the convenience of arithmetics they are all defined in plus figures in the octal notation figure code, therefore in defining basic formula for exposure arithmetics with said octal system figure in apex value, it is necessary to add correction in the definition. Thus the following basic formula is defined:

$$Ev = Bv + Sv - \text{``}120_8\text{''} = Tv + Av \qquad (12)$$

In the above equation, "$120_8$" is the correction number mentioned above, being expressed with octal notation figure code, and $Ev$ is generally known exposure volume, while $Tv$ and $Av$ are apex equivalent values for such exposure time and aperture value, respectively, as satisfying said exposure volume.

The exposure control device in this example is controlled according to the above mentioned definition on the instruction and the data, and the control instruction is read out from the ROM to the instruction register IR according to the address designated by the sequence control counter SCC0 in the instruction codes mentioned above and said instruction codes are directly converted to such control signal as corresponding to each part of the device by the instruction decoder ID. When the above mentioned instruction codes contain the address or data to which jump is to be made, said address or data is led directly from the above mentioned instruction register IR to the jump controller JC or the arithmetic circuit AC. ROM has an instruction system designated by 220 addresses and is so composed as outputting in a designated sequence such instructions as designated by the addresses from "000" to "333" in octal notation code.

Now, before explaining the function of the exposure control device of the present invention shown in FIG. 8, an outline of the method of arithmetic process of various data and information provided for photographing will be described below.

Since the photo-sensing information in conducting exposure control is obtained by logarithmically compressing the output of a light receiving element not being shown in the drawing from the photo-sensing circuit AMV it is provided as an analogue value equivalent to the apex. While this photo-sensing information is converted into a digital amount according to the routine described below, the value thereof is expressed as $Bvo$.

Since TTL fully open photo-sensing is done for the actual object brightness $Bv$, the above mentioned $Bv_o$ will become such smaller value as containing the error corresponding to the lens curvature error $Avc$ from the fully open diaphragm aperture value or the diaphragm aperture value at the time of photosensing of the photographing lens used. Therefore actual object brightness $Bv$ is expressed by the following equation:

$$Bv = Bvo + Avo + \qquad (13)$$

Now, from the equations (12) and (13) the following equation is obtained.

$$Ev = Bvo + Avo + Avc + Sv - 120_8 = Tv + Av \qquad (14)$$

The above mentioned curvature error $Avc$ is the difference between the amount of light $Bv - Avo$ which can be theoretically obtained on the light receiving plane and the actual amount of light received $Bvo$, when the actual object brightness $Bv$ is sensed with fully open aperture with the lens having fully open aperture value $Avo$, and various factors can be conceivable as the reason therefor.

Since the present example is not to pursuit the reason for said curvature particularly, the discussion herein will be limited to the curvature error $Avc$ caused by the fully-open diaphragm aperture value of a lens or the diaphragm aperture value at the time of photosensing which constitute practical problem, and countermeasure therefor will be discussed while the error caused by other factors will be disregarded.

Therefore in this example all arithmetic control is done, without any respect to the focal length and kind of lens, and as shown in FIG. 12 disregarding the effect an of the Avc when the fully open aperture value of the lens or aperture value at the time of photo-sensing is F 4 or higher, and, when the same is lower than F4 based on as assumption that Avc is such value as being added on the brightness Bvo at the light receiving plane as the correction volume of ¼ step each, as the value thereof becomes smaller from F-4 one step by one step. Thus, when the fully open aperture value of a lens or the aperture value at the time of photo-sensing is F-4 or higher, $Avc$ is regarded as "0".

The exposure volume $Ev$ is obtained by adding the fully open aperture value $Avo$ of the lens and the curvature error $Avc$ to the photo-sensed value $Bvo$ obtained as a result of photo-sensing as mentioned above, and now the arithmetic process for each information will be described for each photographing system.

Now, when the shutter speed $Tv$ is selected beforehand by the choice of a photographer, the aperture value $Av$ for obtaining appropriate exposure from the relationship equation obtained from the equation (14) can be easily obtained by subtracting the shutter speed $Tv$ from the exposure volume $Ev$. While the maximum value AMX and the minimum value AMN are set up for the diaphragm aperture value $Av$ in selection and setting up of the shutter speed $Tv$, when the diaphragm aperture value $Av$ obtained as a result of arithmetic is greater than the above mentioned maximum aperture value AMX or smaller than the minimum aperture value AMN, it is necessary to conduct judgement for overexposure or underexposure. Also in the event the full automatic photographing mode is selected, such shutter speed $Tv$ and the diaphragm aperture value $Av$ can be obtained that the appropriate exposure can be finally obtained by conducting so-called mode conversion from shutter time preference to the diaphragm aperture preference wherein such shutter speed $Tv$ is re-set as necessary for obtaining appropriate exposure from the equation (3) by setting up the maximum aperture value AMX in the case of overexposure newly as the diaphragm aperture value $Av$ or the minimum aperture value AMN in the case of underexposure.

Also when the diaphragm aperture value $Av$ is selected beforehand by the choice of a photographer, the shutter speed $Tv$ for obtaining appropriate exposure from the relationship equation obtained from the equation (4) can be easily obtained by subtracting the diaphragm aperture value $Av$ from the exposure volume $Ev$. While the maximum value TMX and the minimum value TMN are set up for the shutter speed Tv against the selection and the setting up of diaphragm aperture value Av, when the shutter speed Tv obtained as a result of arithmetic is higher than the above mentioned maximum speed TMX or lower than the minimum shutter speed TMN, it is necessary to conduct judgement for overexposure or underexposure.

When the full automatic photographing mode is selected, such shutter speed Tv and diaphragm aperture value Av as obtaining appropriate exposure finally can be obtained by conducting so-called mode conversion from diaphragm aperture preference to shutter speed preference, wherein re-setting of such aperture value Av as necessary for obtaining appropriate exposure from the equation (14) newly by setting up newly the maximum shutter speed as the shutter speed Tv in the case of overexposure, and the minimum shutter speed newly as the shutter speed Tv in case of underexposure.

Next, when both the diaphragm aperture value Av and the shutter speed Tv are selected as the choice of a photographer, the device becomes manual mode, and in the event when the right side and the left side of the equation (14) are compared and the (Tv + Av) in the right side is greater than the Ev in the left side the judgement as underexposure is made while the judgement as overexposure is made when, contrary to above, the (Tv + Av) in the right side is smaller than the Ev in left side and at the same time computing the difference between Ev and (Tv + Avs), thereby the error step number of the diaphragm aperture value and exposure time for obtaining appropriate exposure against the set aperture value Av and shutter speed Tv can be obtained. Therefore in the manual mode a photographer can select appropriate exposure by re-setting one or both of the diaphragm aperture value and/or shutter speed with correction by as much step number as the error.

Figure 13:
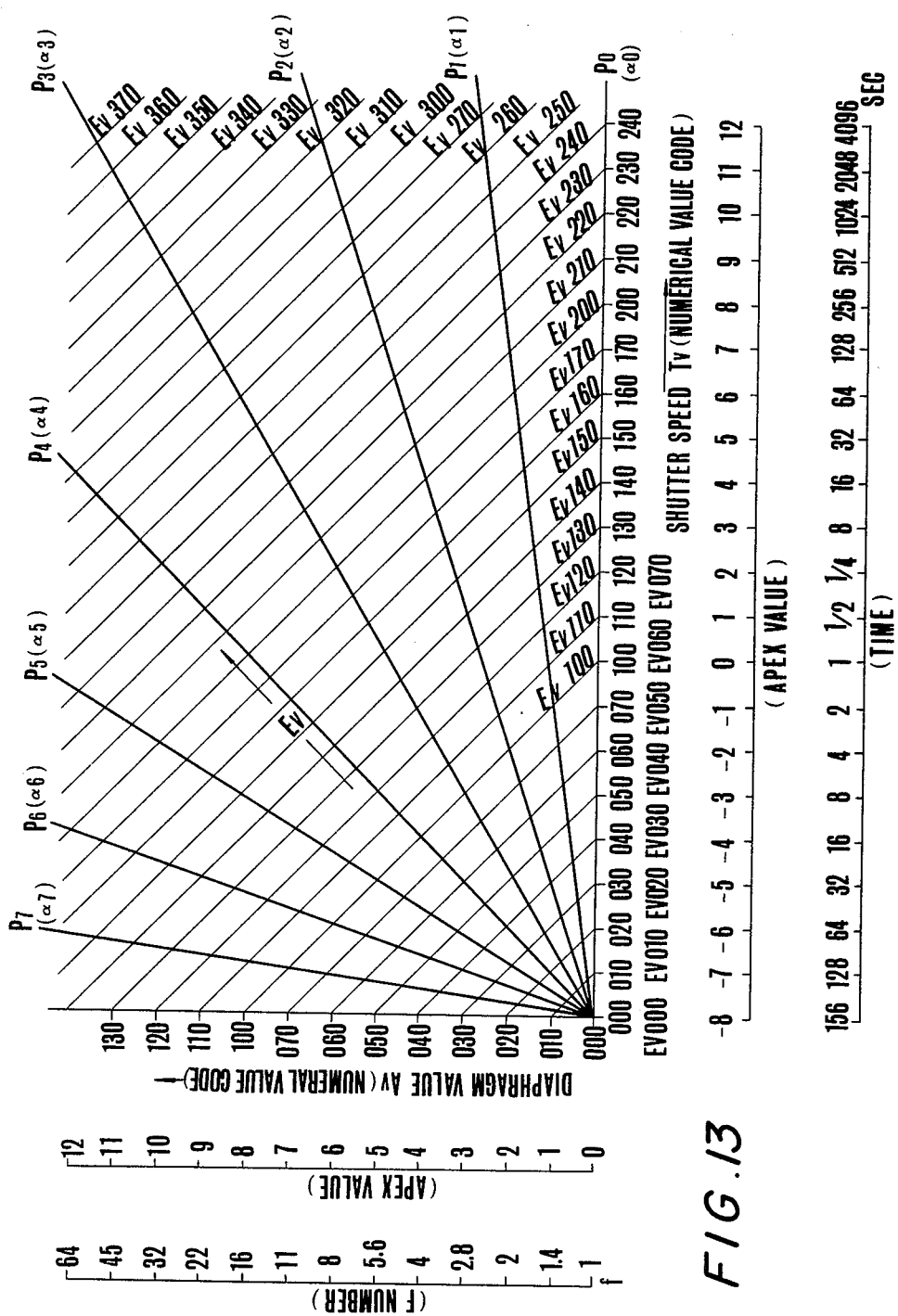
FIG. 13 is a functional schematic drawing to explain the program photographing function of the device shown in FIG. 8.
Figure 15D:
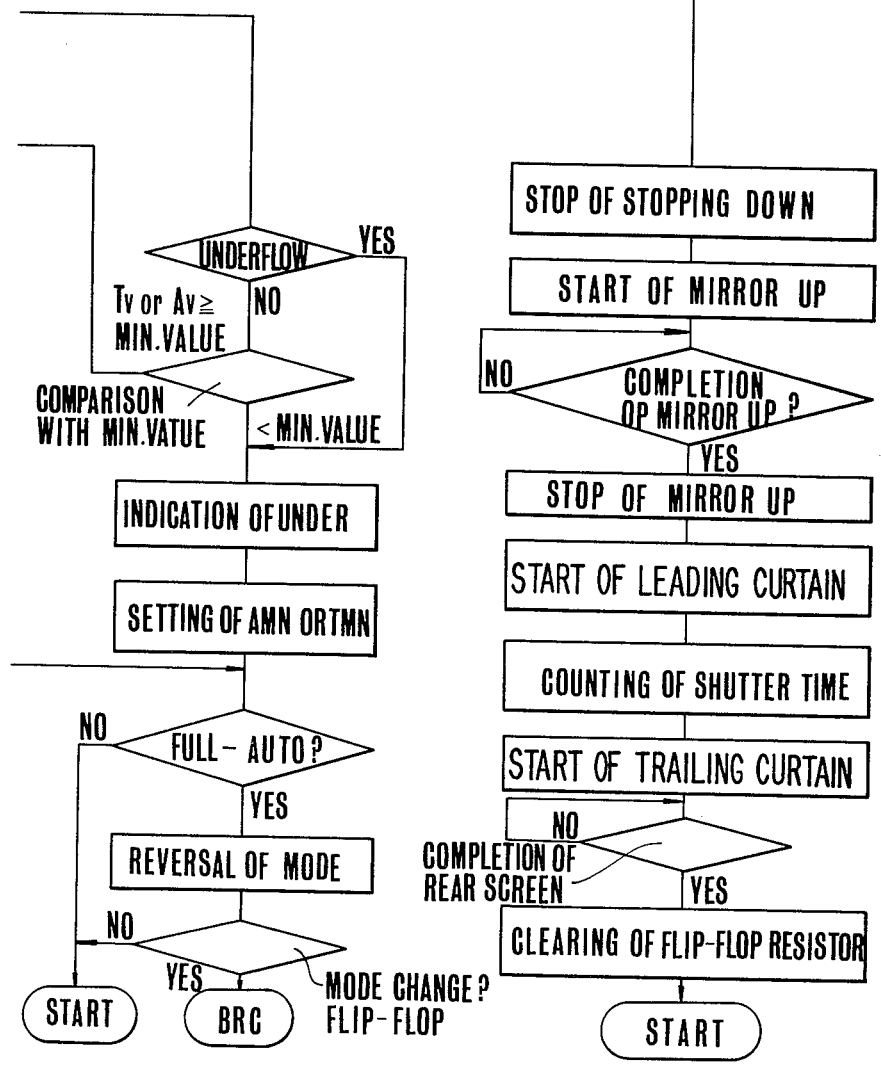
Figure 18B:
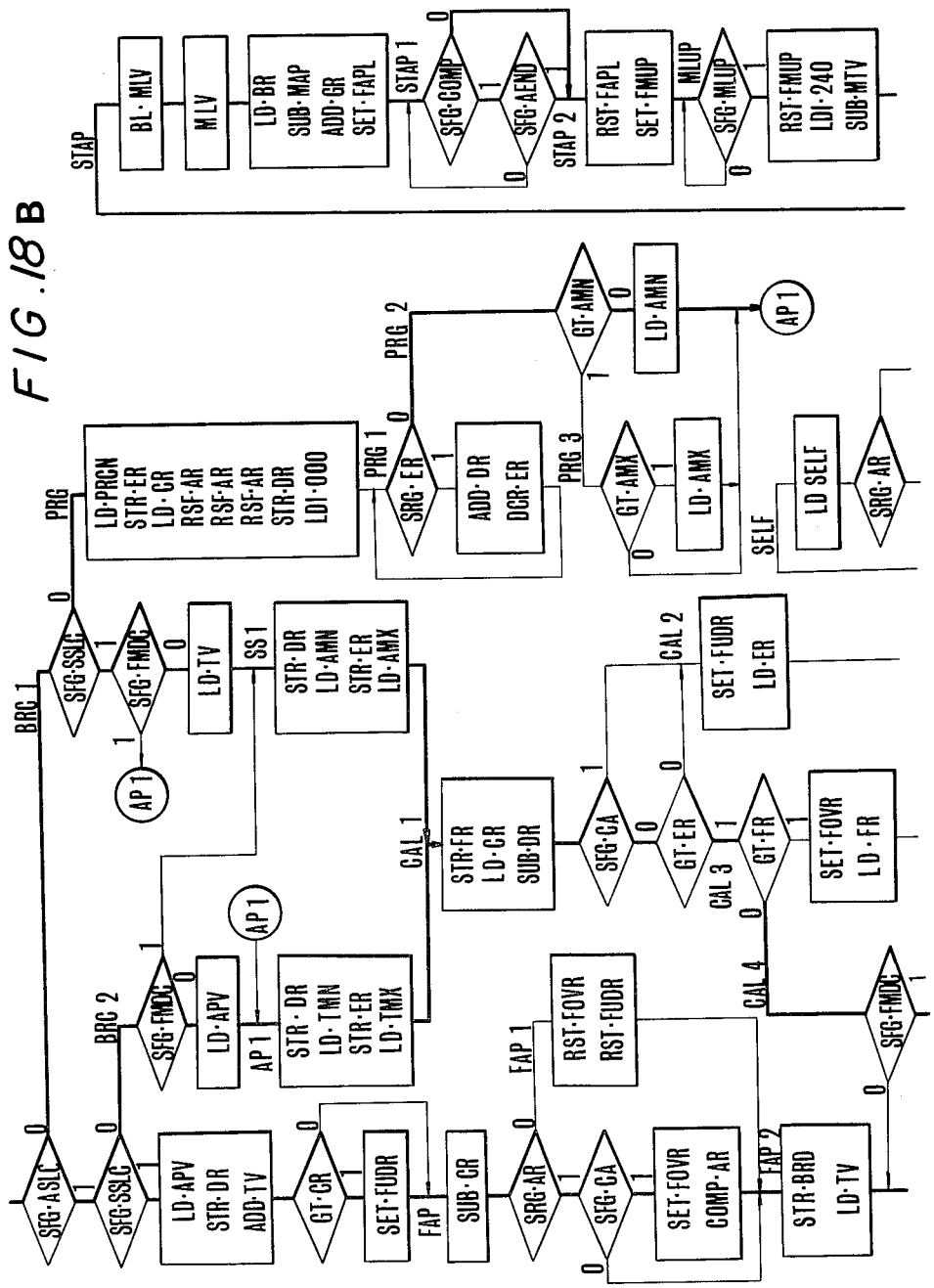
Figure 18A:
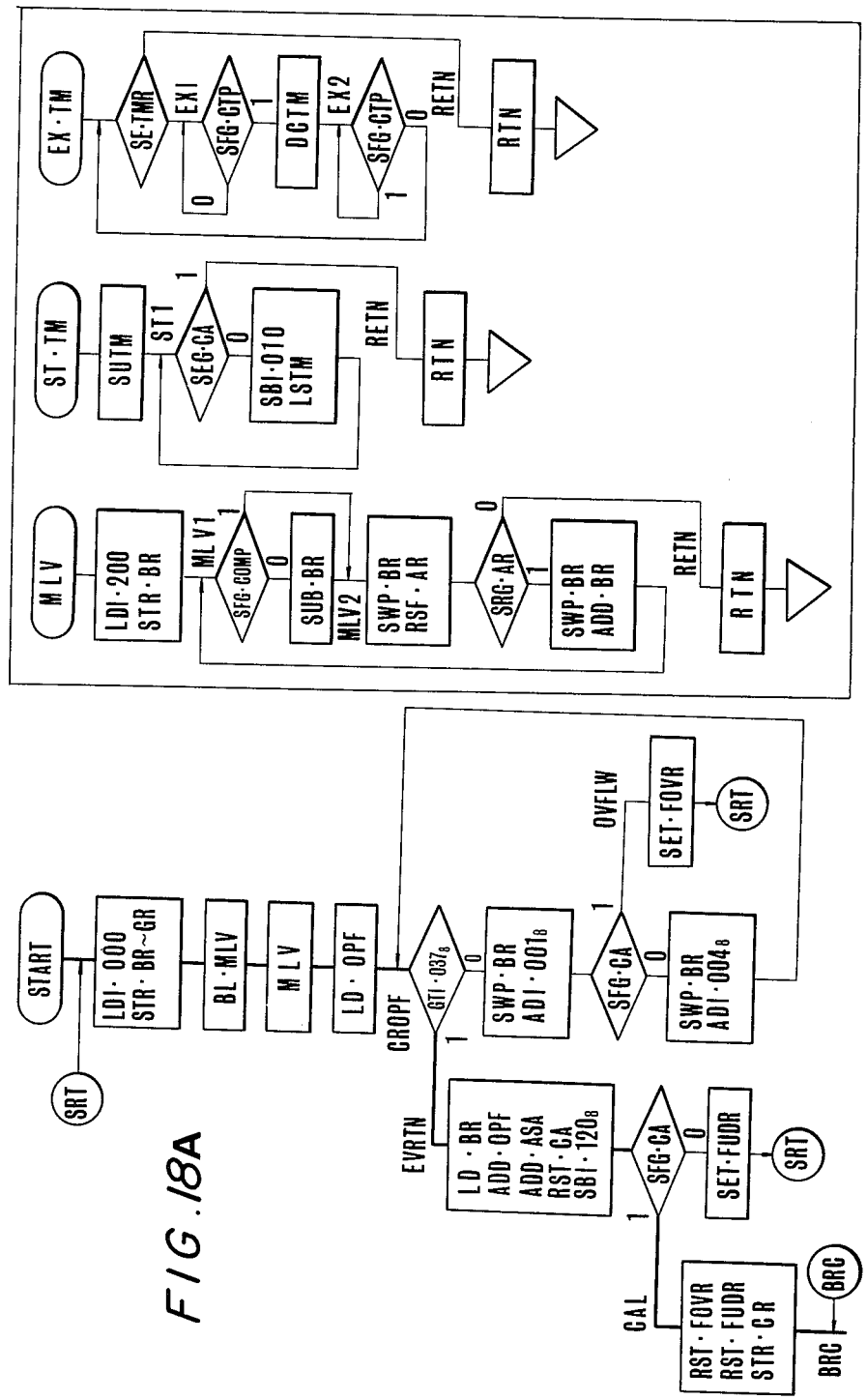
Figure 18C:
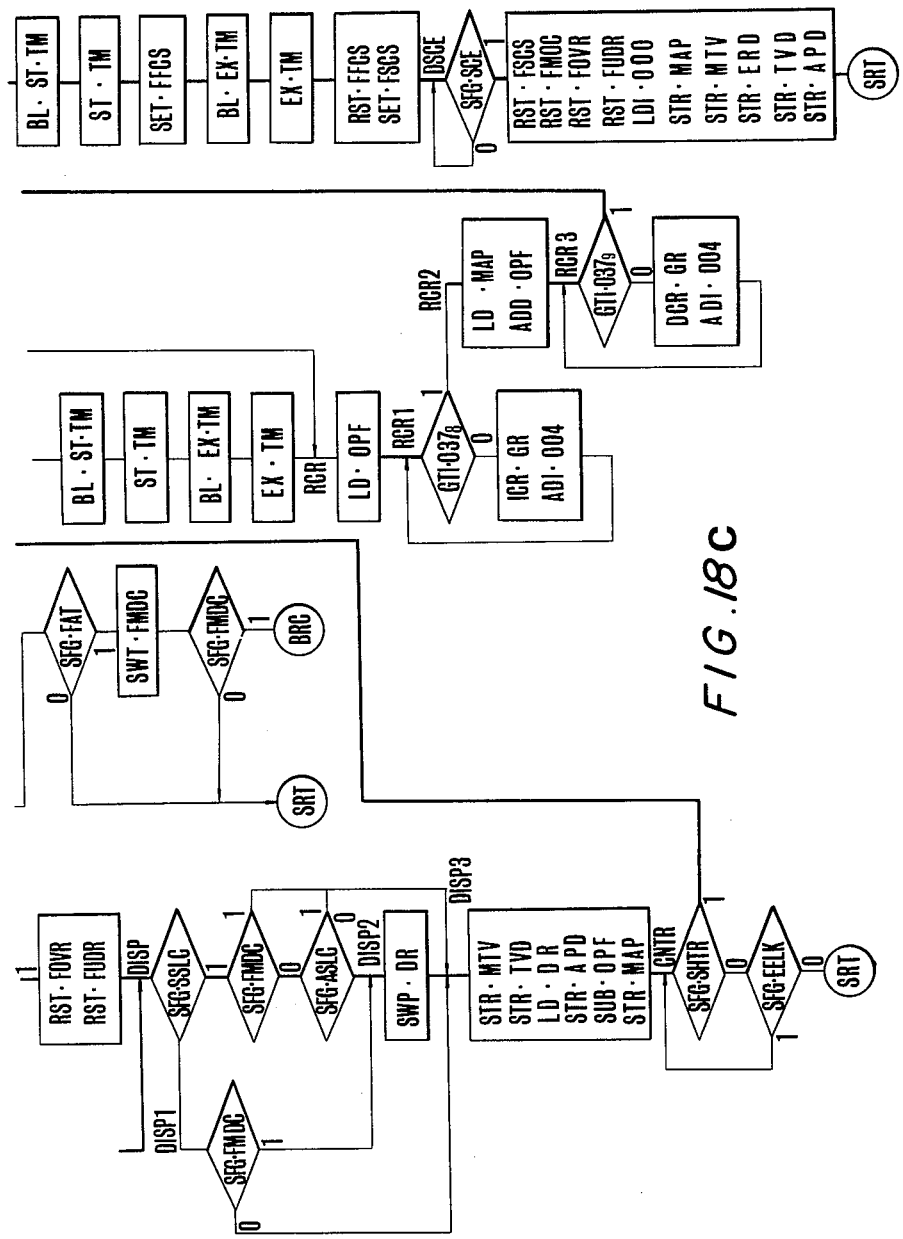

When any specific figures are not set up for the stop own step number and the shutter speed by the choice of a photographer, the device becomes program mode. While the program photographing is to obtain appropriate exposure finally by automatic selection of predetermined combination of the diaphragm aperture value and the shutter speed of the photographing lens as a result of computing the object brightness and the film sensitivity, the method of said arithmetic will be explained below with reference to FIG. 13. In said drawing the axis of abscissa shows shutter speed Tv while the axis of ordinate shows diaphragm aperture value Av. Since the Tv value equivalent to the apex ranges from the figure code "000" to "240" as shown in the code Table of FIG. 11, the origin of the axis of abscissa is placed on "000" in figure code that is the point of "−8" in the apex value for conducting practical arithmetics. Also the exposure volume Ev is shown as such an even Ev line that the points at which the sum of the aperture value Av and the shutter speed Tv in number codes becomes equal are connected together, in the range of Ev $000_8$ to Ev $370_8$. Said even Ev line has its position determined by the size of the exposure volume Ev obtained from the photo-sensed information. In the diagram $P_0$ to $P_7$ indicates a straight line with an inclination $\alpha_0$ to $\alpha_7$ and said straight line defines $$Av = \alpha_n Tv \tag{15}$$

in the figure code. Also since the relationship expressed by the equation
$$Tv = Ev - Av \tag{16}$$

can be obtained from the equation (14), the following relation equations can be obtained from the equations (15), (16):

$$Av = \frac{\alpha_n}{1 + \alpha_n} Ev \tag{17}$$

$$Tv = \frac{1}{1 + \alpha_n} Ev \tag{18}$$

Therefore a predetermined combination of the diaphragm aperture value Av and the shutter time Tv can be obtained against the exposure volume Ev obtained from the photo-sensed data by suitably setting up $\alpha_n$. Also in this example the inclination $\alpha_0$ to $\alpha_7$ of each straight line $P_0$ to $P_7$ are given at 0, 1/7, 1/3, 3/5, 1, 5/3, 3, 7, respectively by selecting the value equivalent to $$\frac{8 \alpha_n}{1 + \alpha_n}$$

by the program constant input means PRCN as the program constant in the integral numbers from 0 to 7, therefore the choice by a photographer can be introduced to some extent in a program photographing by providing variation in the combination of the diaphragm aperture value Av and the shutter speed Tv.

Now, when the program constant is represented by PCN and the following equation is set:

$$PCN = \frac{8 \alpha_n}{1 + \alpha_n} \tag{19}$$

the determination of stop down step number can be made by conducting the following arithmetic:

$$Av = PCN \cdot (Ev/8) \tag{20}$$

While in the above whether thus determined stop down step number Avs is between the maximum aperture value AMX and the minimum aperture value AMN set up by a photographer or not is the most important subject, when the diaphragm aperture value Av obtained as a result of arithmetic exceeds the maximum diaphragm aperture value AMX, the latter is substituted into the equation (16) as the determined diaphragm aperture value Av and substitute the minimum stop down step number AMN Into said equation (16) when the diaphragm aperture value Av obtained as a result of arithmetic is lower than the minimum diaphragm value AMN, thereby the shutter speed Tv for obtaining appropriate exposure can be obtained. While the maximum value and the minimum value are set up for shutter speed Tv, when the shutter speed Tv obtained as a result of arithmetic is not within the set maximum shutter speed TMX and the minimum shutter speed TMN, naturally photographing with appropriate exposure can not be done.

Diaphragm aperture value Av and shutter speed Tv being necessary for obtaining appropriate exposure can be determined finally through each mode mentioned above.

Since the stop down control system based on the stop down step number from the fully open value of the lens used to the required diaphragm aperture value is taken in the diaphragm aperture control in this example, the stop down step number Avs, obtained by subtracting the fully open aperture value A*vo* of the lens used from the diaphragm aperture value A*v* necessary to obtain the appropriate exposure in actual aperture control, is used.

Next, explanations will be made on the actual method of diaphragm aperture control and exposure time control according to the stop down step number A*vs* and shutter speed T*v* obtained as above.

In the exposure control device of this example so-called actual stop down control is done, that is, photo-sensing is done while actual stop down is done and stop down is stopped at the time when the amount of light received through the stopped down lens reaches the prescribed value, making a judgement that the prescribed stop down volume has been made, and such method allows to minimize the mechanical error in the stop down device being mechanically composed.

Since photo-sensing of the incident light is done through the stopped down lens device when actual diaphragm aperture control is done, naturally it is necessary to foresee the intensity of light at a light receiving plane at the time when it is actually stopped down as much as required stop down step number after making the correction of curvature error mentioned above is done.

Now, when the fully open diaphragm aperture value of the lens used is expressed by A*vo*, and the diaphragm aperture value at the time of stop down is expressed by A*v*, and the F-value of A*vo* and A*v* is 4 or higher naturally the curvature error is to be disregarded as mentioned previously and the correction is not necessary.

But, when the F-value of the fully open diaphragm aperture value A*vo* and the diaphragm value A*v* is smaller than 4, it is necessary to deem that the amount of light sensed through the lens contains the curvature error, therefore such necessity arises naturally to consider the curvature error.

Before starting actual diaphragm aperture control, the intensity of light received B*vo* at the time when photosensing is made at the fully open end of the photographing lens will be as shown in the following equation, when the curvature error at the time of fully open aperture is expressed by A*vc*:

$$, Bvo = Bv' - Avo - Avc \qquad (21)$$

In the above B*v*' is the object brightness at that time, and when EE lock is done, and so forth, there is such case that B*v*' takes the value different from the object brightness B*v* at the time of exposure arithmetic. Next, the intensity of light B*vo* at the light receiving plane, at the time when the photographing lens is actually stopped down to the aperture value A*v*, will be as shown below:

$$, Bvo' = Bv' - Av - Avc' \qquad (22)$$

In the above A*vc*' will be the amount of the curvature correction at the time of stop down. Therefore, the presumed value of the intensity of light B*vo*' at the light receiving plane, when actual stop down is made, is given by the following equation, from the equations (21), (22) and from the intensity of light B*vo* at the light receiving plane at the time of fully open aperture light sensing:

$$, Bvo' = Bvo + Avo + Avc - Av - Avc' = Bvo - Avs + Avc - Avc' \qquad (23)$$

The amount of correction A*vc* of curvature at fully open aperture and the amount of correction A*vc*' of curvature at the time of stop down will be "0" when the F-value in each case is $f_4$ or higher, and will be such correction amount as by ¼ step each for each stop down step difference to the aperture value $f_4$, when F-value is less than 4. Therefore they are expressed by:

$$Avc = \tfrac{1}{4}(Av_f = 4 - Avo) \text{ (wherein } Avo < Av5=4) \qquad (24)$$

$$Avc' = \tfrac{1}{4}(Av_f = 4 - Av) \text{ (wherein } Av < Av5=4) \qquad (25)$$

In the above A*v*5=4 is an apex equivalent value of F-value 4. Therefore, when the amount of light sensed B*vo*', at the time as stop down is actually made to the prescribed aperture value A*v* from the light sensed B*vo* at fully open aperture following the equation (23), is computed in presumption and photo-sensing is done while diaphragm is stopped down and the stop down operation is stopped when the intensity light at the light receiving plane becomes the above mentioned presumed value B*vo*', it means that the lens used is stopped down as much as the prescribed stop down step number.

Next, while it is necessary to control the shutter speed T*v*, the shutter speed T*v* is provided in a logarithmically compressed from against actual time as it is given in the apex equivalent value. Also as being apparent from the Code Table of FIG. 12 the shutter speed T*v* will be such that actual time becomes shorter as its figure code is greater. Therefore, in order to convert the shutter speed T*v* given in the figure code to actual time, the arithmetic procedure mentioned below will become necessary.

As shown in FIG. 12 the shortest shutter time one 4096th of a second is given by the figure code "240₈". Therefore by subtracting shutter speed T*v* from "240₈" the step number equivalent to apex value against the shortest exposure time of shutter speed T*v* can be obtained. Also since 240₈ − T*v* is the apex equivalent value, index expansion needs to be done for obtaining actual time, and the lowest place of the figure data expressed by octal notation number with 3 figures has virtually the weight of ⅛ only, the value of index expanded value will be $$2^{\left(\frac{240_8 - Tv}{10_8}\right)}$$

Therefore by computing the pulse of one 4096th of a second corresponding to the shortest shutter speed, which forms reference, for $$2^{\left(\frac{240_8 - Tv}{10_8}\right)}$$

times, actual shutter speed can be obtained.

Also since in this example such register as processing binary figures only in digital manner is used in the register for conducting index expansion, the step number of "1" or below in the apex value will be applied in stepped down manner.

Therefore the actual shutter speed T is expressed by:

$$T = \frac{1}{4096} \times 2^{\left[24_8 - \frac{Tv}{10_8}\right]} \qquad (26)$$

Since this example is so composed that in calculating $$\left[24_8 - \frac{Tv}{10_8}\right],$$

subtraction is repeatedly done by "010$_8$" in each time from "240$_8$" — Tv, so that the $$\left[24_8 - \frac{Tv}{10_8}\right]$$

is detected based on the calculation when carry is generated, the number n actually calculated becomes $$\left[24_8 - \frac{Tv}{10_8}\right] + 1.$$

Therefore, actual time of shutter speed can be obtained by conducting such arithmetic control as:

$$T = \frac{1}{4096} \times 2^{n-1} = \frac{2^n}{8092} \qquad (27)$$

While the exposure control device in this example is so composed that appropriate exposure is provided to the film surface finally through the above mentioned arithmetics, its exposure control function will be explained below in detail.

Figure 15:
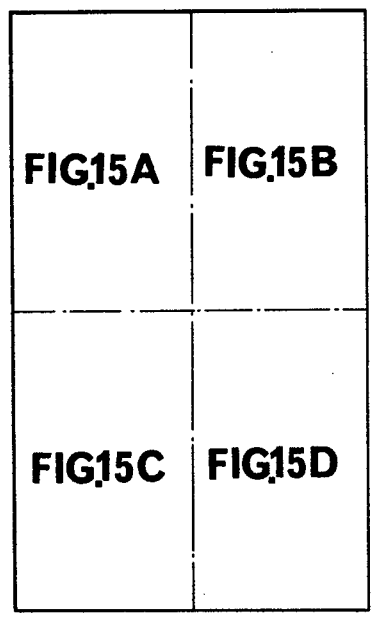
FIG. 15 is a calculating flow chart of the device shown in FIG. 8.

FIG. 14 shows a schematic drawing to show a transmission system among an object with various data and control signals, the lens device, the camera main body, and a photographer in the exposure control device of this example, and FIG. 15 is an arithmetic flow chart in the exposure control device of this example.

First, in photographing it is necessary to mount such lens device 4 as suitable for obtaining desired angle of field (picture angle) against the intended object. And at this time it becomes possible to take in from the lens device 4 the fully open aperture value Avo data thereof into the main body 2 side as required. Next a photographer is to input such information as aperture value Av, shutter speed Tv, film sensitivity Sv, program constant PCN, etc. into the camera main body 2 according to its picture making intension, and first the ASA sensitivity Sv of film is inputted through the ASA sensitivity input dial 10 after considering the sensitivity of film used and such processing method as intensifying and desensitizing exposed film, etc. Next, when exposure control is to be done determining aperture value preferentially (that is, in the case of so-called diaphragm aperture preference photographing), the desired aperture value Av is set through the diaphragm ring 18, and at the same time when the maximum shutter speed TMX and the minimum shutter speed TMN are set through the maximum shutter speed setting knob 26 and the minimum shutter speed setting knob 28 then the shutter speed is determined preferentially for conducting exposure control, that is, in the case of so-called shutter time preference photographing, the desired shutter speed Tv is set through the shutter speed setting dial 24 and at the same time the maximum aperture value AMX and the minimum aperture value AMN are set through the maximum aperture value setting knob 20 and the minimum aperture value setting knob 22. And when exposure control is done either with the diaphragm aperture value Av preference or with the shutter speed Tv preference, and appropriate exposure can not be obtained within the set conditions and yet appropriate exposure is desired to be obtained even modifying the diaphragm aperture value Av or the shutter speed Tv which has been preferentially set, the full automatic selection switch 30 is selected. And when the appropriate exposure is to be obtained without setting either diaphragm aperture value or shutter speed that is to conduct so-called program photographing both the diaphragm ring 18 and the shutter speed setting dial 24 are set at the position of "AUTO" without selecting specific value, and the maximum shutter speed TMX, the minimum shutter speed TMN, the maximum diaphragm aperture value AMX, and the minimum diaphragm aperture value AMN are inputted, further such program constant PCN as constituting an element to determine combination of the diaphragm aperture value Av and the shutter speed Tv as both of them are to be computed automatically. Also when both the diaphragm aperture value Av and the shutter speed Tv are to be determined by the choice of a photographer that is in the case when exposure control is, to be done in so-called manual mode, the desired diaphragm aperture value Av and the shutter speed Tv only are set through the diaphragm ring 18 and the shutter speed setting dial 24. As has been explained above After completing setting of various photographing conditions and data, each register is cleared by placing the exposure control device in operative state, thus the state ready for exposure control is obtained. Next, as a photographer point his camera to an object, the object brightness Bv is given by the object, and in conducting TTL photo-sensing, it is given to the light receiving element within the camera main body 2, being damped as much as the fully open diaphragm aperture value Avo and the curvature error Avc of the lens used, as such photo-sensed information as being Bvo ( = Bv — Avo — Avc + 120$_8$ ) in the apex. The above mentioned 120$_8$ is a correction number in octal (notation) number coding as mentioned above. Next judgement is made whether or not the F-number of the fully open diaphragm aperture value Avo of the lens used in "4" or more, and if it is "4" or more the curvature error Avc is regarded as "0" and is disregarded, and if it is less than 4, ¼ step correction amount is added to the photo-sensing information Bvo at each one step of the step number difference between the fully open aperture value and F-number 4, thus making Bvo + Avc ( = Bv — Avo + 120$_8$). Also when the result of addition exceeds the capacity of the register an indication of over-flow is done and the arithmetic step returns to start, and since the photographer can find the same through a viewing window of a finder, be can recognize that the object brightness Bv is outside of photo-sensing scope. Then by adding the fully open diaphragm aperture value Avo of the photographing lens and the sensitivity Sv of film used to the result of the above mentioned arithmetics. Bvo + Avc + Avo + Sv ( = Bv + Sv + 120$_8$) is obtained, next by subtracting the correction amount 120$_8$ for coding, Bvo + Avc + Avo + Sv — 120$_8$ ( = Bv + Sv ), that is the exposure volume value Ev can be obtained. In the event borrow is generated as a result of above subtraction, an indication of under flow is done and the arithmetic step returns to start. While the appropriate exposure volume Ev is computed through the above mentioned arithmetic result, the arithmetic flow will be different depending on the exposure control system thereafter.

Now for example in a manual mode when a photographer selects both the diaphragm aperture value Av and the shutter speed Tv, the flow will enter into the manual flow. Here, first the exposure volume Ev' obtained by the set diaphragm aperture value Av and shutter speed Tv is obtained by adding them both. Next, the Ev value obtained as a result of photo-sensing and the above mentioned Ev' are compared and in the case of Ev' > Ev, an under indication is done as the exposure volume is insufficient with the set diaphragm aperture value Av and the shutter speed Tv, while the operation proceeds without obstacle when Ev' ≦ Ev. Then Ev is subtracted from Ev', and at this time when the result thereof is "0", the set diaphragm aperture value Av and shutter speed Tv are made as appropriate values for obtaining appropriate exposure. Also when the result thereof is plus value, its value is indicated within the finder as the error step number of under portion. And when an under flow is generated in the arithmetic register as a result of subtraction, an over indication is done as the exposure volume is excessive with the set diaphragm aperture value Av and shutter speed Tv, and the content of the arithmetic register, which memorizes the error step number with complement generating under flow, is converted into antilogarithm to indicate it within a finder as the error step number of over portion. Therefore the photographer can find out the error of the set diaphragm aperture value Av and shutter speed Iv against the appropriate exposure Ev and the correction amount thereof. And in the manual mode the set diaphragm aperture value Av and shutter speed Tv are used as the data for final exposure control.

Next it is supposed that the diaphragm aperture value Av only is selected and the maximum value TMX and the minimum value TMN only are set for shutter speed Tv. At this time flow enters into the aperture value preference flow and such shutter speed Tv as necessary for obtaining appropriate exposure is obtained by subtracting the set diaphragm aperture value Av from the exposure volume Ev obtained previously as a result of photo-sensing. At this time, when under-flow is generated in the arithmetic flow, an under indication is done as the exposure volume being insufficient with the set diaphragm aperture value Av, and the minimum value TMN which was originally set as the shutter speed Tv will be set. Also when the obtained shutter speed Tv is smaller than the set minimum value TMN in the result of subtraction even if no under flow is generated in the arithmetic register, an under indication is done similarly and the minimum value TMN which was originally set as the shutter speed Tv will be set. When the obtained shutter speed Tv is larger than the set minimum value TMN, it is compared with set the maximum value TMX of the shutter speed. When the obtained shutter speed Tv is larger than the set maximum value TMX as a result of said comparison, an over indication is done as overexposure with the set diaphragm aperture value Av, and the maximum value TMX which was set originally as the shutter speed Tv is set. As mentioned above, when the minimum value TMN or the maximum value TMX which was set originally as the shutter speed Iv is set in place as the exposure volume will be insufficient or excessive with the set diaphragm aperture value Av, then judgement is made whether the full automatic mode is selected or not by the full automatic selection switch 30. When the full automatic mode is not selected the flow will return to the starting point, but if the same is selected the flip-flop for mode changing is inversedly set. Next the state of set/reset of the flip-flop for mode changing is judged, and since it is in the state of set in this case, the previously set minimum value TMN or the maximum value TMX is used as the newly set shutter speed, and the flow enters into the shutter time preference flow. Also when the shutter speed Tv is obtained within the scope of the minimum value TMN and the maximum value TMX of the set shutter speed against the set diaphragm aperture value Av, the set diaphragm aperture value Av and the obtained shutter speed Tv will be used as the data for final exposure control.

Next, it is supposed that the shutter speed Tv only is selected and the maximum value AMX and the minimum value AMN only are set for diaphragm aperture value Av. In this case, flow enters into the shutter time preference flow and such diaphragm aperture value Av as necessary for obtaining optimum exposure is obtained by subtracting the set shutter speed Tv from the exposure volume Ev previously obtained as a result of photo-sensing. When under flow is generated in the arithmetic register at this time, an under indication is done as under exposure with the set shutter speed Tv, and the originally set minimum value AMN is set as the diaphragm aperture value Av. Even when under flow is not generated in the arithmetic register as a result of the subtraction if the obtained diaphragm aperture value Av is smaller than the set minimum value AMN, an under indication is done similarly, and the originally set minimum value AMN is set as the diaphragm aperture value Av.

In the event the obtained diaphragm aperture value Av is larger than the set minimum value AMN comparison is made with the maximum value AMX of the set diaphragm aperture value. When the obtained diaphragm aperture value Av is larger than the set maximum value AMX in the result of comparison, an over indication is made as an overexposure with the set shutter speed Tv, and the originally set maximum value AMX is set as the diaphragm aperture value Av. When the originally set minimum value AMN or maximum value AMX is set in place as the diaphragm aperture value Av as exposure volume will be insufficient or excessive with the set shutter speed Tv as mentioned above, a judgement is made whether or not a full automatic mode is selected by the full automatic selection switch 30. Here, if the full automatic mode is not selected the flow will return to starting point, but if the same is selected the flip-flop for mode change is inversedly set. Next judgement is made on the state of set/reset of the flip-flop for mode change, and in this case since it is in set state the previously set minimum value AMN or maximum value AMX is used as the newly set diaphragm aperture value and the flow enters into the previously mentioned aperture preference flow.

Then, it is supposed that only maximum values and the minimum values are set for both diaphragm aperture value Av and shutter speed Tv. At this time the flow will be in the program flow, and the arithmetics as Av = PCM (Ev/8) is done from the program constant PCN being inputted from the program constant setting means 32 and the exposure volume Ev obtained previously as a result of photo-sensing, thus the diaphragm aperture value Av is led out. The diaphragm aperture value Av thus obtained is compared with the originally set minimum diaphragm aperture value AMN, and if it is smaller than the minimum aperture value AMN, the minimum aperture value AMN is set as the diaphragm aperture value. In the event it is larger than the minimum aperture value AMN it is compared with the originally set maximum aperture value AMX, and if it exceeds the maximum aperture value AMX, the maximum aperture value AMX is set as the diaphragm aperture value. As mentioned above, the diaphragm aperture value A$v$, computed according to the given program constant PCN is obtained, within the range of originally set maximum value and minimum value. Then flow will be entering into the previously mentioned diaphragm aperture value preference flow, and shutter speed T$v$ is obtained using the obtained aperture value A$v$ *as a set value*. *If the obtained shutter speed T$v$ is not between the originally set maximum value and minimum value the flow will return to the starting point as mentioned previously. And if the full automatic switch is selected the flow will enter into the shutter time preference flow, using the set maximum value or minimum value of shutter speed as a newly set shutter speed.

In each flow of diaphragm aperture preference and shutter time preference, in the event that the full automatic selection switch is selected and such shutter speed or diaphragm aperture value as providing suitable exposure volume can not be obtained under the set conditions and mode change is done, if such diaphragm aperture value and shutter speed as satisfying the appropriate exposure volume E$v$ obtained as a result of photo-sensing can not be obtained under the set conditions, the flip-flop for mode change is inversedly reset, thus flow will return to the starting point as a result of judging the state of set/reset of the flip-flop for mode change.

As mentioned above when such diaphragm aperture value A$v$ and shutter speed T$v$ as necessary for obtaining optimum exposure can not be obtained under the set conditions and the flow returns to the start, making indication of under or over, a photographer can find out the same through a finder viewing window, therefore he can either change the set conditions or set manual mode, thereby such diaphragm aperture value A$v$ and shutter speed T$v$ as conducting photographing can be obtained. When appropriate exposure becomes possible under set conditions by modification of the conditions the previously mentioned indication of under or over will disappear.

While such diaphragm aperture value A$v$ and shutter speed T$v$ as finally conducting exposure control is obtained through each flow of manual, diaphragm aperture preference, shutter time preference, program as mentioned above, these values are led to the indication registers APD, TVD and are indicated within the finder after being converted from number codes to F-number or shutter time. Therefore a photographer can find out information on the diaphragm aperture value and shutter speed in photographing, through the finder viewing window.

While the shutter speed T$v$ is memorized directly in the exposure time control register MTV, the diaphragm aperture value A$v$ will have subtraction of the fully open aperture value A$vo$ of the lens used made therefrom and is memorized in the diaphragm aperture control register MAP as the stop down step number A$vs$.

Next, a judgement is made whether or not shutter release is done, then when the shutter release has not been done, a judgement is made whether or not EE lock is done, and when the EE lock is not done the flow will return to the starting point.

Therefore in the exposure control device of this example as long as shutter release and EE lock are not done the flow will always return to the starting point to repeat photo-sensing arithmetic, thus a photographer can check such diaphragm aperture value and shutter-speed as necessary for obtaining appropriate exposure even against varying object or picture thus the extent of freedom in photgraphing can be largely enlarged.

Since thus obtained diaphragm aperture value A$v$ and shutter speed T$v$ have been determined in the picture at the time of photosensing, when it is desired to change the picture to be actually photographed and the picture at the time of photo-sensing, the EE lock button 34 is pressed to retain the diaphragm aperture value A$v$ and the shutter speed T$v$ which were obtained in the picture of photo-sensing.

Also when a self timer photographing is to be done a photographer sets up the time for a self timer through the self timer time setting lever 36.

When a shutter release button 16 is pressed, first the counting of time is done by the self-timer and as set time has elapsed, next photo-sensing is done while photographing lens is stopped down, and at the point when the photo-sensed volume reaches a prescribed value the desired amount of stop down is deemed to be obtained. This is so-called actual diaphragm aperture control and in such system the arithmetics of the correction amount of the curvature error due to the diaphragm aperture value of a lens is done. This is done by conducting arithmetics according to the equations (15) (16) mentioned above, and is given in such form as subtracting the curvature error A$vc'$ at the time of stop down from the curvature error A$vc$ at the time of fully open aperture, that is A$vc$ − A$vc'$. Here, if the diaphragm aperture value at the time of fully open aperture or the diaphragm aperture value at the time of stop down has F-number of 4 or more, the curvature error thereof is disregarded as mentioned previously.

Then photo-sensing is done with the photographing lens fully opened and the amount of light received B$vo$ against the object brightness B$v'$ at this time is given in the volume defined as B$v'$ − A$vo$ − A$vc$. While the object brightness B$v'$ is same as the object brightness B$v$ at the time of exposure arithmetic, it may be different value in the case when EE lock is done, etc. Next, the amount of light received B$vo'$ which is supposed to be obtained when the required stop down step number A$vs$ is stopped down in actual diaphragm aperture control is computed according to the above mentioned equation (16) from the curvature error A$vc$ − A$vc'$ and the amount of light received B$vo$ mentioned above. As the amount of light received A$vo'$ at the time when the required stop down step number A$vs$ is actually stopped down is obtained as a result of said arithmetic, the flip-flop FAPL for stop down control is set and the stop down is started by the signal from said flip-flop, and at the same time comparison is made between the amount of light received from an object as being actually incident through the photographing lens which is being stopped down and the above mentioned supposition value B$vo'$. While said flip-flop FAPL is reset and stop down operation is stopped as the above mentioned amount of light received reaches the supposition value B$vo'$ in a cource of stop down operation, at this time such prescribed stop down step number A$vs$ as being memorized in the diaphragm aperture control register MAP has been stopped down.

When such case takes place that the object brightness varies suddenly after stop down is started and even when the stop down reaches the marginal stop down amount of the photogrphing lens the amount of light received will not yet reach theoriginally supposed amount of light received B$vo'$, there exists such fear that the flow can not be coming out of the stop down flow making the photographing impossible. Therefore the stop down operation is stopped by the signal from the detection switch AEND which detects that the amount of stop down reaches the limit. When stop down operation is stopped, the flip-flop FMUP for mirror up control is set and the mirror up is started by the control signal from said flip-flop. As the mirror up operation is completed as just mentioned said flip-flip FMUP is reset by the signal from a switch MLUP which detects the same and mirror up operation is stopped.

As the mirror up operation is completed as explained above, the flip-flop FFCS for shutter front screen starting is set and the shutter front screen is started by the control signal from said flip-flop, thus exposure of film surface is started. At the same time actual shutter speed T is obtained from the shutter speed information T$v$ memorized in the shutter speed control register MTV according to the equation (27) shown above, and time counting is done. When a prescribed period of time obtained from the shutter speed information T$v$ has elapsed after the leading curtain starts running, the flip-flip FSCS for shutter trailing curtain starting is set and the shutter rear screen runs by the control signal from said flip-flop to stop exposure of the film surface. As the running of the shutter rear screen is completed by the above operations the trailing curtain running completion detection switch SCE is activated and detects that all of exposure control operations are completed to clear the registers, etc. thus the flow returns to the starting point for conducting new exposure control again.

By the operations mentioned above appropriate exposure can be made on the film surface with the diaphragm aperture value A$v$ and shutter speed T$v$ which have been originally set or obtained as a result of arithmetics.

The series of control mentioned above can be done automatically by practically designating in turn the address of the instruction system memorized in the ROM shown in FIG. 8 through the address counter SCCO, wherein the output of ROM is temporarily memorized by the instruction register IR and the instruction contained therein is distributed to each part of the device through the instruction register ID, while the data and the address to which jump is made, etc. are transmitted directly from the instruction register to the required parts.

The instruction system of the instruction register IR which temporarily memorizes the information on "1" or "0" of 12 bits which is the output of ROM is shown in detail in FIG. 16, wherein part I shows the register code as a mechanical term being expressed by "1" and "0" of the instruction register IR shown in FIG. 10. Part II is to shown the above mentioned register code by replacing the same with the number codes of octal, base-four or hexadecimal system, being represented by the 3 places of 1 to 3, the 3 places of 4 to 6, 2 places of 7, 8 and the 4 places of 9 to Z, respectively, and the Part III shows the meaning of each number code shown in the Part II.

In the drawing, when the most significant bit Z of the instruction register IR is "0", that is the number code shown by 4 units (4 places) of 9 to Z is "0" to "7", the content of said register is in the arithmetic control mode and at this time gerneral content of instruction is designated by operation OPII, and concrete content of instruction is designated by OPI, further final place of carrying out the instruction is designated through OPERAND I, OPERAND II for each instruction content designated by the operation OP II.

when the most significant bit Z of the instruction register IR is "1" that is the number code shown by 4 units (4 places) of 9 to Z is "8" to "F", the content of said register is at the immediate or jump mode, and as has been explained, at this time the number data of 3 units from "000$_8$" to "377$_8$" represented by showing in figures the binary values of 3 units of 1 to 3, 3 units of 4 to 6, and 2 units of 7, 8 are designated as the address of number data or the address to which jump is made.

Now the meaning of the instruction and OPERAND shown in the Part III of FIG. 16 will be explained in detail.

The instructions shown in OP II are to designate the arithmetics, etc. in various registers when its number code is "1". The instruction shown in OP I is now explained below.

RSF is an intruction to right shift the register of OPERAND as much as 1 bit and is an instruction which virtually means to make the data within the register of the OPERAND to $\frac{1}{2}$.

LSF is an instruction to left shift the register of OPERAND and is an instruction which virtaully means to double the data within the register of OPERAND.

ICR is an instruction to add "1" to the data with the register of OPERAND.

DCR is an instruction to subtract "1" from the data within the register of OPERAND.

CMP is an instruction to take complement of the data within the register of OPERAND, and an instruction meaning that "1" and "0" of data of 8 bits are inversed.

RTN is an instruction which is not relative to arithmetic control instruction in the register that is an exceptional instruction and is provided for over-flow of the number code of the jump instruction to be described below, but is not specifically designate OPERAND, instead it is a so-called return instruction to return to original address after carrying out sub-routine.

When the instruction designated by OPI is an arithmetic instruction in the register, OPERAND is only internal register as shown in OPERAND I and to designate either one of the internal registers AR, BR, CR, DR, ER, FR, GR by the OPERAND II.

While the return instruction RTN does not designate OPERAND "0" is written in all of the blank bits of 1 to 6 bits from the capacity of the instruction register IR. The terms of OPERAND I, OPERAND II at this time do not have any meanings.

The instruction shown by OP II is, when its number code is "2", to designate the data arithmetic processing between the main register AR and the OPERAND.

The instructions shown in OP I at this time will be explained.

LD is a load instruction to read the data of OPERAND into the main register AR.

STR is a store instruction to write the data of the main register AR into the OPERAND.

SWP is a swap instruction to exchange the data of the main register AR with the data of the OPERAND.

ADD is add instruction to add the data of OPERAND to the data of the main register AR and write the result thereof into the main register AR.

SUB is a sub instruction to subtract the data of OPERAND from the data of the main register AR and write the result thereof into the main register.

GT is a greater-than instruction to make the conditional flip-flop FC to "1" when the data of the main register AR is greater than the data of OPERAND.

SRG is a sense register instruction to sense "non-zero", that is, when the data of OPERAND is not "0", the conditional flip-flop FC is made to "1".

As has been explained above when the instructions designated by OP I are arithmetic instructions in the register, OPERAND is to indicate the internal register when its number code is "0" as shown in OPERAND I, and is to designate the registers AR, BR, CR, DR, ER, FR, GR shown in OPERAND II, and when the number code of OPERAND I is "1", it shows a memory register and to designates the diaphragm aperture value memory MAP, shutter speed memory MTV, while it indicates an indication register when the number code of OPERAND I is "2" and designates the diaphragm aperture value indication register APD, shutter speed indication register TVD and error step number indication register ERD shown in OPERAND II. Further, when the number code of OPERAND I is "3" or "4", it indicates external input data and designates the diaphragm aperture value input APV, the minimum diaphragm aperture value input AMN, the maximum diaphragm aperture value input AMX, the fully open F-number input OPF, the program constant input PRCN, the shutter speed input Tv, the minimum shutter speed input TMN, the maximum shutter speed input TMX, the film sensitivity input ASA, and the self-timer input SELF, etc., shown in OPERAND II.

The instructions shown in OP II is to designate the control of flip-flop, etc. when its number code is "3".

The instructions shown in OP I at this time will be explained below.

RST is a reset instruction to reset OPERAND.

SET is a set instruction to set OPERAND.

SWT is a switch instruction to switch the OPERAND to "0" if it is "1" and to "1" if it is "0".

SFG is a sense flag instruction to make the conditional flip-flop FC to "1" if the OPERAND is "1".

SUTM is an instruction to set "1" at the lowest unit (place) of the timer register TMR.

LSTM is a left shift instruction to left shift the data of the timer register TMR.

DCTM is a sub 1 instruction to subtract "1" each time from the data of the timer register TMR in synchronism with the reference time pulse.

SZTM is a zero detection instruction to make the conditional flip-flop FC to "1" if the data of the timer register TMR is "0".

When the number code of the OPERAND is "0" it shows at this time the internal flag as shown by OPERAND I and is to designate the carry input CA and the mode conversion flip-flop FMDC shown in OPERAND II. Here the carry input CA is so composed that it becomes "1" when carry or borrow is generated in addition or in subtraction. When the number code of OPERAND I is "1", it shows the flip-flop FP for plunger, and is to designate the stop down control flip-flop FAPM, the swing up mirror control flip-flop FMUP, the front screen start control flip-flop FFCS and the rear screen start control flip-flop FSCS shown in OPERAND II.

Further, when the number code of OPERAND I is "2" it shows the indication flip-flop FD, and is to designate the over-flow indication flip-flop FOVR, the under-flow indication flip-flop FUDR shown in OPERAND II.

When the number code of OPERAND I is "3", it shows a select gate CAS and is to designate the output COMP of an analogue comparator ACMP and the output CTP of a reference time pulse generator CTP shown in OPERAND II.

When the number code of OPERAND I is "4", it shows the selection gate ICS of input switch groups, and is to designate the diaphragm aperture setting switch means ASLC, the shutter speed setting switch means SSLC, the full automatic selection switch FAT, the EE lock selection switch FELK, the shutter release switch SHTR, the maximum stop down detection switch AEND, the mirror up completion detection switch MLUP of the swing up mirror and the rear screen running completion detection switch SCE, shown by the OPERAND II.

Next, when the most significant bit Z of the instruction register IR is "1", that is the number code shown by units (4 places) of 9 to Z are "8" to "F", the content of said register is at immediate or jump mode, and at this time the number code expressed by 4 units (4 places) of 9 to Z is to designate the kind of instructions and at the same time to designate the number code in 3 units which uses the figures shown by 3 units of 1 to 3 at the lowest unit (place), and figures shown by 3 units (3 places) of 4 to 6 at the lower 2 units, and figures shown by 2 units of 7, 8 at the highest unit as the number data at the time of immediate, also to designate it as the address to which jump is made.

Concerning the kind of instruction here, when the number code shown by 4 units of 9 to Z in the instruction register IR is "8", it indicates a load immediate instruction LDI to read the figures shown by bits 1 to 8 of IR into the main register AR as number data.

The number code "9" indicates add immediate instruction ADI to add the figures shown in bits 1 to 8 of IR to the main register AR as the number data.

The number code "A" indicates sub-immediate instruction SUBI to subtract the figures shown in bits 1 to 8 of IR as number data from the main register AR.

The number code "B" indicates greater-than-immediate instruction GTI to compare the figure data of the main register AR and the figure data shown in bits 1 to 8 of IR and if the content of the main register AR is greater than the figure data, to make the conditional flip-flop FC to "1".

The number code "C" indicates an unconditional jump instruction BU to jump to the address of the figures shown in bits 1 to 8 of IR, regardless of the state of the conditional flip-flop FC.

The number code "D" is a conditional jump instruction BCF to jump to the address of the figures shown in bits 1 to 8 of IR if the conditional flip-flop FC is "0".

The number code "E" indicates a conditional jump instruction BOT to jump to the address of the figures shown in bits 1 to 8 of IF if the conditional flip-flop FC is "1".

The number code "F" indicates a sub routine jump instruction BL to enter into sub routine with the figures shown in bits 1 to 8 of IR as the address to which sub routine jump is to be made.

The above mentioned instructions are written in each address within the ROM as shown in the relative table of address-instruction code in FIG. 17, and in the drawing:

No. is serial number placed for each instruction,

Address shows an address of each instruction housed in the ROM being indicated with octal number code of 3 units, Instruction code is a number code given in correspondence with the division of the instruction register IR shown in FIG. 10 of the instructions read out by the signal of 12 "1"s' or "0"s', at the instruction register IR by the designation of the corresponding address, OPERAND is the place where the instruction is carried out by the above mentioned instruction code, Address to which jump is made is the branch name of the address which is varied by jump instruction or branch instruction, and Branch name is the name placed for each corresponding address and the concrete content of instruction is shown in detail in the instruction system diagram of FIG. 16.

Figure 18:
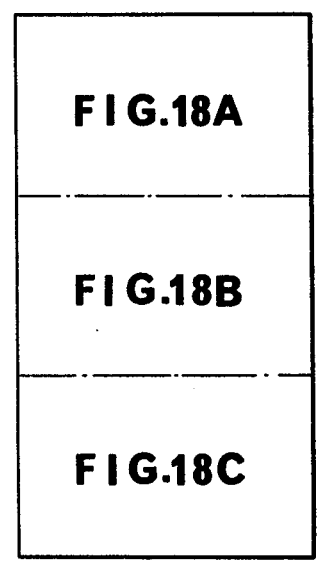
FIG. 18 is a control flow chart of the device shown in FIG. 8.
Figure 4B:
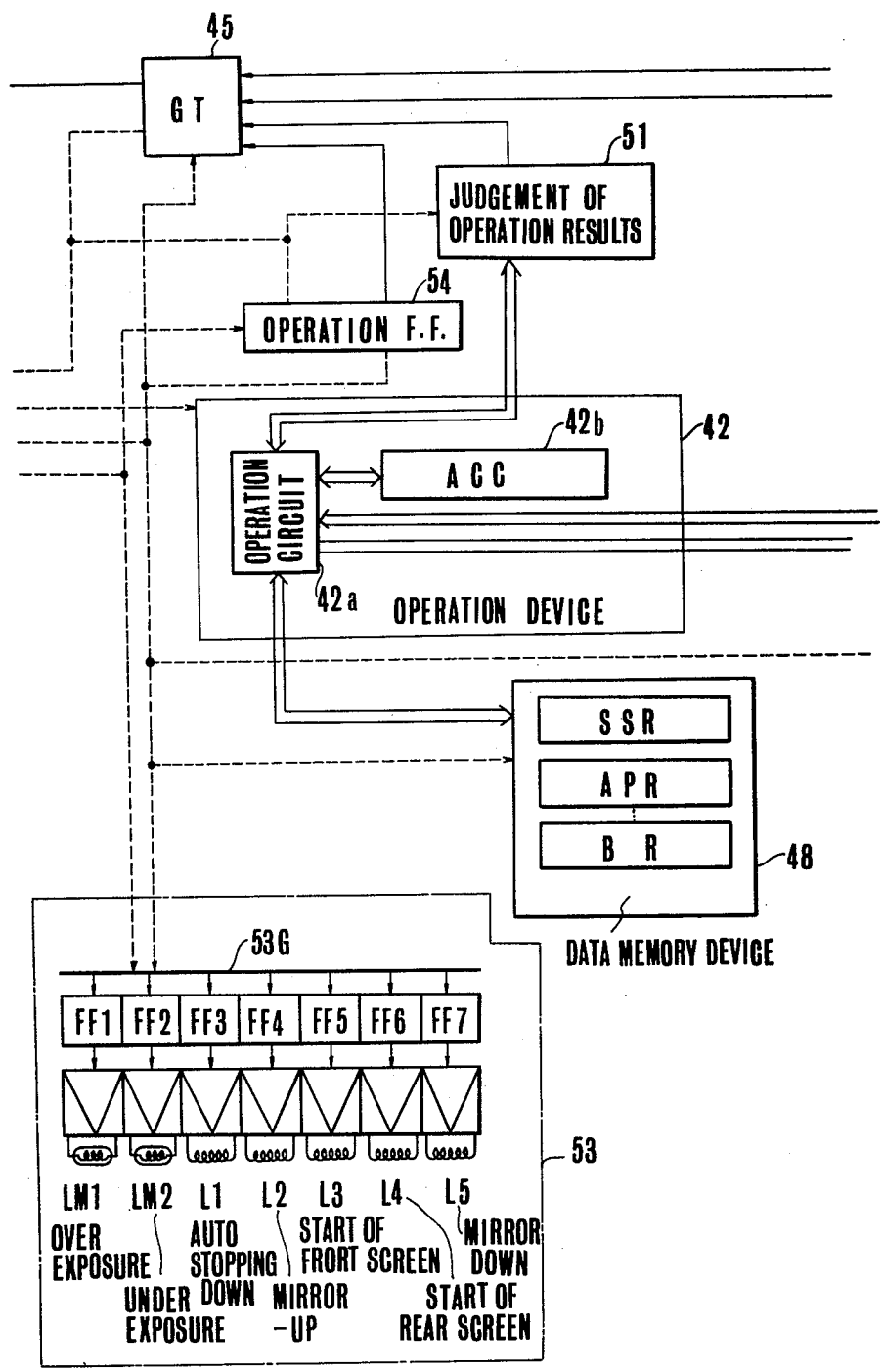

When control is done in turn starting from the address "000" by the sequence control counter SCCO, such control flow as shown in the flow chart of FIG. 18 is obtained, and the exposure control operation is done for obtaining appropriate exposure following the above mentioned control flow.

Now, the operation of the exposure control device of the present invention shown in FIG. 8 will be explained referring to the address-instruction code relation table shown in FIG. 17 and the control flow chart shown in FIG. 18.

First, when a signal to designate the address of "000" is inputted into the ROM by the sequence control counter SCCO, the load immediate signal LDI 000 is inputted into the instruction register IR, and "$000_8$", that is, all zero is written in the main register AR from said register IR through the arithmetic circuit AC. Then, the content "$000_8$" of the main register AR is written in turn into the general use registers BR, CR, DR, ER, FR, GR through the store instruction STR of addresses "$001_8$" to "$006_8$", and the clear action of the all registers of AR to GR is done through said operations.

Next, in the address "$007_8$", sub routine instruction BLMLV is issued and the "002" address, that is, the address of photo-sensing sub routine MLV is written into the address of SCCO through the jump control circuit JC.

Therefore the control flow enters into the photo-sensing sub routine MLV which takes in with digital value the information on the object brightness given in analogue value at the photo-sensing circuit AMV.

In the photo-sensing sub routine MLV, first a load immediate instruction LDI 200 is issued at the address "$022_8$", therefore virtually "1" is written into the most significant bit 8 of the main register AR having the mechanism shown in FIG. 9. Next, store instruction STR BR is issued and the previous data "$200_8$" is written into the register BR and then enters into the branch MLV 1. The data "$200_8$" written into the main register AR as mentioned above is converted into analogue value through the digital analogue converter DAC and is inputted into the analogue comparator ACOMP. Analogue value of the amount of light received Bvo, which gives the information on the object brightness, light of which is received from the photo-sensing circuit AMV through the photographing lens in a logarithmically compressed form, is inputted into the other input of the analogue comparator, and the both inputs of said analogue comparator ACOMP are always compared each other. Here, when the data of the main register AR is greater than the amount of light received Bvo, the above mentioned comparator ACOMP generates output of "0", while said analogue comparator ACOMP generates output of "1" when the data of the main register AR is less than the amount of light received Bvo. Then the output of the above mentioned analogue comparator ACOMP is sensed by the branch MLV 1 that is the sense flag instruction SFG COMP in the address "$024_8$", and when the result thereof is "1", the flow enters into the branch MLV 2 of the address "$027_8$" by the branch instruction BCT MLV 2, while when it is "0" the flow enters into the branch MLV 2 after subtracting data "$200_8$" of the register BR from the data "$200_8$" of the main register AR, by the sub instruction SUB BR. That is, when data "$200_8$" of the main register AR is less than the amount of light received Bvo the data "$200_8$" written into the main register AR is left as it is, and when the data "$200_8$" of the main register AR is greater than the amount of light received Bvc contrary to the above, said data is dropped and the data of the main register AR is made as "$000_8$". Next, the swap instruction SWP BR is given in the branch MLV 2 of the address "$027_8$", and the data "$200_8$" or "$000_8$" of the main register AR and the data "$200_8$" of the register BR are swapped. Then, right shift instruction RSF AR is issued and the data "$200_8$" of the above mentioned main register AR is shifted by 1 bit to right that is toward the lower unit and is made as "$100_8$". Here the sense register instruction SRG AR is issued and a sensing is done whether the data of the main register AR is non zero or not. Then, when the data of the main register AR is non zero, swap instruction SWP-BR is issued in the address "$033_8$", and the data "$100_8$" of the main register AR are replaced with the data "$200_8$" or "$000_8$" of the register BR, and by the add instruction ADDER at the next address "$034_8$" the data "$100_8$" of the register BR is added to the data "$200_8$" or "$000_8$" of the main register AR and the data of said register AR is made as "$300_8$" or "$100_8$". Next the flow returns to the branch MLV 1 of the address "$024_8$" by the branch instruction BLMLV 1, and the output of the analogue comparator ACOMP is sensed by the sense flag instruction SFG COMP, then as mentioned previously when the result thereof is "1" the control flow enters into the branch MLV 2 by the branch instruction BCT MLV2, while when it is "0" sub-instruction SUB BR is issued, and such data, as equivalent to the data "$100_8$" which is added by the register BR to the data "$200_8$" or "$000_8$" of the main register AR, will be subtracted from the main register AR in the previously mentioned address "034". Then while similar control operations are repeated such data as becoming virtually ½ in turn receiving right shift within the main register AR is added to the data memorized in the main register AR at the branch MLV 2 of the address "$027_8$", as a sequential correction value, in the address "$030_8$", then it is compared with the amount of light received Bvo at the branch MLV 1 of the address "$024_8$", and when the data of the main register AR to which the sequential correction value is added exceeds the amount of light received Bvo, the sequential correction value previously added is subtracted, while when the data of the main register AR to which the sequential correction value is added is below the amount of light received B$vo$, no subtraction is made, further the sequential correction value which has become ½ receiving right shift within the main register AR at the address "030$_8$" is added then again comparison is made with the amount of light received Bvo at the branch MLV 1, thus such comparative arithmetic is repeated until the above mentioned sequential correction value becomes "0" as a result of receiving right shift within the main register AR at the address "030$_8$". And when it is detected by the sense register instruction SRG AR that the sequential correction value within the main register AR becomes "0" at the address "031$_8$", the control flow receives the branch instruction BELFRTN and is transferred to the branch RETN of address "036$_8$", and returns to the address "010$_8$" of the main routine from the photo-sensing sub-routine following the return instruction RTN.

Through the above mentioned photo-sensing sub routine the digitally converted value of the amount of light received Bvo obtained as a result of photo-sensing is obtained at the register BR.

Then, a load instruction LD.OPF is issued at the address "010$_8$" and the data of fully open aperture value Avo is read into the main register AR from the fully open aperture value input means OPF of a photographing lens. Next, the control flow enters into the branch CROPF of the address "011$_8$" for conducting correction of the curvature error A$vc$, and the data Avo of the main register AR and the data "037$_8$" are compared by the greater-than-immediate instruction GTI037. In this comparison the fully open aperture value Avo is judged whether or not its F-value is $f$ 4 or higher. And when the fully open aperture value Avo is $f$ 4 or higher, that is "040$_8$" in the number code or higher, the control flow enters into the branch EVRTN of the address "057$_8$" by the branch instruction BCT EVRTN at the address "012$_8$". But when the value Avo is other than the above, a swap instruction SWP BR is issued at the next address "013$_8$" and the data Avo of the main register AR and the data V$vo$ of the register BR are swapped. Then, the add-immediate instruction ADI 001 is issued and the data "001" is added to the data Bvo of the main register AR. Next, the sense flag instruction SFGCA is issued to conduct a sensing as to whether or not carry is generated beyond the capacity of the register as a result of previous addition. If such carry is generated the flow is transferred to the branch OVFLW of the address "055$_8$" by the branch instruction BCT OVFLW at the address "016$_8$". In the above mentioned branch OVFLW, a set instruction SET FOVR of the flip-flop is issued to activate the flip-flop FOVR for over-flow indication through the set-reset control means SER / RSET, the indication control means FD, then the control flow returns to the start by the branch instruction BUSRT at the next address "056$_8$". In the event no carry has been generated as a result of the sense flag instruction SFG CA at the address "015", the data Bvo + "001$_8$" of the main register AR and the data Avo of the register BR are exchanged by the swap instruction SWP BR at the address "017", then "004$_8$" is added to the data Avo of the main register AR by the add-immediate instruction ADI 004 at the next address "020$_8$". After completing the above operations the flow returns again to the branch CROPF by the branch instruction BU CROPF at the next address "021$_8$". This is based on such definition that the curvature error A$vc$ becomes ¼ step at every one step of the step difference from the $f$ number −4 of the fully open aperture value Avo of the lens used. And in this example, while such arithmetics is repeated that "004$_8$" that is ½ step is added to the fully open aperture value Avo of the photographing lens every time such correction volume as "001$_8$" in number data that is ⅛ step is added to the amount of light received Bvo, the data, Avo + "004$_8$" + . . . , which is written in the main register AR at this point is compared with "037$_8$", and at the point when said data exceeds "037$_8$", the addition of the correction amount of "001$_8$" to the amount of light received Bvo is stopped, and the control flow is transferred to the branch EVRTN of address "057$_8$".

At this time the amount of curvature correction A$vc$ added to the amount of light received B$vo$ is given by:

$$A vc = "001_8" \times n \ (n = 0, 1, 2, \ldots) \tag{18}$$

(wherein A$vo$ + "001$_8$" × ($n$ − 1) ≦ "037$_8$" < A$vo$ + "001$_8$" × $n$)

Therefore at the time when the flow is transferred to the branch EVRTN of address "057$_8$", such data as B$vo$ + A$vc$ is written into the register RB, and said data B$vo$ + A$vc$ is written into the main register AR by the load instruction LD BR. Next, the fully open aperture value A$vo$ of a taking lens is taken from the fully open aperture value input means OPF by the add-instruction ADD OPF of the address "060$_8$", and is added to the data B$vo$ + A$vc$ which is written in the main register AR, making it as B$vo$ + A$vc$ + A$vo$. Further the film sensitivity Sv is taken from the film sensitivity input means ASA by rthe add-instruction ADD ASA of address "061$_8$", and is added to the date B$vo$ + A$vc$ + A$vo$ of the main register AR making it as B$vo$ + A$vc$ + A$vo$ + Sv. When carry is generated in the main register AR as the arithmetic register through the above arithmetics, a signal showing that the carry is generated is outputted, and as subtraction arithmentc is done as will be explained later, the carry at this point may be disregarded, thus the carry output is reset by the reset.carry instruction RST CA at the next address "062$_8$". Then "120$_8$" is substracted from the data B$vo$ + A$vc$ + A$vo$ + S$v$ of the main register AR by the sub-immediate instruction SBI 120 at the address "063$_8$". The "120$_8$" here is the correction number when the photographing information expressed in the apex value is defined as number code as described previously, and the arithmetic of the equation (14) shown previously is done through the above mentioned arithmetics, and the exposure volume Ev ( = Bvo + Avc + Avo + Sv −"120$_8$") is memorized at the main register AR. When carry is still generated even when the subtraction of data "120$_8$" is done, it is judged by the sense-flag instruction SFG CA of next address "064$_8$", and a set instruction SET FUDR is issued at the address "066$_8$", and after activating the flip-flop FUDR for under flow indication through the set-reset control means SET / RSET, and the indication control means FD, the control flow returns to the start by the branch instruction BUSRT at the next address "067$_8$". Also when carry has not been generated as a result of the sense-flag instruction SFG CA at the address "064$_8$" the control flow enters into the branch CAL of the address "070$_8$" by the branch instruction BCF CAL at the next address "065$_8$". At the branch CAL first the flip-flop FOVR for over-flow indication is reset by the reset instruction RST FOVR and at the same time the flip-flop FUDR for under-flow indication is reset by the next reset instruction RST FUDR. This is to reset the flip-flop FOVR for over indication or the flip-flop FUDR for under indication which has been left as being set when the control flow comes through to the branch CAL as after the flip-flop FOVR for over-flow indication is set at the address "$055_8$" and the control flow returns again to the start, the conditions change and carry disappears as a result of sense-flag instruction SFGCA at address "$015_8$", or as after the flip-flop for under-flow indication is set at the address "$066_8$" and the control flow returns again to the start, the conditions change and carry disappears as a result of the sense flag instruction SFGCA at the address "$064_8$".

The store instruction STRCR is issued at the next address "$072_8$" and the exposure volume Ev obtained through the above mentioned control flow is written into the register CR and the control flow enters into the branch BRC at the address "$073_8$".

At the branch BRC the sense flag instruction SFG ASLC is issued and a judgement is made about the state of the switch means ASLC which shows whether or not the diaphragm aperture value Av is selected. And if the aperture value A$\nu$ is not selected the flow enters into the branch BRC 1 at the address "$122_8$" by the branch instruction BCF BRC 1 at the next address "$074_8$", but if the aperture value Av is selected, the sense flag instruction SFG SSLC at the next address "$075_8$" is issued and the state of the switch to show whether the shutter speed T$\nu$ is selected or not is sensed. If, as a result of the above judgement, shutter speed T$\nu$ is not selected, the flow enters into the branch BRC 2 of the address "$134_8$" that is the arithmetic routine of diaphragm aperture value preference by the branch instruction BCF BRC 2 at the next address "$076_8$", but if the shutter speed T$\nu$ is selected the control flow enters into the manual routine. And the sense flag instruction SFG SSLC is issued at the above mentioned branch BRC 1 and the state of the switch means SSLC which shows whether or not the shutter speed T$\nu$ is selected is judged. And if the shutter speed T$\nu$ is not selected the flow enters into the branch PRG for the address "$220_8$" that is the arithmetic routine of program by the branch instruction BCF PRG at the next address "$123_8$", but if the shutter speed T$\nu$ is selected the flow enters into the arithmetic routine of shutter time preference.

Through each control flow mentioned above the arithmetic control enters into the manual rountine, the diaphragm aperture preference arithmetic routine, the shutter time preference routine, and the program arithmetic routine according to the manual mode, the diaphragm aperture preference mode, the shutter time preference mode, and the program mode selected by the choice of the photographer. Now its arithmetic control flow will be explained for each routine.

In the manual routine, first in the address "077" the load instruction LD APV is issued, and the diaphragm aperture value A$\nu$ which is set from the diaphragm aperture value setting means APV is read into the main register AR, then the store instruction STRDR is issued at the next address "$100_8$" to write said data Av into the register DR. Next, add instruction ADDTV is issued at the address "101" and the shutter speed T$\nu$ being set from the exposure time setting meand TVD is added to the data A$\nu$ of the main register Ar and the exposure volume Ev' ( $= A\nu + T\nu$ ) obtained from the set diaphragm aperture A$\nu$ and the shutter speed T$\nu$ is obtained.

As has been explained above the data Ev' obtained at the main register AR is compared with the appropriate exposure volume E$\nu$ memorized in the register CR by the greater-than instruction GTCR at the address "103", and if the data Ev' is less than the data E$\nu$, the flow enters into the branch FAP at the address "$105_8$" by the branch instruction BCF FAP at the next address "$103_8$". But if the data Ev' is greater than the data *Ev*, the flow enters into the next branch FAP after setting the flip-flop FUDR for under-flow indication by the set instruction SET FUDR at the address "$104_8$". At the branch FAP, E$\nu$ is subtracted from the data Ev' by the sub-instruction SUB CR at the address "$105_8$". When the data of the main register AR becomes "0" through this subtraction operation, the data Ev' and Ev become completely equal value. But when the data of the main register AR does not become "0" the data Ev', and the *Ev* will not match. And the same is sensed by the sense register instruction SRGAR at the next address "$106_8$". If the data of the main register AR becomes "0" at this point the flow enters into the branch FAP 1 at the address "$117_8$" by the branch instruction BCF FAP 1 at the address "$107_8$". But, if the data of the main register AR does not become "0", a sensing is done whether or not borrow is generated as a result of subtraction Ev' − *Ev* by the sense flag instruction SFG CA at the next address "$110_8$". Here, if Ev' − E$\nu$ − E$\nu$ > 0, borrow will not be generated as a matter of course, therefore the flow enters into the branch FAP 2 at the address "$114_8$" by the branch instruction BCF FAP 2 at the next address "$111_8$". But if Ev' − EV < 0, borrow will be generated as a matter of course, therefore the flip-flop FOVR for over-flow indication is set by the set instruction SET FOVR at the address "$112_8$". When Ev' − E$\nu$ is done at the time when Ev' < E$\nu$, | Ev' − E$\nu$ | will be left in the form of complement at the main register Ar which constitutes the arithmetic register. Therefore, |Ev' − E$\nu$| is converted to anti-logarithm by the complement conversion instruction CMPAR at the next address "$113_8$", and the flow enters into the branch FAP 2.

The flip-flop FOVR for over-flow indication and the flip-flop FUDR for under-flow indication are reset by the reset instruction RST FUDR at the address "$117_8$" and by the reset instruction RST FUDR at the address "$120_8$", at the branch FAP 1, then thereafter the flow enters into the branch FAP2 by the branch instruction BU FAP 2 at the next address "$121_8$". This is the control flow which is set to delete the previous over-flow indication or under-flow indicaton, when the set exposure value Ev' and the appropriate exposure value Ev become same value, as a result of the change of the set value of diaphragm aperture value A$\nu$ or shutter speed T$\nu$ by a photographer upon seeing the over-flow indication or the under-flow indication.

While | Ev' −E$\nu$ |, that is the error step number in the set exposure volume against appropriate exposure is memorized in the main register Ar at the time when flow enters into the branch FAP 2 in a course of each flow mentioned above, and the above mentioned error step number data are written in the register ERD for indicating error step number by the store instruction STR ERD at the address "$114_8$", and is converted into actual FIGURE from mechanical code by the indication decoder EDC, then is indicated at the error step number indication device INDE. Next, the load instruction LDTV is issued at the address "$115_8$" and the shutter speed T$\nu$ is read in the main register AR from the exposure time setting means TV, and the control flow enters into the branch DISP of the address "$173_8$" by the branch instruction BU DISP at the next address "$116_8$".

While the sense flag instruction SFG SSLC is issued at the branch DISP and it is sensed to detect whether or not the shutter speed Tv is selected, as the shutter speed Tv is naturally selected in the manual mode, output is obtained from the switch SSLC which shows that the shutter speed Tv is selected, thus the flow enters into the address "$175_8$". Here further the sense flag instruction SFG FMCD is issued and the set / reset state of the flip-flop FMDC for mode change is sensed. And since said flip-flop is naturally in reset state in the manual mode the flow is transferred to the address "$177_8$". Here the sense flag instruction SFG ASLC is issued further and sensing is done whether or not diaphragm aperture value Av is selected, and since the diaphragm aperture value Av is selected naturally in the manual mode, output is obtained from the switch ASLC which shows that the diaphragm aperture value Av is selected therefore the control flow is transferred to the branch DISP 3 by the branch instruction BCT DISP 3 at the next address "$200_8$".

At this time the shutter speed data Tv is written into the main register AR by the load instruction LDTV at the previous address "$115_8$" and the diaphragm aperture value Av is written into the register DR by the store instruction STRDR at the previous address "$100_8$".

At the branch DISP 3, the store instruction MTV is issued and the data of shutter speed Tv is written into the register MTV for exposure time control from the main register AR, and further the store instruction STR TVD is issued at the next address "$203_8$" and the data of shutter speed Tv of the main register AR is written in the exposure time indication register TVD, and is converted into actual shutter time value through the indication decoder TDC, then is indicated on the exposure time indication device INDS. In the next address "$204_8$", the load instruction LDDR is issued and the diaphragm aperture value Av written in the register DR is read in the main register AR, further, the diaphragm aperture value data Av of the main register AR is written in the aperture value indication register APD by the store instruction STRAPD at the next address "$205_8$", and is converted into actual aperture f-number through the indication decoder ADC, then it is indicated in the aperture value indication device INDA. Then, subinstruction SUB OPF is issued at the address "$206_8$", and stop down stop number Avs ( = Av − Avo) of the photographing lens which is necessary for obtaining set diaphragm aperture value Av is obtained, by subtracting the fully open diaphragm aperture value Avo of the photographing lens from the diaphragm aperture value Av data of the main register AR, and the stop down step number Avs data of the main register AR is written in the diaphragm aperture control register MAP.

In the manual routine the shutter speed Tv and the stop down step number Avs used in actual control can be obtained at the control registers MTV and MAP through the above mentioned control flow, and the control flow enters into the branch CNTR after the above mentioned flow.

The diaphragm aperture value preference routine starting with the branch BRC 2, first the sense flag instruction SFG FMDC is issued in the address "$134_8$", and sensing is done whether or not the flip-flop FMDC for mode change is set. When said flip-flop FMDC is set at this time, the branch instruction BCT SS 1 is issued at the next address "$135_8$" and the control flow enters into the branch SS 1, and since said flip-flop FMDC is not at set state in the beginning, the control flow transfers to the next address "$136_8$", where the load instruction LDAPV is issued and the diaphragm aperture value Av set from the diaphragm aperture value setting means APV is read in the main register AR. Then, the control flow enters into the branch AP 1 at the address "$137_8$", where the store instruction STR DR is issued and the diaphragm aperture value Av data of the above mentioned main register AR is written into the register DR. After that at the address "$140_8 38$, the load instruction LDTMN is issued and the minimum exposure time TMN data is taken into the main register AR from the minimum exposure time setting means TMN, and said datat TMN is written into the register ER through the store instruction STRER at the next address "$141_8$". Next, load instruction LDTMX is issued at the next address "$142_8$" and the maximum exposure time TMX data is taken into the main register AR from the maximum exposure time setting means TMX, and said data TMX is written into the register FR through the store instruction STRFR at the branch CAL 1 of the next address "$143_8$".

Through the above flows the exposure volume Ev data is written into the register CR, and the set diaphragm aperture value Av data is written into the register DR, while the minimum exposure time TMN data is written into the register ER, and the maximum exposure time TMX data is written into the register FR.

Next, the exposure volume Ev data written into the register CR by the load instruction LDCR at address "$144_8$" is taken into the main register AR, and the data Av of the register DR is substracted from the data Ev of the main register AR by the sub-instruction SUBDR at address "$145_8$" and the main value ( = Ev − Av ) obtained therefrom is written into the main register AR as the shutter speed data.

When the exposure volume Ev is smaller than the diaphragm aperture value Av and borrow is generated as a result of above subtraction, it is detected by the sense flag instruction SFGCA at the next address "$146_8$" and the flow is transferred to the branch CAL 2 by the branch instruction BCTCAL 2 at the next address "$147_8$". In the event no borrow is generated as a result of the above subtraction, judgement will be made whether the exposure time Tv data obtained as a result of arithmetics is greater than the minimum exposure time TMN written in the register ER or not by the greater-than instruction GTER at the next address "$150_8$", and if said data Tv is greater than the minimum exposure time TMN, flow transfers to the branch CAL 3 by the branch instruction BCTCAL 3 at the next address "$151_8$", and when the above mentioned data Tv is not greater than the data TMN, the flow enters into the branch CAL 2.

The flip-flop FUDR for under flow indication is set by the set instruction SET FUDR at the address "$152_8$", in the branch CAL 2, further the minimum exposure time TMN written in the register ER is read into the main register AR by the load instruction LDER at the next address "$153_8$", and the flow enters into the branch CAL 5.

And in the branch CAL 3, judgement is made whether or not the previously mentioned shutter speed Tv data is greater than the maximum exposure time TMX written in the register FR by the greater-than instruction GTFR at the address "$162_8$", and if said data Tv is not greater than the maximum exposure time TMX, the flow transfers to the branh CAL 4, by the branch instructioN BCF CAL 4 at the next address "$163_8$", but when said data Tv is greater than the data TMN, the flip-flop FOVR for over flow indication is set by the set instruction SET FOVR at the address "$164_8$", and the maximum exposure time TMX written in the register FR is read into the main register AR by the load instruction LDFR at next address "$165_8$", then the flow transfers to the branch CAL 5 following the branch instruction BU CAL 5 at address "$166_8$".

In the branch CAL 5, first a judgement is made whether or not the full automatic selection switch FAT is put in by the sense flag instruction SFGFAT at address "$154_8$", and if the same is not selected the flow returns to the start by the branch instruction BCFSRT at the next address "$155_8$", but if the full automatic selection switch FAT is selected and put in, the set/reset state of the flip-flop FMDC for mode change is inversed by the switch instruction SWT FMDC at the next address "$156_8$". Therefore, the flip-flop FMDC for mode change which is originally at reset state will become set state. Next, the set / reset stat of the above mentioned flip-flop FMDC is judged by the sense flag instruction SFG FMDC at address "$157_8$", and if it is not in set state, the flow returns to the start by the branch instruction BCFSRT at next address "$160_8$", but since said flip-flop FMDC is in set state in this case the flow retuns to the branch BRC by the branch instruction BUBRC at next address "$161_8$".

At this time the newly set maximum exposure time TMS or minimum exposure time TMN is read into the main register AR as shutter speed Tv, and as the flow comes to the branch BRC 2 at address "$134_8$" from the branch BRC through the diaphragm aperture value preference routine, the set / reset state of the above mentioned flip-flop FMDC is sensed by the sense flag instruction SFG.FMDC. In this case since the flip-flop FMDC is set at the previous address "$156_8$", the flow transfers to the branch SS 1 following the branch instruction BCT SS 1 at next address "$135_8$". The branch SS 1 is a branch within the shutter time preference routine and is the branch to enter into next flow after reading already set shutter speed Tv into the main register AR. Therefore, when the flow enters into this branch SS 1 receiving mode change, the set maximum exposure time TMX or minimum exposure time TMN is used as a newly set exposure time Tv and shutter time preference routine is to be carried out.

The flow, which enters into the branch CAL 4 following the branch instruction BCFCAL 4 at address "$163_8$", will have the state of flip-flop FMDC for mode change sensed by the sense flag instruction SFGFMDC, and if it enters into said branch CAL 4 without receiving mode change, the flow enters into the branch DISP following the ranch instruction BCTDISP at next address "$170_8$" since the above mentioned flip-flop FMDC is in reset state. But if the flow enters into said branch CAL 4 receiving mode change, it enters into next address "$171_8$", where the reset instruction RST FOVR is issued, further the reset instruction RST FUDR is issued at the next address "$172_8$", and reset signal is inputted into the flip-flop FOVR for over-flow indication and the flip-flop FUDR for under-flow indication, then before receiving mode change the set flip-flops for over or under flow indication are reset, and thereafter, the flow enters into the branch DISP.

Therefore the data for the computed shutter speed Tv ( = Ev − Av ) is written therein and the set diaphragm aperture value Av is written into the register DR by the store instruction STR DR at previous address "$137_8$".

The control flow from the branch DISP 3 to the branch CNTR is as already explained in the description for the manual routine.

In the diaphragm preference routine, when the shutter speed Tv computed against the set diaphragm aperture value Av is not between the maximum value TMX and the minimum value TMN of set shutter speed, the flow returns to the start by the branch instruction BCF SRT at address "$160_8$" as has been previously explained, and same arithmetic operations are repeated again. And as object brightness or set value of diaphragm aperture, or the maximum or minimum set value of shutter speed vary during said period, and as the computed shutter speed Tv comes between the maximum value and the minimum value of set shutter speed, the flow enters into the branch CAL 4 through the branch instruction BCF CAL 4 of address "$163_8$", and the shutter speed Tv and the diaphragm aperture value Av for control can be obtained, as has been explained above. When the full automatic selection switch FAT is selected, the flip-flop FMDC for mode change is inversedly set as the address, "$156_8$", as has been explained previously, and the flow enters into the branch SS 1 through the branches BRC, BRC 2, AT this time the set maximum exposure time TMX or minimum exposure time TMN are written in the main register AR as a newly set shutter speed, and this value is written in the register DR by the store instruction STRDR at address, "$127_8$". After that the load instruction LD AMN at address "$130_8$" is issued, and the data for minimum diaphragm aperture value AMN is taken into the main register AR from the minimum diaphragm aperture setting means AMN, then said data AMN is written into the register ER through the store instruction STRFR at next address "$131_8$". The load instruction LD AMX is issued at next address "$132_8$", and the data for maximum diaphagm aperture value AMX is taken into the main register AR from the maximum diaphragm aperture value setting means AMX, then the flow transfers to the branch CAL 1 by the branch instruction BUCAL 1 at next address "$133_8$". Here, the above mentioned data AMX is written into the register FR through the store instruction STRFR at address "$143_8$".

Through the above mentioned flow, the exposure volume data Ev is written into the register CR, and the maximum or minimum exposure time data is written into the register DR, while the minimum diaphragm aperture value data AMN is written into the register ER, and the maximum diaphragm aperture value data AMX is written into the register FR.

Next, the exposure volume data Ev which is written in the register CR by the load instruction LDCR at address "$144_8$" is taken into the main register AR, and the maximum or minimum exposure time data of the register DR is substracted from the data Ev of the main register AR by the sub-instruction SUBDR at address "$145_8$", then the value Av obtained as a result of the same is written into the main register AR as the diaphragm aperture value data.

When the exposure volume Ev is smaller than the maximum or minimum exposure time and borrow is generated as a result of the above substraction, it is detected by the sense flag instruction SFGCA at next address "$146_8$", and the flow is transferred to the branch CAL 2 by the branch instruction BCTCAL 2 at next address "$147_8$". As to the case when no borrow is generated as a result of the above subtraction, a judgement is made whether or not the diaphragm aperture value data $Av$ obtained as a result of arithmetics is greater than the minimum diaphragm aperture value AMN written into the register ER, by the greater-than instruction GTER at address "$150_8$". And when said data $Av$ is greater than the minimum diaphragm aperture value AMN, the flow transfers to the branch CAL 3 by the branch instruction BCTCAL 3 at next address "$151_8$", while when said data $Av$ is not greater than the data AMN, the flow enters into the branch CAL 2.

At the branch CAL 2, set signal is inputted into the flip-flop FUDR for under flow indication by the set instruction SET FUDR at address "$152_8$", further the minimum diaphragm aperture value AMN written into the register ER is read into the main register AR by the load instruction LDER at next address "$153_8$", and the flow enters into the branch CAL 5.

And in the branch CAL 3, first, a judgement is made whether or not the previously mentioned diaphragm aperture value data $Av$ is greater than the maximum diaphragm aperture value AMX written into the register ER, by the greater-than instruction GTRF at address "$162_8$". And if said data $Av$ is not greater than the maximum diaphragm aperture value AMX, the flow transfers to the next branch CAL 4 by the branch instruction BCF CAL 4 at next address "$163_8$", while when said data Av is greater than the data AMX, set signal is inputed into the flip-flop FOVFR for over flow indication by the set instruction SET FOVR at address "$164_8$", further, the maximum diaphragm aperture value AMX written in the register FR is read into the main register AR by the load instruction LDFR at next address "$165_8$", and the flow transfers to the branch CAL 5 following the branch instruction BUCAL 5 at address "$166_8$".

In the branch CAL 5, first, a sensing is done whether or not the full automatic selection switch FAT is put in by the sense flag instruction SFGFAT at address "$154_8$". And in this case the full automatic selection switch FAT is selected and put in therefore the set/reset state of the flip-flop FMDC for mode change is inversed by the switch instruction SWTFMDC at next address "$156_8$". Therefore, the flip-flop FMDC for mode change which has been once placed in set state is inversedly reset. Next sensing is done on the set / reset state of the above mentioned flip-flop FMDC by the sense flag instruction SFG FMDC at address "$157_8$", and in this case, since said flip-flop is in the state of reset, the flow returns to the start by the branch instruction BCF SRT at the next address "$160_8$".

When the flow comes to the CAL 4 following the branch instruction BCF CAL 4 at address "$163_8$", first the state of the flip-flop FMDC for mode change is sensed by the sense flag instruction SFGFMDC, and in this case as the flow enters into this branch CAL 4 receiving the mode change, the above mentioned flip-flop FMDC is in a reset state, therefore the flow enters into next address "$171_8$", where the reset instruction RSTFOVR is issued, further the reset instruction STFUDR is issued at next address "$172_8$" and reset signal is inputted into the flip-flop FOVR for over flow indication and to the flip-flop FUDR for under flow indication, then after resetting the flip-flops for over or under flow indication which has been set before receiving mode change, the flow enters into the branch DISP.

While sense flag instruction SFG SSLC is first issued at the branch DISP to sense whether the shutter speed $Tv$ is selected or not, since the shutter speed $Tv$ is not selected in the diaphragm aperture preference routine, the flow enters into the branch DISP 1 at address "$215_8$" following the branch instruction BCF DISP 1 at next address "$174_8$". Here, further the sense flag instruction SFG FMDC is issued to sense the set / reset state of the flip-flop FMDC for mode change. Since said flip-flop FMDC is in set state, the flow enters into the branch DISP 2 at address "$201_8$", following the branch instruction BUDISP 2 at address "$217_8$".

In the branch DISP 2 the swap instruction SWPDR is issued, and swapping is done between the diaphragm aperture value data $Av$ written into the main register AR, and the data for the maximum exposure time TMX or the minimum exposure time TMN as the newly set shutter speed by the mode change, which has been written into the main register AR through the load instruction LDER at previous address "$153_8$" and the load instruction LDFR at address "$165_8$" and further has been written into the register DR by the store instruction STRDR at address "$127_8$", then the flow enters into the next branch DISP 3.

The control flow from the branch DISP 3 to the branch CNTR has already been described in the explanations on the manual routine.

In the diaphragm aperture preference routine the shutter speed $Tv$ and the stop down step number Avs which are used in actual control are obtained at the control registers MTV or MAP through the above mentioned control flow, and the control flow enters into the branch CNTR through the above mentioned flow.

In the shutter time preference routine which starts at address "$124_8$", first the sense flag instruction SFG FMDC is issued at the address "$124_8$" to sense whether or not the flip-flop FMDC for mode change has been set. At this time if said flip-flop FMDC has been set, the branch instruction BCT AP 1 is issued at next address "$125_8$" and the control flow enters into the branch AP 1, but since said flip-flop FMDC is not in set state in the beginning, the control flow transfers to the next address "$126_8$", where load instruction LDTV is issued, and the shutter speed $Tv$ which is set by the exposure time setting means TV is read into the main register AR. Next, the control flow enters into the branch SS 1 at address "$127_8$", where store instruction STR DR is issued, and the above mentioned shutter speed data $Tv$ of the main register AR is written into the register DR. After that the load instruction LDAMN is issued at address "$130_8$", and the minimum diaphragm aperture value data AMN is taken into the main register AR from the minimum diaphragm aperture value setting means AMN, and said data AMN is written into the register ER through the store instruction STRER. Next, the load instruction LD AMX is issued at address "$132_8$" and the maximum diaphragm aperture value data AMN is taken into the main register AR from the maximum diaphragm aperture setting means AMX, then the flow transfers to the branch CAL 1 by the branch instruction BUCAL 1 at next address "$133_8$". Here, the above mentioned data AMX is written into the register FR through the store instruction STRFR at address "$143_8$".

Through the above flow, the exposure volume data $Ev$ is written into the register CR, and the set shutter speed data $Tv$ is written into the register DR, while the minimum diaphragm aperture value data AMN is written into the register ER, and the maximum diaphragm aperture value data AMX is written into the register FR.

Then the exposure volume data Ev written into the register CR is taken into the main register AR by load instruction LDCR at address "$144_8$", further the data Av of the register DR is subtracted from the data Ev of the main register AR by the sub-instruction SUBDR at address "$145_8$", and the value obtained as the result ( = Ev − Tv ) is written into the main register AR as the diaphragm aperture value data.

When the exposure volume Ev is smaller than the shutter speed Tv and borrow is generated as a result of above substruction, it is detected by the sense flag instruction SFGCA at next address "$146_8$" and the flow is made to transfer to the branch CAL 2 by the branch instruction SFGCA at next address "$147_8$". In the event borrow is not generated as a result of the above subtraction such sensing is done as to whether or not the diaphragm aperture value data Av obtained as the result of arithmetic is greater than the minimum diaphragm aperture value AMN written into the register ER, by the greater-than instruction GTER at next address "$150_8$", and if said data Av is greater than the minimum diaphragm aperture value AMN, the flow transfers to the branch CAL 3 by the branch instruction BCT CAL 3 at next address "$151_8$", but when the above mentioned data Av is not greater than the data AMN, the flow enters into the branch CAL 2.

The flip-flop FUDR for under flow indication is set in the branch CAL 2 by the set instruction SET FUDR at address "$152_8$", further, the minimum diaphragm aperture value AMN written into the register ER is read into the main register AR by the load instruction LDER at address "$153_8$", then the flow enters into the branch CAL 5.

At the branch CAL3, first such sensing is done as to whether or not the previously mentioned diaphragm aperture value data Av is greater than the maximum diaphragm aperture value AMX written into the register FR, by the greater than instruction GTFR at address "$162_8$", and if said data Av is not greater than the maximum diaphragm aperture value AMX, the flow transfers to the branch CAL4 by the branch instruction BCF CAL 4, but when said data Tv is greater than the data TMN, the flip-flop FOVR for over flow indication is set by the set instruction SET FOVR at address "$164_8$". Further the maximum diaphragm aperture value AMX written into the register FR is read into the main register AR by the load instruction LDFR at next address "$165_8$", and the flow transfers to the branch CAL5 by the branch instruction BUCAL5 at address "$166_8$".

At the branch CAL5, first such sensing is done as to whether or not the full automatic selection switch FAT is put in by the sense flag instruction SFGFAT at address "$154_8$", and if not selected the flow returns to the start by the branch instruction BCF SRT at next address "$155_8$", but if the full automatic selection switch FAT is selected and put in, the set / reset state of the flip-flop FMDC for mode change is inversed by the switch instruction SWT FMDC at next address "$156_8$". Therefore the flip-flop FMDC for mode change which was in the reset state at the beginning is not placed in set state. Next the set / reset state of the above flip-flop FMDC is sensed by the sense flag instruction SFG FMDC at address "$157_8$", and if it is not at the set state, the flow returns to the start by the branch instruction BCF SRT at next address "$160_8$", but in this case, since said flip-flop FMDC is at set state, the flow returns to the branch BRC by the branch instruction BUBRC at next address "$161_8$".

At this time the newly set maximum diaphragm aperture value AMX or minimum diaphragm aperture value AMN is read into the main register AR as the diaphragm aperture value Av and as the flow comes to the address "$124_8$" from the branch BRC through shutter time preference routine, the set / reset state of the above mentioned flip-flop FMDC is sensed by the sense flag instruction SFG·FMDC. And in this case since the flip-flop FMDC has been set at the previous address "$156_8$", the flow transfers to the branch AP 1 following the branch instruction BCTAP 1 at next address "$125_8$". The branch AP 1 is the branch within the diaphragm aperture preference routine and is the branch to proceed to forward flow after reading in the already set diaphragm aperture value Av into the main register AR, therefore when the flow enters into this branch AP 1 receiving the mode change, the diaphragm aperture preference routine is carried out using the set maximum diaphragm aperture value AMX or minimum diaphragm aperture value AMN as newly set diaphragm aperture value Av.

The flow which enters into the branch CAL4 following the branch instruction BCF CAL4 at address "$163_8$" has first the state of the flip-flop FMDC for mode change sensed by the sense flag instruction SFGFMDC, and if it enters into this branch CAL4 without receiving mode change, as the above mentioned flip-flop FMDC is in reset state the flow enters into the branch DISP by the branch instruction BCTDISP at the next address "$170_8$". And when the flow enters into this branch CAL4 receiving mode change the flow enters into next address "$171_8$", where the reset instruction RSTFOVR is issued, further the reset instruction RST FUDR is issued at next address "$172_8$", then reset signal is inputted into the flip-flop for over flow indication and the flip-flop FUDR for under flow indication, and the flow enters into the branch DISP after resetting the flip-flop for over or under flow indication which has been set before receiving mode change.

At the branch DISP 1, first sense flag instruction SSLC is issued to sense whether or not the shutter speed Tv is selected, and since the shutter speed Tv is selected naturally at the shutter time preference routine, the flow transfers to address "$175_8$", where the sense flag instruction SFG FMDC is issued to sense the set / reset state of the flip-flop FMDC for mode change. If said flip-flop FMDC is in set state, the flow enters into the branch DISP3 following the branch instruction DCTDISP3 at the next address "$176_8$". But in this case since said flip-flop FMDC is in the reset state the flow transfers to the next address "177". Here, the sense flag instruction SFG·ASLC is issued to sense whether the diaphragm aperture value Av is selected or not. As the diaphragm aperture value Av is not selected in the shutter time preference routine the flow directly enters into the branch DISP2 at address "$201_8$".

At the branch DISP2, the swap instruction SWPDR is issued, and the diaphragm aperture value data Av written into the main register AR as a result of arithmetic at address "$145_8$" is swapped with the shutter speed data Tv which has been written into the main register AR from the exposure time setting means TV through the load instruction LDTV at the previous address "$126_8$" and has been written into the register DR following the store instruction STRDR at address "$127_8$", and the flow enters into next branch DISP3.

At this time the originally set shutter speed Tv is written into the main register AR and the diaphragm aperture value Av which has been computed at the previous address "$145_8$" is written into the register DR.

Concerning the control flow from the branch DISP3 to the branch CNTR explanations have already been made in the explanations for manual routine.

When the diaphragm aperture value Av which has been computed against the set shutter speed Tv is not between the set maximum value AMX and minimum value AMN in the shutter time preference routine, the flow returns to the start by the branch instruction BCF SRT at address "$160_8$" as has been explained previously to repeat same arithmetic operations. And when the object brightness, the set value of exposure time or the maximum or minimum set value of the diaphragm aperture value has changed during said period and the computed diaphragm aperture value Av comes into between the maximum value and the minimum value of the set diaphragm aperture value, the flow enters into the branch CAL4 through the branch instruction BCF CAL4 at address "$163_8$", thus the shutter speed Tv and the diaphragm aperture value Av for control can be obtained as has been explained previously. When the full automatic selection switch FAT is selected, the flip-flop FMDC for mode change is inversed at address "$156_8$" as mentioned before, and the flow enters into the branch 1 through the branches BRC, BRC 1. At this time the set maximum diaphragm aperture value AMX or minimum diaphragm aperture value AMN has been written into the main register AR as the newly set diaphragm aperture value, and this value is written into the register DR by the store instruction STRDR at address "$137_8$".

After that the load instruction LDTMN is issued at address "$140_8$", and the minimum exposure time data TMN is taken into the main register AR from the minimum exposure time setting means TMN, and said data TMN is written into the register ER through the store instruction STRFR at next address "$141_8$". Next, the load instrucction LDTMX is issued at next address "$142_8$" and the maximum exposure time data TMX is taken into the main register AR from the maximum exposure time setting means TMX, then the above mentioned data TMX is written into the register FR through the store instruction STRFR at the branch CAL 1 at next address "$143_8$".

Through the above flow the exposure volume data EV is written into the register CR and the maximum or minimum diaphragm aperture value data is written into the register DR, while the minimum exposure time data TMN is written into the register ER and the maximum exposure time data TMX is written into the register FR.

Then the exposure volume data Ev which has been written into the register CR by the load instruction LDCR at address "$144_8$", is taken into the main register AR, further the maximum or minimum diaphragm aperture value data of the register DR is subtracted from the data Ev of the main register by the sub-instruction SUBDR at address "$145_8$", then the value Tv obtained as a result is written into the main register AR as the shutter speed data.

In the event the exposure volume Ev is smaller than the maximum or minimum diaphragm aperture value and borrow is generated as a result of above subtraction, such state is detected by the sense flag instruction SFGCA at next address "$146_8$", to transfer the flow to the branch CAL2 by the branch instruction BCT CAL2 at next address "$147_8$". When borrow is not generated in the result of above arithmetic, a sensing is done whether or not the shutter speed data Tv obtained as a result of arithmetic is greater than the minimum exposure time TMN written in the register ER, and if said data Tv is greater than the minimum exposure time TMN, the flow transfers to the branch instruction BCT CAL3 at next address "$151_8$", but when said data Tv is not greater than the data TMN the flow enters into the branch CAL2.

At branch CAL2 a set signal is inputted into the flip-flop FODR for under flow indication by the set instruction SET FUDR at address "$152_8$", further the minimum exposure time TMN written into the register ER is read into the main register AR by the load instruction LDER at next address "$153_8$", then the flow enters into the branch CAL5.

Also at the branch CAL3, first a sensing is done as to whether or not the previous shutter speed data Tv is greater than the maximum exposure time TMX written into the register FR by the greater than instruction GTFR at address "$162_8$", and if said data Tv is not greater than the maximum exposure time TMX, the flow transfers to the branch CAL4 by the branch instruction BCF CAL4 at next address "$163_8$", but when the above mentioned data Tv is greater than the data TMX, a set signal is inputted into the flip-flop FOVR for over flow indication by the set instruction SET FOVR at address "$164_8$", further the maximum exposure time TMX which has been written into the register FR is read into the main register AR by the load instruction LDFR at next address "$165_8$", then the flow transfers to the branch CAL5 following the branch instruction BUCAL5 at address "$166_8$".

At branch CAL5, first a sensing is done as to whether or not the full automatic selection switch FAT is put in by the sense flag instruction SFGFAT at address "$154_8$", and in this case since the full automatic selection switch FAT is put in and selected, the set / reset state of the flip-flop FMDC for mode change is inversed by the switch instruction SWT FMDC at next address "$156_8$". Therefore the flip-flop FMDC for mode change which has been once placed in the set state is inversedly reset. Then the set / reset state of the above mentioned flip-flop FMDC is sensed by the sense flag instruction SFG FMDC at address "$157_8$", and in this case as said flip-flop is in the reset state, the flow returns to the start by the branch instruction BCF SRT at next address "$160_8$".

In the event the flow comes to the CAL4 following the branch instruction BCF CAL4 at address "$163_8$", first the state of the flip-flop FMDC for mode change is sensed by the sense flag instruction SFG FMDC, and in this case the flow is coming into this branch CAL4 receiving the mode change, the above mentioned flip-flop FMDC is in the reset state, therefore the flow enters into the next address "$171_8$", where the reset instruction RST FOVR is issued, further the reset instruction STFUDR is issued at next address "$172_8$", and a reset signal is inputted into the flip-flop FOVR for over flo indication and the flip-flop FUDR for under flow indication, thus the flow enters into the branch DISP after resetting the flip-flop for over or under flow indication which has been set before receiving mode change.

At the branch DISP, first the sense flag instruction SFG SSLC is issued to sense whether or not the shutter speed Tv has been selected, and it has naturally been selected in the shutter time preference routine, thus the flow transfers to the address "175$_8$", where the sense flag instruction SFG FMDC is issued to sense the set / reset state of the flip-flop FMDC for mode change. In this case since said flip-flop FMDC is in the set state, the flow enters into the branch DISP3 at address "202$_8$" following the branch instruction BCT DISP3 at next address "176$_8$".

At this time the shutter speed data Tv which has been computed by the sub-instruction SUBDR at the previous address "145$_8$" has been written into the main register AR, and the maximum diaphragm aperture value AMX or the minimum diaphragm aperture value AMN, which has been written into the main register AR by the load instruction LDER at the previous address "153$_8$" or the load instruction LDFR at address "165$_8$" and has been written into the register DR by the store instruction STR DR at address "137$_8$" as the diaphragm aperture value newly set by mode change, will have been written into the register DR.

Concerning the control flow from the branch DISP3 to the branch CNTR, explanations have been made in the description for the manual routine.

In the shutter time preference routine the shutter speed Tv and the stop down step number Avs which are used in actual control are obtained at the control register MTV and MAP, through the control flow mentioned above, and the control flow enters into the branch CNTR through the above mentioned flow.

Also at the program routine which starts at the branch PRG, first the program constant PCN is taken into the main register AR from the program constant setting means PRCN following the load instruction LDPRCN at address "220$_8$", further said data PCN is written into the register ER following the store instruction STRER at next address "221$_8$". While said program constant PCN is the constant to be selected between 0 to 7, it is given in such number code as shown in the Code Table of FIG. 11 against the main register AR. Next, the exposure volume data Ev is read into the main register AR from the register CR by the load instruction LDCR at address "221$_8$". Then, the data within the main register AR receive the shift as much as 3 bits to right direction that is to the direction of lower unit (place) by the 3 pieces of right shift instructions RSFAR at the addresses "223$_8$", "224$_8$", "225$_8$". As the data Ev within the main register AR becomes ½ every time it receives 1 bit of right shift, the data within the main register AR finally becomes Ev/8. The data $Ev/8$ obtained as above is written into the register DR following the store instruction STRDR at next address "226$_8$". Then the number data "000$_8$" is written into the main register AR by the load immediate instruction LDI.000 at the address "227$_8$" to virtually clear the main register AR, thus the flow transfers to the branch PRG 1 at address "230$_8$".

At the branch PRG1, first sense register instruction SRGER is issued to sense whether or not the data PCN written into the register ER is non-zero. Here, when the data PCN is non-zero, the data $Ev/8$ of the register DR is added to the data "000$_8$" at the main register AR by the add instruction ADD.DR at address "232$_8$", thus the data at said register AR becomes $Ev/8$. Then subtraction of "1" is made from the data PCN of the register ER by the decrement instruction DCR.ER at address "233$_8$", thus the data of said register ER becomes PCN − 1, and the flow returns to the branch PRG 1 by the branch instruction PRG 1 at address "234$_8$". After that similar procedures are repeated and when the data $Ev/8$ of the register DR is added m times to the main register AR, the data of the main register AR becomes $Ev/8 \times m$ and at the same time the data of the register ER will becomes PCN − m by subtracting "1" from PCN for m times. Next, when the data of the register ER becomes such as not being non-zero, that is "000$_8$" by the sense register instruction SRG.ER in the branch PRG 1, the flow transfers to the branch PRG2 by the branch instruction BCF PRG2 at next address "231$_8$", and since the data PCN − m of the register ER becomes "000$_8$" at this time, such data as $Ev/8 \times$ PCN is written in the main register AR. Thus resultantly arithmetics of $Av = PCN \cdot Ev/8$ shown in equation (20) is done, and the diaphragm aperture value Av which is set for obtaining appropriate exposure is obtained.

At the branch PRG2, a sensing is done whether or not the previously obtained diaphragm aperture value Av is greater than the minimum diaphragm aperture value AMN originally set by the greater-than instruction GTAMN at address "235$_8$". If the diaphragm aperture value Av is not greater than the minimum diaphragm aperture value AMN, the minimum diaphragm aperture value AMN is read into the main register AR by the load instruction LDAMN at address "237$_8$", and the flow enters into the branch AP 1 by the branch instruction BUAP 1 at the next address but when the diaphragm aperture value Av is greater than the minimum diaphragm aperture value AMN, the flow enters into the branch PRG3 by the branch instruction BCT PRG3 at next address "236$_8$".

At the branch PRG3, a sensing is done whether or not the previously obtained diaphragm aperture value Av is greater than the maximum diaphragm aperture value AMX originally set by the greater than instruction GTAMX at address "241$_8$". If the diaphragm aperture value Av is not greater than the maximum diaphragm aperture value AMX the flow enters into the branch AP 1 by the branch instruction BCFAP 1 at address "242$_8$", but when the diaphragm aperture value Av is greater than he maximum diaphragm aperture value AMX, the maximum diaphragm aperture value AMX is read into the main register AR by the load instruction LDAMX at address "243$_8$". After that the flow enters into the branch AP 1 by the branch instruction BUAP 1 at address "244$_8$".

While the diaphragm aperture value Av which has been computed following the program constant being set between the set maximum and minimum diaphragm aperture values will be obtained at the main register AR, the flow after the branch AP 1 is exactly same as the flow at the previously mentioned diaphragm aperture preference routine, and such shutter speed Tv as necessary for obtaining appropriate exposure is computed using the diaphragm aperture value Av obtained as a result of program arithmetic as the set diaphragm aperture value.

As has been explained above in the program arithmetic routine exactly same flow as in the case of diaphragm aperture value preference will be made from the branch AP 1 to the branch CNTR, and when the flow reaches the branch CNTR, the shutter speed Tv and the stop down step number Avs which are used in actual control is obtained at the control registers MTV and MAP.

As has been explained above the computer shutter speed Tv and diaphragm aperture value Av are written into the control registers MTV and MAP through each routine of the manual, diaphragm aperture preference, shutter time preference, and program arithmetics, as the flow reaches the branch CNTR, and at the branch CNTR first it is sensed whether or not the shutter release switch means SHTR is put in or not by the sense flag instruction SFG SHTR. And if the shutter release has not been done, next it is sensed whether or not the EE lock switch means SHTR is put in by the sense flag instruction SFG EELK at address "$212_8$". Here, if the EE lock switch means EELK is not put in, the flow returns to the start by the branch instruction BU.SRT at address "$214_8$" and photo-sensing and arithmetics are done again then the flow reaches the branch CNTR. But if the EE lock switch means EELK is put in, the flow returns to the branch CNTR by the branch instruction BCT.CNTR at address "$213_8$". Therefore as long as the above mentioned EE lock switch means EELK is put in, the shutter speed T$v$ and the diaphragm aperture value A$v$ memorized in the control registers MTV and MAP will not be changed even if the conditions of an object varies.

In the event that the shutter release is done as the flow reaches the branch CNTR, it is sensed by the sense flag instruction SHTR at address "$210_8$" and the flow enters into the branch SELF at address "$245_8$", following the branch instruction BCT SELF at next address "$211_8$".

At the branch SELF, first the load instruction LDSELF is issued and the self timer Sft being set by the self timer time setting means SELF is read into the main register AR. Next, it is sensed whether or not the data of the self timer time Sft of the main register AR is non-zero, by the sense register instruction SRG.AR. Here, if the self timer time Sft is set at "0" second since the data of the main register AR is naturally "000" from the Code Table shown in FIG. 11, the flow transfers to the branch RCR by the branch instruction BLF RCR at next address "$247_8$". When the self timer time Sft has been set, the flow enters into the sub-routine ST.TM of a set up timer by the branch instruction BL.ST.TM at address "$250_8$".

At the sub-routine ST.TM of the set up timer, first the set up instruction SUTM is issued at address "$037_8$" and "1" is set up at the lowest unit bit of the timer register TMR through the set up circuit SU. Next the flow enters into the branch ST 1 and the sense flag instruction SFGCA is issued. Here it is sensed whether or not a carry is generated at the main register AR, and as carry is not generated at this stage, the flow transfers to the address $042_8$", where sub-immediate instruction SBIOIO is issued, and "$010_8$" is subtracted from the data of the main register AR. Then, the left shift instruction LSTM is issued at address "$043_8$", and a signal is provided through the left shift circuit LS to shift the "1" set up at the lowest unit bit of the timer register TMR to left that is towards the upper unit bits by one bit. The data within the timer register TMR is doubled through this process.

The flow returns to the branch ST 1, through the above mentioned flow, by the branch instruction BUST 1 at next address "$044_8$", and at said branch the sense flag instruction SFG.OA is issued again and it is sensed whether or not a carry is generated as a result of subtraction following the previous sub-immediate instruction SBI.010. Then similar process is repeated until a carry is detected as a result of the sense flag instruction SFG.CA at the branch ST 1, and when carry is detected the flow transfers to the branch RETN at address "$036_8$" following the branch instruction BCT RETN at next address "$042_8$". At the branch RETN a return instruction RTN is issued and the flow returns from the sub-routine of the set-up timer to the main routine.

The self timer Sft set at the main register AR is read in at the sub-routine ST.TM at the above mentioned set up timer and such process is repeated that the "1" set up at the lowest unit bit at the timer register TMR is shifted to left by one bit every time "$010_8$" is subtracted from said data Sft until the Sft - "$010_8$" - "$010_8$" - ... becomes not being over "$000_8$", that is until borrow is generated, thereby the data of $2^n$ is written into the timer register TMR. However, since index expansion is done until borrow is generated in the result of subtraction there, such index $n$ is given as satisfying $-1 \leq$ Sft - "$010_8$" $\times n < 0$. Therefore such index expansion value of Sft as being obtained by emission of such fractions as being smaller than "$010_8$" of Sft is given by $2^{n-1}$. Since a pulse of one 8192nd second is used as the reference time pulse as mentioned above while the value of the self timer time data Sft in this example is set up based on the reference time of one 4096th second, the self timer time Sft being index expanded by the timer register TMR is to correspond to the actual time as it is against the pulse of one 8192nd second. For example, when the self timer Sft is given by the number code "$160_8$", its actual time expansion time is $$\frac{2^{"160_8"}}{4096} = \frac{2^{14}}{4096} = 4 \text{ seconds}$$

as being apparent from the Code Table of FIG. 11. But the self timer time data being index expanded at the timer register TMR becomes $2^{"160_8" + "010_8"} = 2^{15}$. But if this value is made to such value as corresponding to one 8192nd second its actual time expansion value becomes $(2^{15}/8192) = 4$ seconds and it can be made to correspond to the required self timer time.

The flow which has returned to the main routine, setting up the index expansion value of such self timer time as corresponding to one 8192nd second at the timer register as has been explained above, enters into the sub-routine EX.TM of acutal time expansion following the branch instruction BLEX.TM address "250".

At the actual time expansion sub routine EX.TM, first the sense zero timer instruction SZTM of address "$045_8$" is issued and it is sensed whether or not the content data of the timer register TMR is "000 . . . 0" through the zero detection circuit ZD. And as the data of the timer register TMR is not "0 . . . 00" in the beginning, the flow enters into the branch Ex 1 at address "$047_8$". At the branch EX 1, the output of the reference time pulse generator CTP of one 8192nd second is detected by the sense flag instruction SFG.CTP. And as long as said output is "0", the flow enters into such closed roop as returning to the branch EX 1 and outputting the sense flag instruction SFG.CTP following the branch instruction BCF.EX 1. But when the output of the above mentioned reference time pulse generator CTP becomes "1", the decrement timer instruction DCTM at address "$051_8$" is issued and the flow enters into the branch EX2 substracting "1" from the data of the timer register TMR. At the branch EX2 the output of the reference time pulse generator CTP is detected by the sense flag instruction SFG.CTP. And being contrary to the sensing at the previous branch EX 1, as long as said output is "1", the flow enters into such closed roop as returning to the branch EX2 and outputting again the sense flag instruction SFG.CTP, following the branch instruction BCTEX 1. But as the output of the above mentioned reference time pulse generator CTP becomes "0", the flow returns to the beginning of this sub-routine EX.TM, following the branch instruction BU.EX.TM. Then it is sensed whether the data of the timer register TMR becomes "00 . . . 0" by the sense zero timer instruction again. That is such process, that ever time one pulse of one 8192nd second is outputted from the reference time pulse generator CTP, subtraction of "1" is made from the self timer time data $2^n$ being index expanded and memorized within the timer register TMR and then the data "00 . . . 0" within the timer register TMR is sensed, is repeated until the data of said timer register TMR becomes "00 . . . 0", thereby the pulse of virtually one 8192nd second is counted as much as the number of the self timer data $2^n$ within the above mentioned timer register TMR, thus actual time is to be obtained. The folow enters into the branch RETN following the branch instruction BCT RETN, at the point when the data within the timer register TMR becomes "00 . . . 0" as a result of the sense zero timer instruction, that is at the time when the actual time of $(2^n/8192)$ is obtained, then the flow receives the return instruction RTN and enters into the branch RCR of the main routine.

At the branch RCR, the fully open diaphargm aperture value data Avo is read into the main register by the load instruction LD.OPF from the fully open diaphragm aperture value input mens OPF of a photographing lens. Next, the control flow enters into the branch RCR 1 at address ¢$253_8$", for obtaining the curvature error Avo at the fully open position of a photographing lens, and the data Avo of the main register and the data "$037_8$" are compared by the greater than immediate instruction GIT037. This comparsion is to sense whether or not the F-value of the fully open diaphragm aperture value Avo is $f4$ or more, and if the fully open diaphragm aperture value is $f4$ or more, that is, "$040_8$" or more in number code, the control flow enters into the branch RCR 2 at address "$260_8$" by the branch instruction BCT RCR 2 at address "$254_8$". But if it is less than that "$001_8$" is added to the register GR by the increment instruction IGR GR at next address "$255_8$". Next "$004_8$" is added to the data of the fully open diaphragm aperture value Avo of the main register AR by the add-immediate instruction ADI.004 at address "$256_8$", then the branch instruction BU.RCR 1 is issued at address "$257_8$" and the flow returns to the branch RCR 1, where the greater than immediate instruction GIT037 is issued again and it is sensed whether the data Avo + "$004_8$" of the main register AR to which the data "$004_8$" is added previously has become greater than the data "$037_8$". Here, when the data Avo + "$004_8$" is not greater than the data "$037_8$", "$001_8$" is added to the register GR again, and "$004_8$" is added to the data of the main register Ar. And this process is to be repeated until the data of the main register, Avo + "$004_8$" + "$004_8$" + . . . become greater than the data "$037_8$". And at the point when the data of the main register AR becomes greater than "$037_8$", the control flow enters into the branch RCR2 by the branch instruction BCTRCR2 at address "$254_8$".

The curvature error Avc is to be left at the register GR through the above mentioned flow and this is based on such definition that the curvature error Avc becomes $\frac{1}{4}$ step for every one step of its step number difference against the F-number $f4$ of the fully open diaphragm aperture Avo of the lens used. And while such arithmetic is repeated as adding "$004_8$" that is $\frac{1}{2}$ step to the fully open diaphragm aperture value Avo of a photographing lens every time "$001_8$" that is the correction amount of $\frac{1}{4}$ step is added to the register GR, the data, avo + "$004_8$" + . . . which is written into the main register AR at that time is compared with "$037_8$" by the greater than immediate instruction GIT037 at address "$253_8$", and addition of "$001_8$" that is the correction amount of $\frac{1}{4}$step each to the register GR is stopped when said data exceeds "$037_8$", thus the curvature error Avc can be obtaned within the register GR.

Next, at the address RCR2, first the load instruction LDMAP is issued and the stop down step number value Avs for control is taken into the main register AR from the diaphragm control register MAP. Next, the add instruction ADDOPF is issued at address "$261_8$" and the fully open diaphragm aperture value of the lens used is added to the data Avs of the main register AR, and the data of said register AR becomes Avo + Avs, that is the control diaphragm value Av for conducting exposure.

Then the control flow enters into the branch RCR3 at address "$262_8$" to conduct arithmetic of the difference Avc − Avc' between the curvature error Avc' at actual stop down and the curvature error Avc at fully opened time, and the greater than instruction GIT037 is issued there to compare the diaphragm aperture value Av obtained previously at the main register AR with the data "$037_8$". In this comparison the diaphragm aperture value Av has its F-value sensed whether it is $f4$ or more. And when the diaphragm aperture value Av is $f4$ or more, that is "$040_8$" or more in number code, the control flow enters into the branch STAP at address "$267_8$" by the branch instruction BCTSTAP at address "$263_8$". But when the same value is other than the above, "$001_8$" is substracted from the data Avc obtained previously at the register GR by the decrement instruction DCRGR at next address "$264_8$". Next, "$004_8$" is added to the diaphragm aperture value data Av of the main register AR by the add-immediate instruction ADI.004 at address "$265_8$", then the branch instruction BURCR3 is issued at address "$260_8$", and the flow returns to the branch RCR3, where the greater than immediate instruction is issued again to sense whether or not the data, Av + "$004_8$" of the main register AR to which the data "$004_8$" is added becomes greater than the data "$037_8$". Here, when the data Av + "$004_8$" are not grater than the data "$037_8$", "$001_8$" is subtracted from the data of the register GR and "$004_8$" is added to the data of the main register Ar. And this process is repeated until the data, Avo + "$004_8$" + "$004_8$" + . . . of the main register AR becomes greater than the data "$037_8$", and when the data of the main register AR becomes greater than "$037_8$", the control flow enters into the branch STAP by the branch instruction BUSTA at address "$263_8$".

Through the above mentioned flow, Avc − Avc' is to be left at the register GR, and this is based on the definition that the curvature error Avc' of the stopped down lens becomes $\frac{1}{4}$ step for every one step of its difference in step number against the F-number, $f4$ of the diaphragm aperture value Av at the time of stop down.

While repeating such arithmetic as adding "$004_8$". that is $\frac{1}{2}$ step to the diaphragm aperture value Av at the time of stop down, every time "$001_8$" that is the correction amount of $\frac{1}{4}$ step is substracted from the data of the register GR, the data, Av + "$004_8$" + "$004_8$" + . . . . .

written into the main register AR at that time is compared with the data "$037_8$" by the greater than immediate instruction GTI037 at address "$262_8$", and the substraction of "$001_8$" that is the correction amount of ⅛ step each from the data Avc of the register GR is stopped at the point when the above mentioned data exceeds "$037_8$", thus finally the data $Avc - Avc'$ which is obtained by subtracting the curvature error $Avc'$ at the time of stop down from the curvature error $Avc$ of fully open aperture of a lens can be obtained.

At the branch STAP the branch instruction BLMLV is issued and the control flow enters into the photo-sensing sub-routine MLV.

The control flow at the photo-sensing sub-routine MLV is as has been explained previously, and the fully open aperture photo-sensed volume Bvo against object brightness Bv at that time has been obtained at the register BR at the time when the flow returns to the address "$270_8$" of the main routine, from said sub-routine MLV. And by the load instruction LDBR at next address "$270_8$" said data Bvo is written into the main register AR. Then the control stop down step number data Avs of the diaphragm aperture control register MAP is subtracted from the data Bvo of the main register AR by the sub-instruction SUBMAP at address "$271_8$", and the data $Avc - Avc'$ of the register GR is added to the data $Bvo - Avs$ of the main register AR by the add instruction ADDGR at address "$272_8$", thus finally the arithmetic, $Bvo - Avs + Avc - Avc'$ shown at the right side of the equation (23) is done at the main register AR. Therefore the supposed volume of the amount of light received $Bvo'$ which is supposed to be obtained when the control stop down step number Avs is actually stopped down as has been explained previously is obtained at the main register Ar.

Next, a control signal enters into the flip-flop FAPL for stop-down driving of the lens from the flip-flop control means FP by the set instruction SET FAPL at address "$273_8$" to start stop down, and the flow enters into the branch STAP2 at address "$274_8$". The data $Bvo'$ of the main register AR is inputted into one input terminal of the analogue comparator ACOMP after being converted into the analogue value through the digital-analogue converter DAC. And the analogue value of the amount of light received Bvo of the object light $Bv'$ which is incident through the lens which is being stopped down is inputted to the other input terminal of said analouge comparator ACOMP from the photo-sensing circuit AMV, thus these two values are always compared.

At the branch STAP 1, the sense flag instuction SFGCOMP to sense the output of said analogue comparator ACOMP is issued, and the output of the stop down completion switch AEND which detects stop down volume coming to its limit is sensed by the sense flag instruction SFG.AEND at address "$276_8$" while the output of said comparator ACOMP is "1" that is while the amount of light received Bvo is greater than the supposed value $Bvo'$, and when the stop down volume has not reached the limit, the flow returns to the branch STAP 1 by the branch instruction BCF STAP 1 at next address "$277_8$". When stop down driving is done while above process is repeated and the amount of light received Bvo of the object light $Bv'$ which is incident through the lens being stopped down becomes equal to or exceeds the supposed value data $Bvo'$, the output of the analogue comparator ACOMP becomes "0". Therefore the flow enters into the branch STAP2 by the branch instruction BCF STAP2 at address "$275_8$". Also when the stop down volume reaches limit before said amount of light received Bvo becomes equal to or exceeds the supposed value data $Bvo'$, it is recognized by the sense flag instruction SFG AEND at address "$276_8$", and similarly the flow enters into the branch STAP2.

When the flow enters into the branch STAP2, flip-flop TAPL for stop down driving is reset by the reset instruction RSTFAPL at address "$300_8$" to stop down operation. When the amount of light received Bvo reaches the supposed value $Bvo'$ through the above operations the stop down step number Avs memorized in the stop down control register MAP has been stopped down.

Next, the set instruction SET FMUP at address "$301_8$" is issued and control signal enters into the flip-flop for push up driving of a swing-up mirror from the flip-flop control means FP to start mirror up, and the flow enters into the branch MLUP at address "$302_8$".

At the branch MLUP the sense flag instruction SFG MLUP is issued to sense the state of the switch means MLUP being put into when miror up is completed. When the mirror up is not completed the flow returns to the branch MLUP by the branch instruction BCF MLUP at address "$303_8$", thus sensing for whether or not mirror up is completed is done again, and this process is repeated until the mirror up is completed. When mirror up is completed it is detected by the sense flag instruction SFG MLUP, and the flow transfers to address "$304_8$", where the reset instruction RST FMUP is issued to reset the flip-flop FMUP for mirror up control, thus mirror up driving is stopped.

Next the load immediate instruction LDI240 is issued at address "$305_8$" and the data "$240_8$" is written into the main register AR. Then sub-instruction SUB.MTV is issued at address "$305_8$" and the shutter speed data Tv which has been written into the exposure time control register MTV is substracted from the data "$240_8$" which has been written into the main register previously. Thus the step number corresponding such apex value as based on the reference of one 4096th second, the shutter speed data Tv, that is the number code "$240_8$" can be obtained.

Next the control flow enters into the sub-routine of the set up timer by the branch instruction BL.ST.TM at address "$306_8$", and as has been explained previously, the index expansion value $$2^{[240_8 - \frac{Tv}{10_8}]+1}$$

of the data, in which fractions less than 1 step of the step number against one 4096 second of the shutter speed Tv is counted up, can be obtained at the timer register.

As the flow returns to the main routine from the sub-routine of the set up timer ST.TM the set instruction SET.FFCS is issued at address "$310_8$", and control signal is given to the flip-flop FFOS for front screen start driving which composes a focal plane shutter, through the flip-flop control means, to start the front screen, thus exposure to the film surface is started.

Then the control flow enters into the sub-routine EX.TM of actual time expansion by the branch instruction BL.EX.TM at address "$311_8$".

At the sub-routine EX.TM, as has been explained previously such subtraction is repeated as subtracting "1" from the data $$2^{[240_8 - \frac{Tv}{10_8}]+1}$$

obtained at the timer register TMR for each one of the reference time pulse of one 8096th second, thus finally the actual time of $$\frac{1}{8096} \times 2^{[240_8 - \frac{Tv}{10_8}]+1}$$

is obtained.

When the above mentioned actual time is obtained, the control flow returns to the main flow to reset the flip-flop FFCS for front screen starting through the reset instruction RST.FFCS at next address "$312_8$", and at the same time the set instruction SET.FSCS is issued at next address "$313_8$". And control signal is given to the flip-flop FSCS for rear screen start driving which composes the above mentioned focal plane shutter through the flip-flop control means FP and the rear screen is started to start stopping action of exposure on film surface, and the flow enters into the branch DSCE at address "$314_8$".

At the branch DSCE, the sense flag instruction SFG DSCE is issued to sense the state of the switch means DSCE which is put in when said running of rear screen is completed that is when exposure is completed. When the running of the rear screen is not completed the flow returns to the branch DSCE by the branch instruction BCF DSCE at address "$315_8$" to sense again whether or not the running of the rear screen completed, and this process is repeated until the running of the rear screen is completed. When the running of the rear screen is completed it is detected by the sense flag instruction SFG DSCE and the flow transfers to address "$316_8$", where the reset instruction RST.FSCS is issued to reset the flip-flop FSCS for controlling the rear screen starting.

Then the flip-flop FMDC for mode change, the flip-flop FOVR for over flow indication, and the flip-flop RUDR for under flow indication are reset by the reset instructions RSTFMDC, RSTFOVR, RSTFUDR, respectively at addresses "$317_8$" to "$321_8$". Then after reading "$000_8$" into the main register AR through the load immediate instruction LDI.000 at next address "$322_8$", the "$000_8$" is written into each of the register MAP for diaphragm aperture control, the exposure time control register MTV, the error step number indication register ERD, the exposure time indication register TVD and the diaphragm aperture value indication register APD in the order given through each of the store instructions, STR.MAP, STR.MTV, STR.ERD, STR.TVD, STR.APD at addresses "$323_8$" to "$327_8$", respectively, thus virtually clearing each of said registers.

After carrying out all of the above mentioned control flows, the flow returns to the branch SRT, that is the starting point, and same operation is done again to effect exposure control.

While the above explanations on the example shown in FIG. 8 has been made on such case that the arithmetics are made emitting the fractions of the value being less than 1 step in the apex value for simplification of explanations in obtaining actual time of the self timer time and the shutter speed, now a method to obtain actual time by considering such digital value as being down to ⅛ step in the apex value will be explained.

The octal notation figure code with 3 units has, as has been described previously, the weight of ⅛ at the lowest unit (place), the weight of 1 at the second unit (place) and the weight of 8 at its highest unit (place), and has such logical composition as 3 bits, 3 bits, and 2 bits at each unit, respectively.

Now, explanations will be made on the control of shutter speed Tv. For example one 4096th second is considered as the reference. While the step number equivalent to the apex value of such actual time as corresponding to one 4096th second can be expressed by "240" − Tv, in this case it is to be expressed by $8X + Y + Z/8$. In this formula, $0 \leq X, Y, Z \leq 7$ and each of X, Y, Z is integer value. While the shutter speed represented by the apex value Tv means $$2^{8X + Y + (Z/8)}$$

times against (1/4096) second, very complicated process is required for arithmetic of $2^{(Z/8)}$ in digital value, therefore in this case $2^{(Z/8)}$ is approximated to $1 + (Z/8)$. The relationship between $2^{(Z/8)}$ and $1 + (Z/8)$ when each of the integer values of 1, 2, - 7 is given to Z at this time is shown in FIG. 19.

That is when $2^{(Z/8)}$ is approximated to $1 + (Z/8)$, the error thereof will be about 0.085 step when $Z = 4$, in the maximum value as the step number equivalent to the apex value, and is sufficiently allowable against the exposure time data Tv which has ⅛ step as the minimum unit.

Therefore the shutter speed obtained by such arithmetics as using $1 + (Z/8)$ in place of $2^{(Z/8)}$ will be such time as $(1 + (Z/8)) 2^{8X + Y}$ times. This means exactly same as making time counting of $(8 + Z) 2^{8X+Y}$ times against $(1/4096) \times (1/8)$ second.

This is for the timer register TMR, first after the data of $8 + Z$ is written a shifting of $8X + Y$ bits to left direction that is towards upper bit direction is made, thereby the data as $(8 + Z)2^{8X+Y}$ can be written. Then by conducting subtraction of "1" by "1" from the data $(8 + Z)2^{8X+Y}$ within the timer register TMR in synchronism with the reference time pulse of $(1/4096) \times (1/8)$ second, such actual time as corresponding to the apex value Tv of shutter speed at the time when the data of said register TMR becomes "00 . . . 0".

Figure 20:
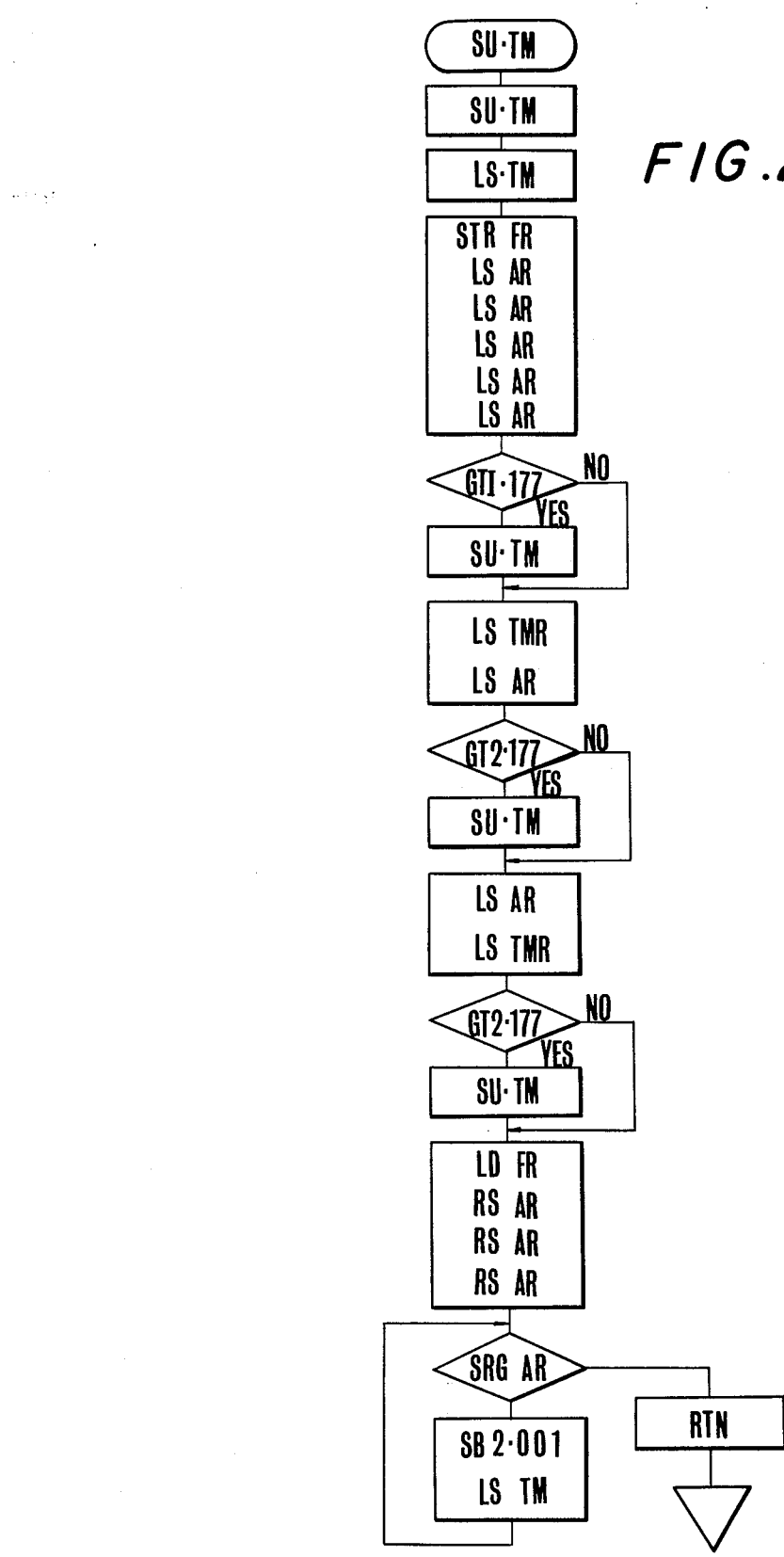
FIG. 20 is a flow chart of a set up timer sub routine of the device shown in FIG. 8, and is a flow chart to control the shutter speed with the accuracy of ⅛ step.

When such method is applied to an exposure control device having a composition shown in FIG. 8, the above mentioned object can be realized by making the reference time pulse which is the output of the reference time pulse generator CTP as the pulse of $(1/4096 \times 8)$ second, at the same time composing a set up timer TMR with 23 bits, and applying the control flow shown in FIG. 20 to the sub-routine SU.TM of the set up timer.

Figure 21:
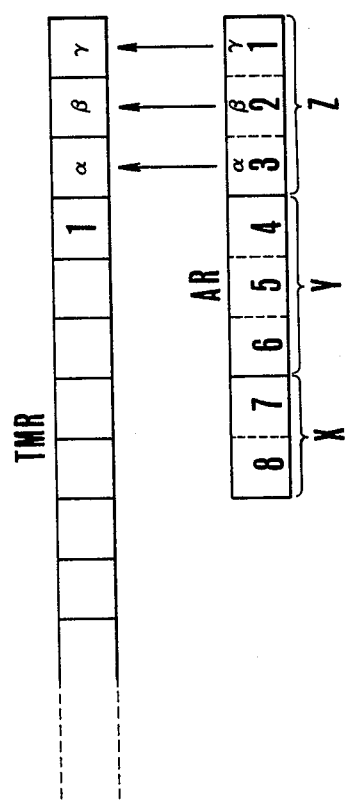
FIG. 21 is a data relation diagram to show the relationship between the timer register and the main register generated when the flow chart shown in FIG. 20 is carried out.

That is, in order to write $8 + Z$ into the time register TMR, "1" is set up at the 4th bit from the lowest of the timer register TMR, and at the same time the lower 3 bits of the data of the exposure time Tv or the data of the self timer time, which is written into the main register AR, at the lower 3 bits. In order to realize the same, first, as shown in FIG. 20, "1" is set up, by the set up instruction SUTM, at the lowest bit of the time register TMR, then said "1" is shifted to the second bit according to the left shift instruction LSTM. Then after writing the exposure time Tv or the self timer time data within the main register AR into the register FR by the store instruction STR, the left shift operation of the main register AR by the left shift instruction LS.AR is repeated for 5 times, and the lowest unit of the data of the main register AR that is the data "α", "β", "γ" of the lowest 3 bits are shifted to the upper 3 bits. Next, the data of the main register AR are sensed by the greater than immediate instruction GTI177 to see whether or not it is greater than "$177_8$", and this is equivalent to sense whether or not the content "α" of the highest bit of the main register AR is "1". Here, if the content "α" of the most significant bit of the main register AR is "1", "1" is written into the least significant bit of the timer register TMR, by the set up instruction SUTM. Then the left shift instructions LSTM and RSTM come out consecutively and the content of the timer register TMR and the content of the main register AR are shifted to left by one bit. After that the greater than immediate instruction GIT177 is issued again and such sensing is made as to whether or not the "β" coming to the most significant bit of the main register AR by the above mentioned left shift is "1", and if the content "β" of the most significant bit of the main register AR is "1", "1" is set up at the least significant bit of the timer register TMR. Next, the timer register TMR, the main register AR are both left shifted and same sensing is done for the "γ" coming to the highest unit of the main register AR, thus finally so called 8 + Z data can be obtained at the timer register TMR, wherein the data of the lower 3 bits of the main register AR are set up at the lower 3 bits of the timer register TMR, as shown in FIG. 21 and "1" is set up at the 4th bit from the lowest of the same. Next, the data of the exposure time Tv or of the self timer time previously written into the register FR are read into the main register AR by the load instruction LDFR. Next, the data of the main register AR are right shifted by 3 bits by repeating the right shift instruction RSF.AR 3 times, and the data of the main register AR, which was 8X + Y + (1/8) Z in the beginning is changed to X + (1/8) Y. Then while the sensing is done whether or not the data of the main register AR is non-zero by the sense register instruction SRGAR, such operations are repeatedly done that is (1/8) is subtracted from the data X + (1/8) Y of the main register AR, and the data 8 + Z of the timer register TMR is shifted to left by one bit, that is, made double by the left shift instruction LSTM, and at the time when the data of the main register AR becomes "0" that is X + (1/8)Y − (1/8)n = 0, the arithmetics at the sub-routine is completed by the return instruction RTN. Through the above mentioned process the data, $(8 = Z)2^n = (8 + Z)2^{8X+Y}$ can be obtained at the timer register TMR.

The data obtained at the timer register TMR through the above mentioned sub-routine can be easily converted to actual time by subtraction in the subroutine EX.TM of actual time expansion in synchronism with the clock pulse of (1/4096) × (1/8) second.

By the above mentioned set-ups, the data of the exposure time Tv and the self timer time equivalent to the apex value given in digital value can be converted to actual time within very small margin of error and with the accuracy of ⅛ step in the apex value.

The exposure control method mentioned above can be realized by applying and combining the circuit composition shown below to the composition shown in FIG. 8.

Figure 22:
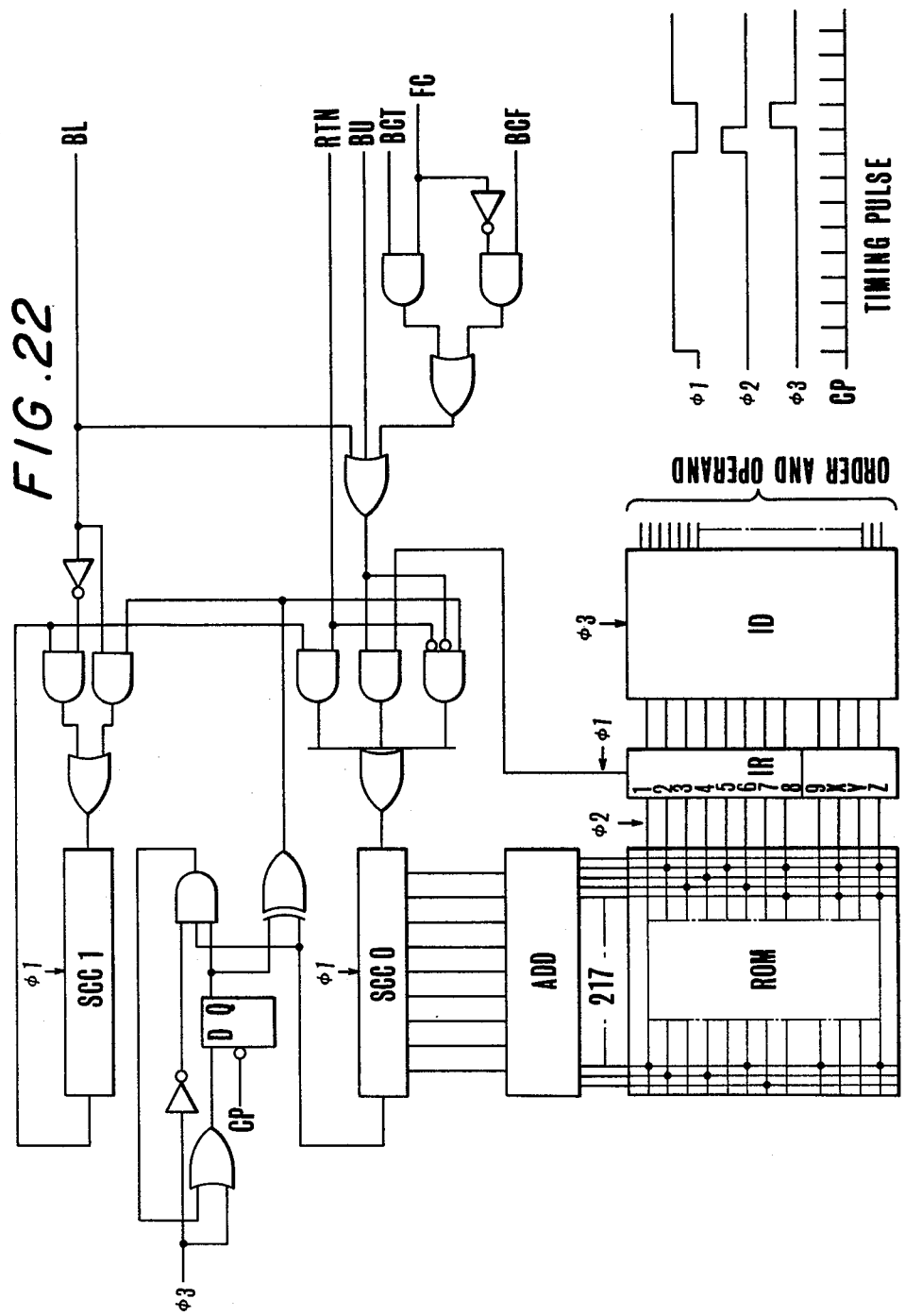
FIG. 22 is a block diagram of a control circuit for designating the address of ROM in the device shown in FIG. 8 and a jump control.
Figure 23:
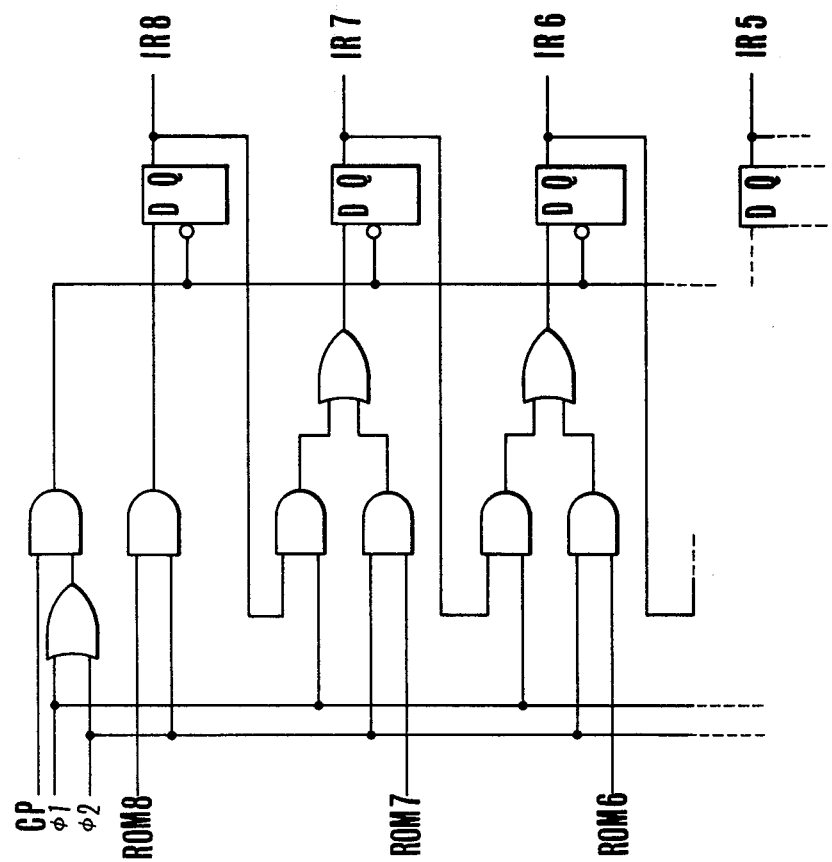
FIG. 23 is a concrete partial circuit composition diagram of the instruction decoder of the device shown in FIG. 8.

The control circuit for designating address of ROM and the jump control JC shown in FIG. 8 are realized in the block diagram shown in FIG. 22, wherein the instruction decoder IR has such composition as shown in the partial circuit composition drawing shown in FIG. 23.

Figure 24:
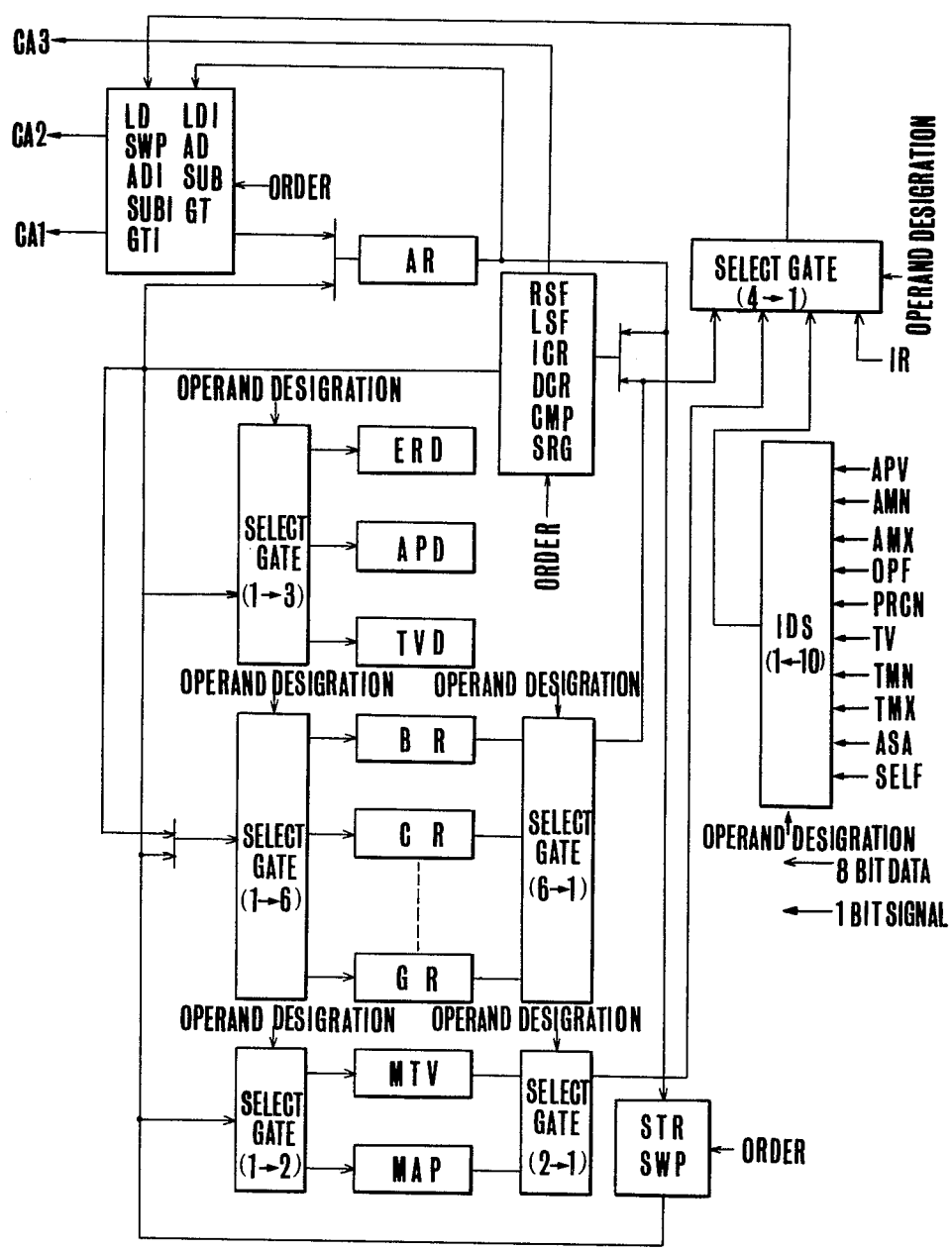
FIG. 24 is a block diagram for arithmetic circuit and control system for various registers in the device shown in FIG. 8.
Figure 25:
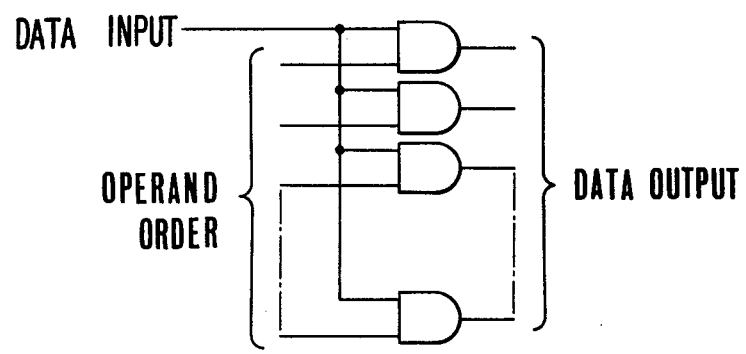
FIG. 25 and FIG. 26 are concrete circuit composition diagrams for a select gate in the device shown in FIG. 8.
Figure 26:
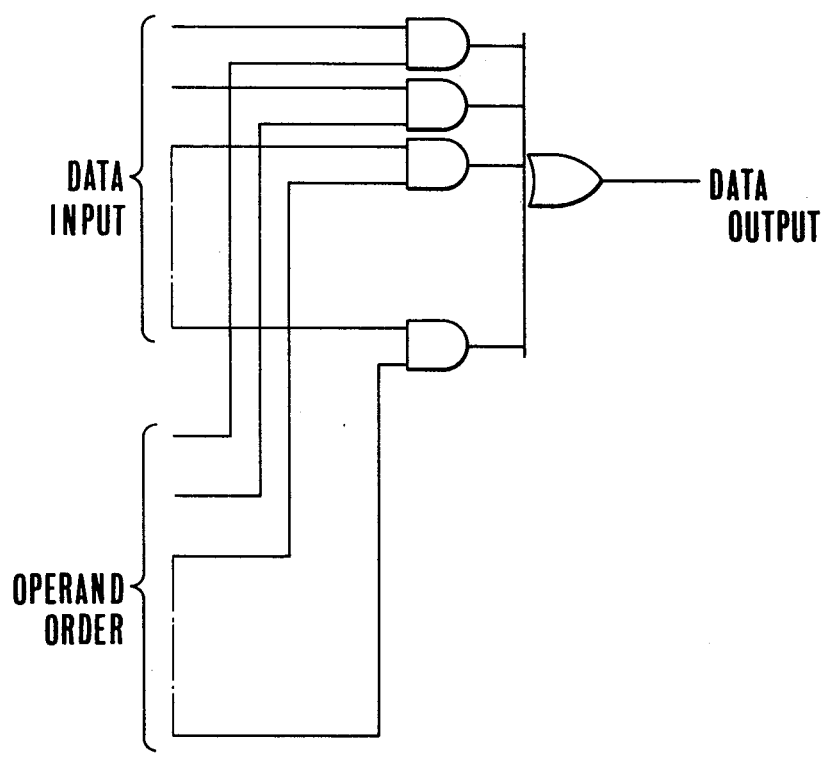
Figure 27:
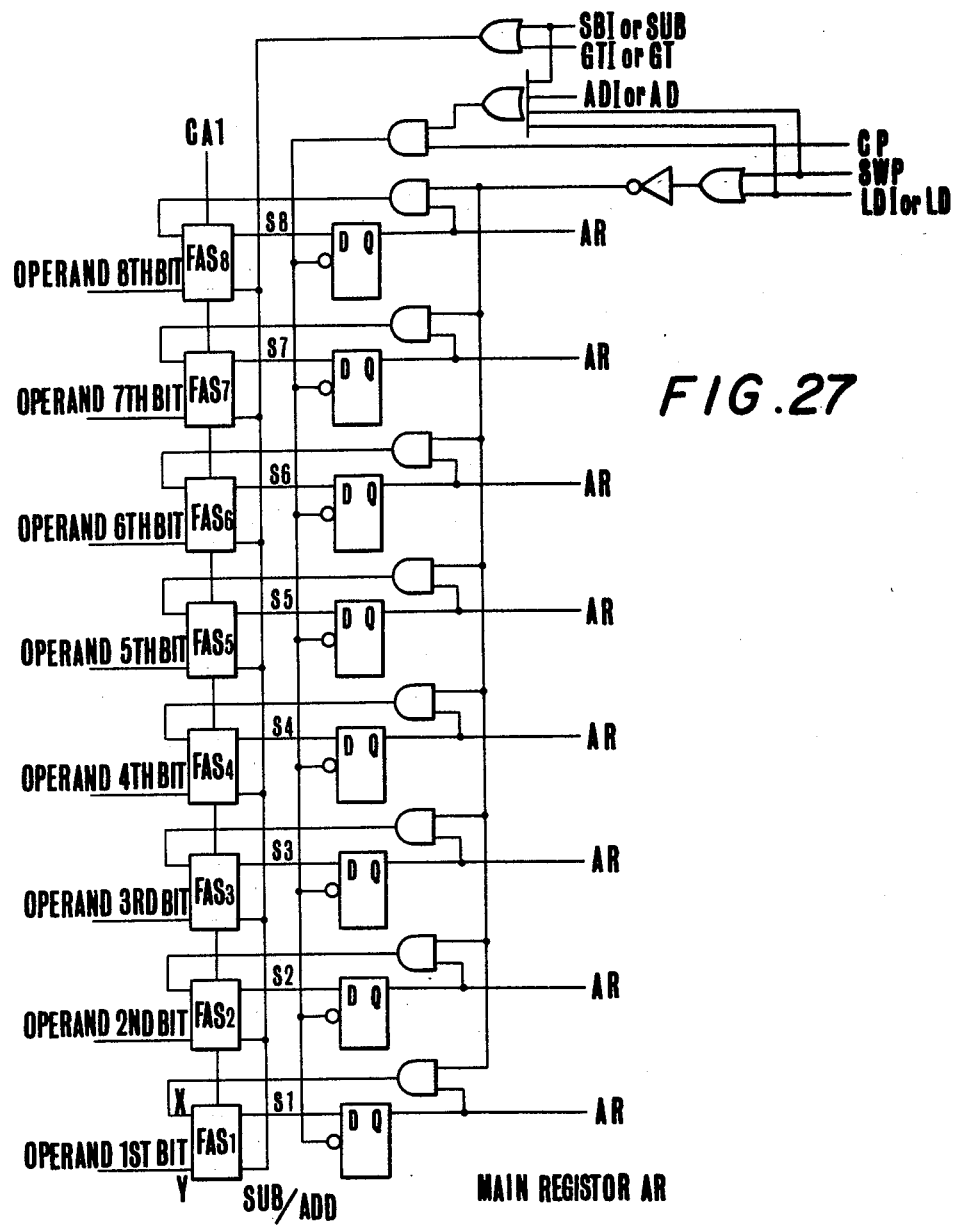
FIG. 27 is a main circuit composition diagram of the main register in the device shown in FIG. 8.

Also the arithmetic circuit AC and the control systems of various registers shown in FIG. 8 are composed as shown in the block diagram of FIG. 24 and the select gate used therein has such circuit composition as shown in FIG. 25, FIG. 26. the composition shown in FIG. 25, FIG. 26 can also be applied to the gates ICS, CS, CAS, IDS, and the flip-flop control circuits FP, FC, etc. shown in FIG. 8 depending on the objects thereof. The composition of the main circuit of the main register AR is shown in FIG. 27, wherein the circuit shown by FAS is a full addition and subtraction circuit and its construction of concrete circuit is shown in FIG. 28. The output of the output side signal lines S1 to S8 at the full addition and subtraction circuit FAS is connected to the circuit having circuit composition shown in FIG. 29 and carry detection against the greater than instruction is done at the circuit shown in FIG. 29.

Figure 30:
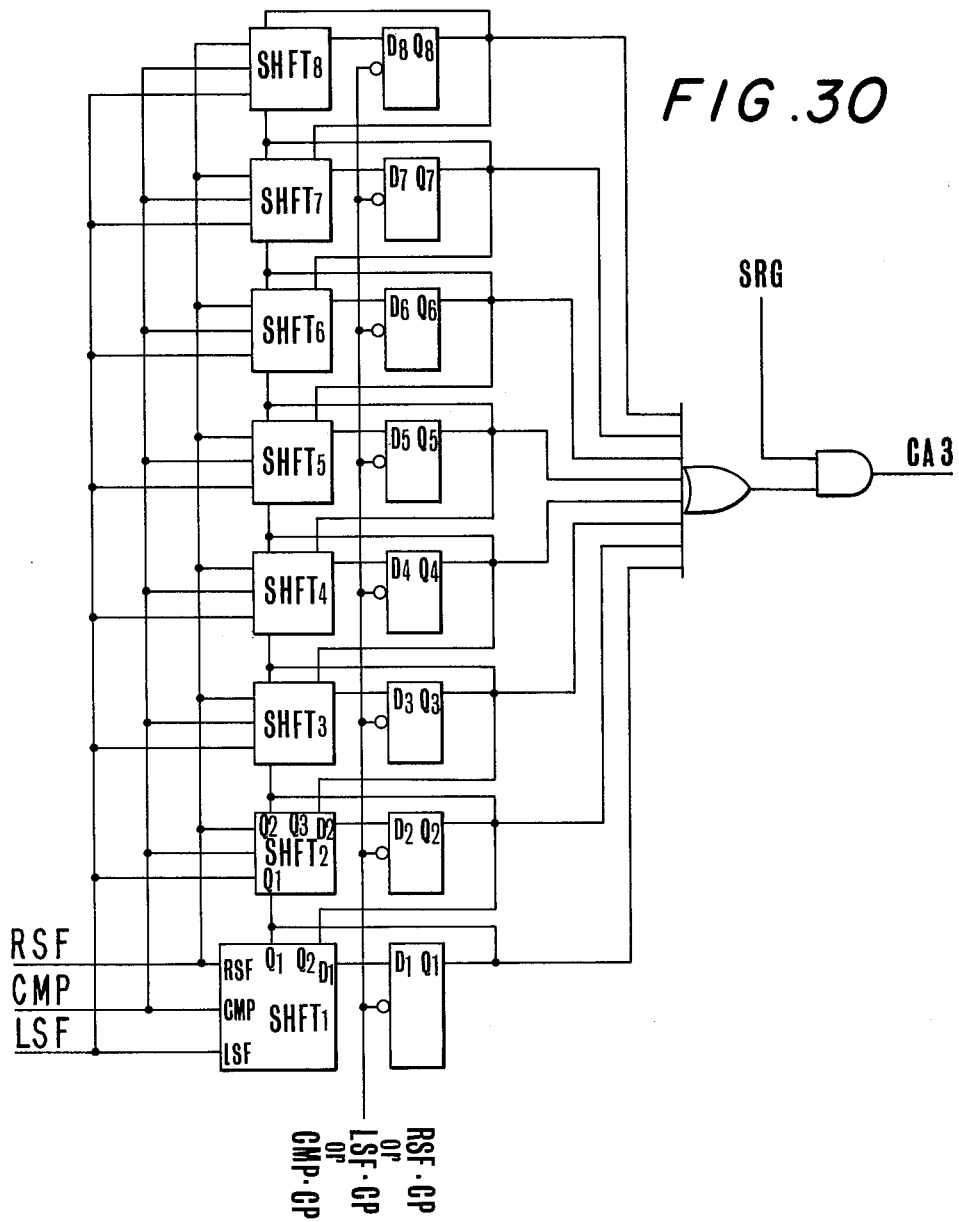
FIG. 30 is a circuit composition diagram for carrying out the right shift instruction, left shift instruction, complement instruction, being applied to the registers including the main register in the device shown in FIG. 8.
Figure 31:
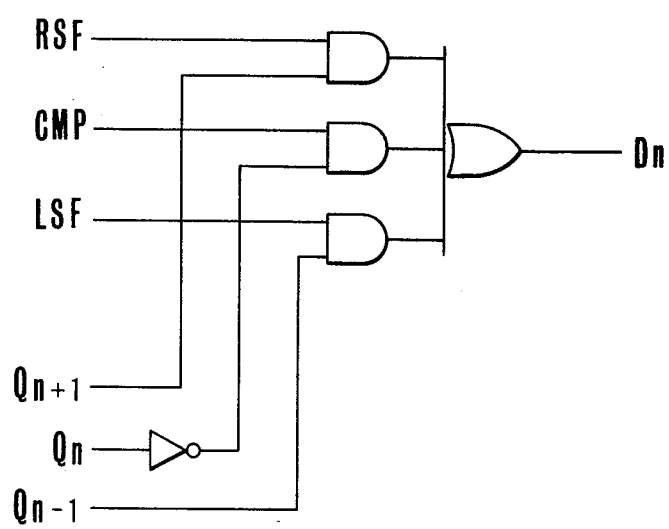
FIG. 31 is a partial and detailed circuit composition diagram of the circuit shown in FIG. 30.
Figure 32:
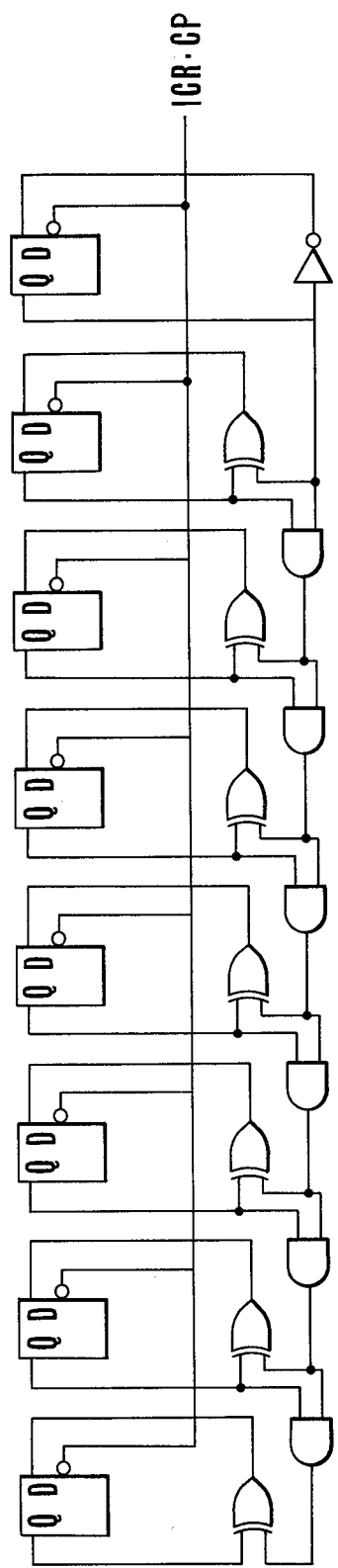
FIG. 32 is a circuit composition diagram for carrying out the increment instruction applied to registers including the main register in the device shown in FIG. 8.
Figure 33:
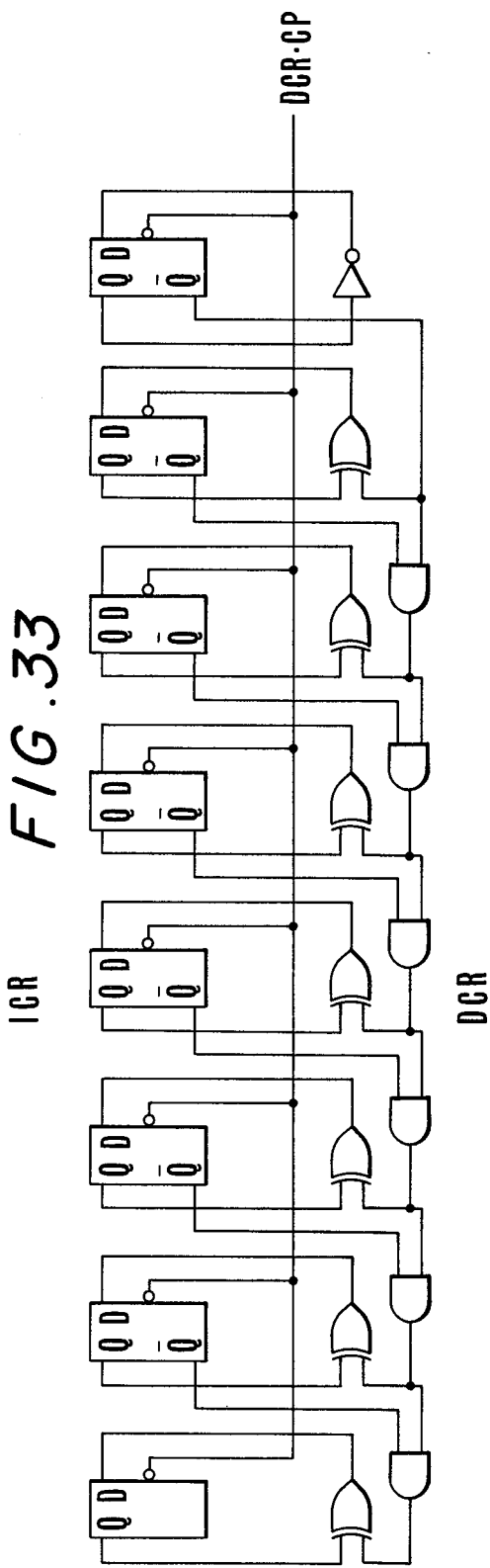
FIG. 33 is a circuit composition diagram for carrying out the decrement instruction applied to registers including the main register in the device shown in FIG. 8.

The right shift instruction RSF, the left shift instruction LSF, the complement instruction CMP applied to each register including the main register are carried out through the circuit composition shown in FIG. 30. In the drawing SHFT shows the control circuit for shift or complement conversion and its concrete circuit composition is shown in FIG. 31. Further the increment instruction ICR and the decrement instruction DCR applied to each register including the main register AR are carried out through the circuit composition shown, respectively, in FIG. 32 and FIG. 33. The flip-flop shown in FIG. 30, FIG. 32, FIG. 33 is to compose 1 bit of the register.

Figure 34:
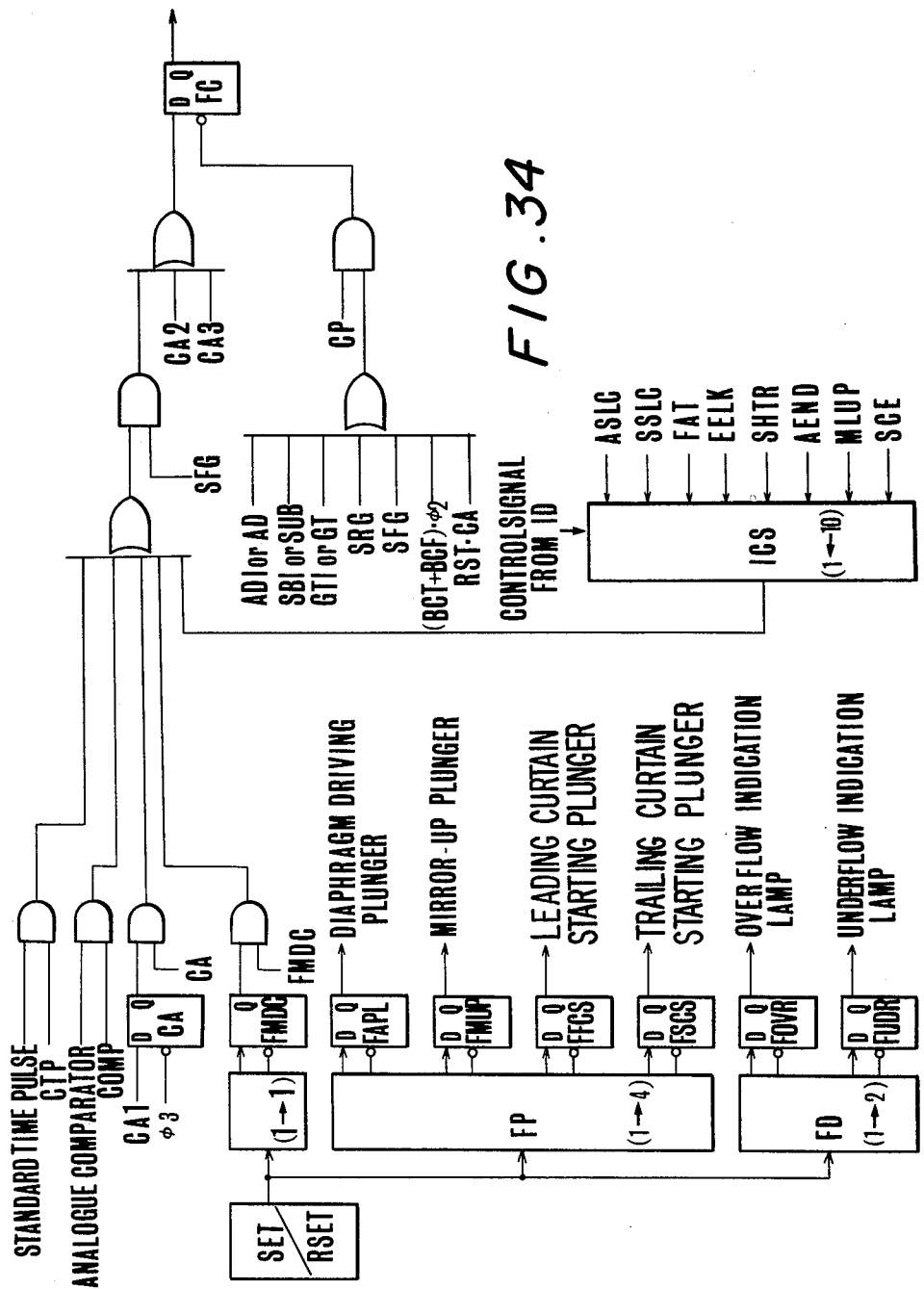
FIG. 34 is a control circuit composition diagram for the flip-flop circuits used in the device shown in FIG. 8.
Figure 35:
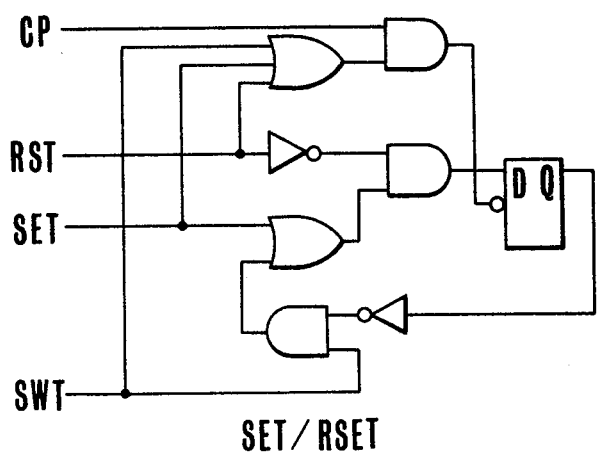
FIG. 35 is a detailed circuit composition diagram for the set/reset circuit shown in FIG. 34.

The control circuits of the mode change flip-flop FMDC, the conditional flip-flop FC, the control flip-flops FAPL, FMUP, FFCS, FSCS, and the indication flip-flops FOVR, FUDR are shown concretely in FIG. 34, especially the set/reset SET/RSET is shown at FIG. 35 in detail. The flip-flop shown in FIG. 35 is shown as an example of the flip-flop to be controlled, and the output of said circuit is applied for control of the flip-flop shown in FIG. 34 through the gate circuit composition shown in FIG. 25 and FIG. 26.

The circuits shown above are combined to each other or made into a system through known theoretical circuit composition and are to compose device to embody the exposure control method of the present invention, but as it is not to constitute the essential element of the present invention particularly, explanations of their operation and concrete combinations are to be omitted.

Next, the indication device in the device of the present invention is explained.

Figure 36:
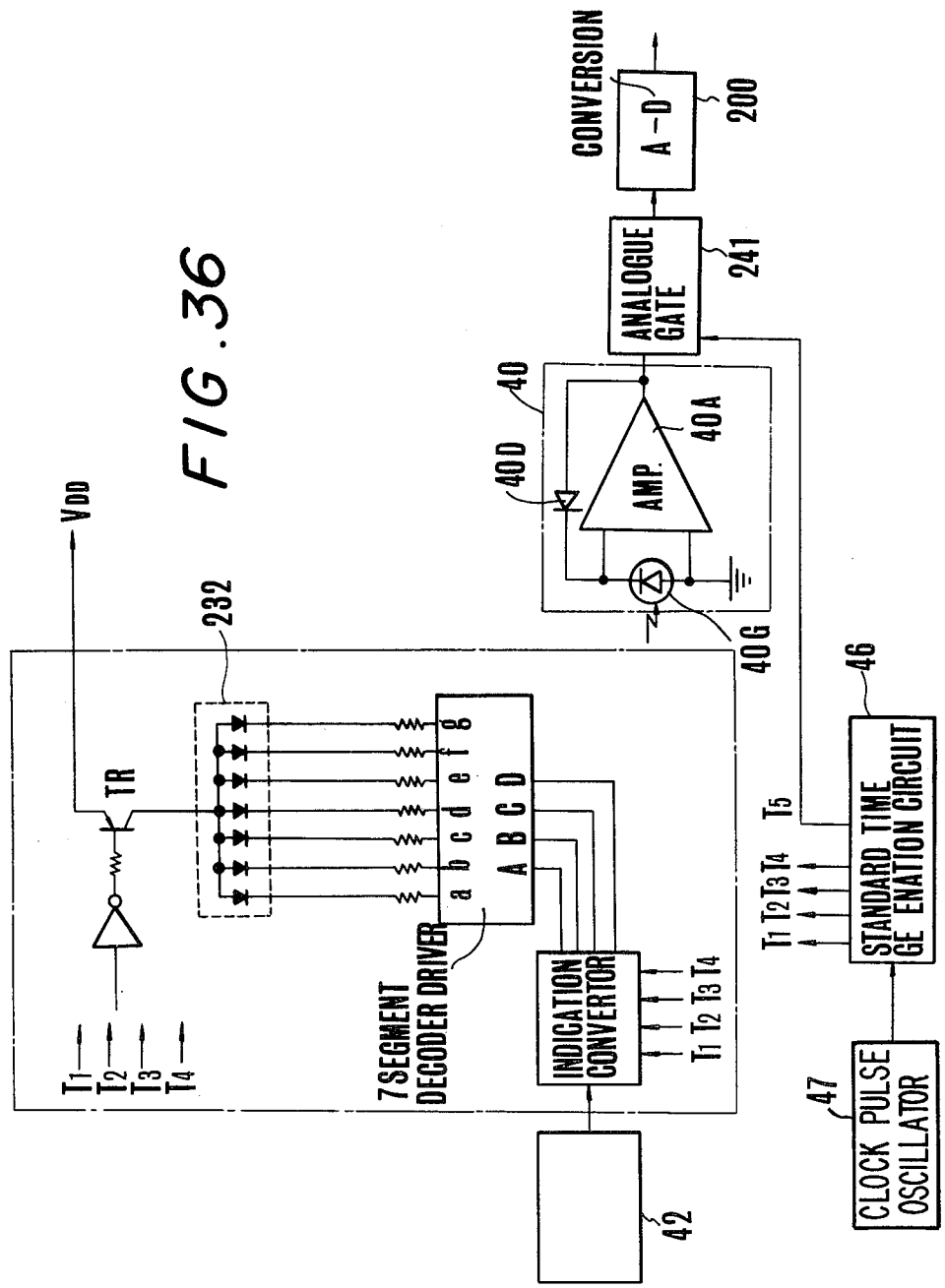
FIG. 36 is a circuit connection diagram of an example of the indication device shown in FIG.4.
Figure 37:
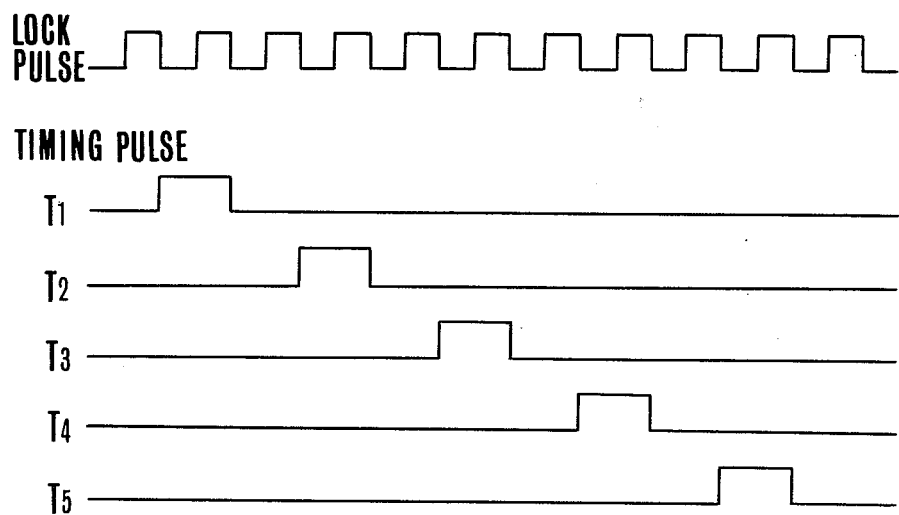
FIG. 37 is an operation schematic drawing for the indication device shown in FIG. 36.
Figure 38:
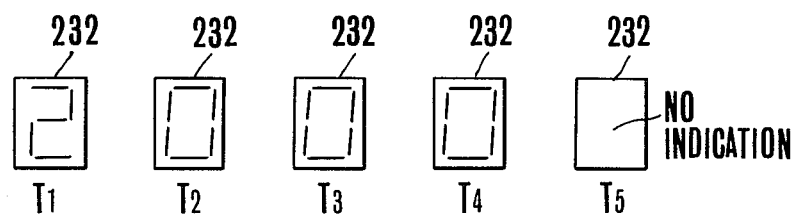
FIG. 38 is a drawing of an example of the indication devie shown in FIG. 36.
Figure 39:
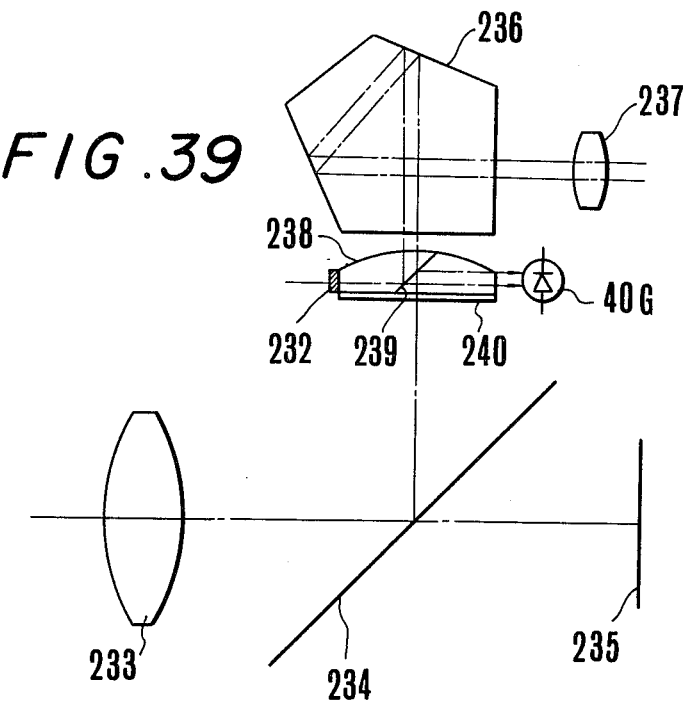
FIG. 39 is a composition diagram of an example of an optical system for the indication device shown in FIG. 36.

FIG. 36 is to show the circuit connection diagram of an example of the indication device shown in FIG. 4, and especially to show the shutter time value, the diaphragm aperture value by one indication element. In the drawing the same parts as in FIG. 4 are shown by same identification marks. 232 is an indication element such as an illuminating diode, and 241 is a gate circuit. FIG. 37 is a curve diagram for explaining the operation of the indication device shown in FIG. 36. FIG. 38 is to show an example of indication. In the drawing a clock pulse oscillator 47 oscillates the clock pulse as shown in FIG. 39, thereby the timing pulses, $T_1$, $T_2$, $T_3$, $T_4$, $T_5$ are outputted consecutively from the reference time generation circuit 46. Of these, $T_1$ to $T_4$ are inputted into a Tv indication part or an Av indication part, converting the output pulses of the Tv register or Av register in turn, and the content A to D thereof are transmitted to the indication element 232 in turn and are indicated. Next T$_5$ is inputted into the gate 241 of the photo-sensing circuit, and the output of the photo-electric conversion circuit 40 is impressed to next AD converter 200 for the duration of said timing pulse, and is inputted into the arithmetic device 42 as the Bv information. An example of indication using said 7 segment elements will be as shown in FIG. 38, which signify that the shutter time is 1/2000 second. That is, the indication element 232 makes indication with the order of 2, 0, 0, 0, consecutively, and resting for the period of T$_5$ then repeating the same. FIG. 39 is a composition drawing to show an example of optical system of the indication device of FIG. 36, wherein the indication is superimposed within the finder of a single lens reflex camera. In the drawing, 40G is a light receiving element, 232 is an indication element, 233 is a photographing lens, 234 is a reflective mirror, 235 is a film surface, 236 is a pentagonal prism. 237 is an occular lens for a finder, 238 is a convex lens, 239 is a semi-transparent mirror provided within 238, and 240 is a focal plane, and these parts compose an optical system of a conventionally known TTL camera. The indication element 232 may be of one unit and by time dividedly driving the same the beam therefrom is reflected by the semi-transparent mirror 239 and is exitted from the ocular lens 237 through the pentagonal prism 236. While the light from 232 is incident into the light receiving element 40G after penetrating through 239, but it causes no difficulties as the indication element 232 is in the state of rest during such period that the light receiving element 40G makes light sensing (measuring), that is the period of timing pulse of T$_5$. This indication is done by the start signal and it may be finished in one time or it may be repeated several times or the number of such repeating may be easily selected as desired with known technique. It is necessary to have some time pose between each indication, A, B, C, D for distinguishing the content of each information. Since only one indication element is used in the above photographing information indication system, it has such special features as being suitable for application in a compact camera, and particularly allowing the indication to be made at any position within the picture in a camera in which indication is made on the picture in a superimposed manner.

Also when a connecting part is provided at the output terminal of an arithmetic device 42 outputting shutter speed information or diaphragm aperture value information, it is very useful for a remote control device, or external process of the data using the terminal equipment of a printer or a computer.

According to the exposure control system of the present invention many advantages as shown below can be provided.

(1) While conventional exposure control system was composed chiefly of analogue type electrical circuits and mechanical linking mechanism, almost all circuits in the exposure control system of the present invention can be made as digital type circuit, and at the same time circuits can be made with large size integration, thus a compact composition with no or little erroneous operation can be obtained, therefore it is quite suited for use in a camera which has limited housing space therein.

(2) By this invention not only diaphragm aperture preference photographing and shutter time preference photographing can be made simply only by setting up diaphragm aperture preference photographing information and shutter time preference photographing information, but also manual and program photographings are made possible, and the scope of application in automatic exposure photographing is enlarged.

(3) Since the indication means is connected to the arithmetic device, it can be easily found out what shutter time or what diaphragm aperture value the photographing is done with according to the present invention.

(4) As the shutter time value, diaphragm aperture value, etc. can be indicated by one indication element when photographing information is indicated, it can be easily applied to a camera having limited housing space.

(5) In conventional exposure time preference photographing as exposure time for obtaining appropriate exposure is computed against a set diaphragm aperture value, since there is no limit for upper end or lower end in stop down volume, either photographing is done with exceedingly opened diaphragm failing to obtain sufficient field depth for an object for which a photographing with deep depth of field is desired, or a photographing is done with excessively stopped down diaphragm giving deep depth of field to an object for which some dim or obscure feeling is desired, thus there is such fear that photographing may be done in a manner contrary to the desire of a photographer. Contrary to this, when the exposure control device of the present invention is employed the maximum value and the minimum value can be set up as desired for the diaphragm aperture value accOrding to the picture making intention of a photographer in computing the diaphragm aperture value for obtaining appropriate exposure against set exposure time against the set exposure time, thus the intention of a photographer may be satisfactorily realized. That is, since the diaphragm aperture value computed is not between the maximum value and the minimum value of the diaphragm aperture value being set according to the picture making intention of a photograher, an under flow indication or an over flow indication is done to notify the photographer about the same, thus he can change the conditions set. Also when a full automatic mode is selected at this time, the set maximum value and the minimum value of the diaphragm aperture value is automatically set as the newly set value, changing the exposure time which was originally set by the photographer, thus appropriate exposure can be obtained.

(6) The conventional EE program which has been applied to an EE camera of lens shutter type, etc. has been so composed that exposure control is done with monotonous combination of diaphragm aperture value and exposure time, thus it can be applied only to a camera with simple camera for a beginner, but in the exposure control device of the present invention the combination of diaphragm aperture value and exposure time against an object brightness can be freely selected as the program constant can be variedly set, the picture making intention of a photographer can be satisfactorily realized in photographing.

(7) In the exposure control method of the present invention it is possible to minimize mechanical error since the correction of curvature error against the volume of light sensed generated at fully open end of a lens is digitally computed without going through mechanical linking-mechanism.

(8) In the exposure control device of the present invention as long as shutter release is not done photosensing arithmetics are repeatedly done and every time diaphragm aperture value and exposure time are obtained as a result of arithmetics, their values are memorized in registers and are indicated in a finder so that a photographer can recognize the information on photographing beforehand, further he can learn the diaphragm aperture value and exposure time to be obtained always in photographing against a new condition or object even if the set conditions are changed or the object is changed, therefore photographing conditions for an object can be freely selected.

(9) When appropriate exposure can not be obtained within the scope of set conditions in the exposure control device of the present invention, over flow or under flow indication is done, and photosensing (light measuring) arithmetic is repeated, and at the same time a shutter is not released even if a shutter release button is pressed, therefore photographing with improper exposure can be prevented. Also when appropriate exposure becomes possible as the photographing conditions or object are changed according to the indication of over flow or under flow, the over flow or under flow indication disappears making shutter release possible.

(10) As the exposure control device of the present invention, such control is done that every time diaphragm aperture value and exposure time are obtained as a result of photo-sensing (light measuring) arithmetics repeatedly done, the values thereof are memorized in registers, said diaphragm aperture value and exposure time memorized in the registers can be easily retained, thus the KE lock mechanism, which heretofore has been composed with mechanical clamp mechanism or analogue type capacitor etc., can be realized with very simple circuit make up.

(11) As all controls are done electrically in the exposure control device of the present invention, for example a shutter which has been conventionally made up with mechanical fixing and releasing mechanism can be replaced with an electrical switch, thus the adjustment of pressing force of a shutter button in shutter release can be done with simple composition, thus the slurring with hand in pressing shutter button can be satisfactorily countered.

(12) In the exposure control device of the present invention, as the self timer time or exposure time is converted to actual time, the time data equivalent to the apex value can be converted to actual time data in a very simple circuit make up, and the actual time is obtained by the reference time clock generated electrically, therefore very exact self timer time and exposure time can be obtained.

(13) Since the self timer time is digitally controlled in the exposure control device of the present invention, setting of the self timer time can be done as desired and in variable manner, furthermore, since setting up of the self timer time is not necessary for every shutter release, eliminating troublesome handling for setting up self timer time. Also since conventional mechanical spring mechanism is not employed, there is no working noise and setting up is easily, moreover the scope of set time can be wider. Also as the operational indication can be done with electrical indication means, its state of operation can be found out from distant place.

(13) Since shutter speed is digitally controlled in the exposure control device of the present invention, the setting range of the shutter speed can be made very wide, especially as a mechanical governor is not used against a low speed shutter, it will not be found to a mechanical composition, setting of long shutter time can be done as desired, further operating noise incidental to low speed shutter operation can be eliminated. Also by applying an oscillator with high accuracy such as a crystal oscillator to the reference time pulse, exposure time with very high level of accuracy can be obtained, enabling accurate exposure to be done.

(14) In the exposure control device of the present invention, the control of diaphragm aperture value is not done by mechanical method, instead so-called actual stop down control is done, that is, after conducting supposition arithmetic of such amount of light as will have been received when lens is stopped down against a given stop down step number, the amount of light received through the stopped down lens and said supposition arithmetic value are compared while actual stop down is being made and then stop down is stopped at the time when the amount of light received reaches the supposed value, thereby the diaphragm aperture value is prevented from becoming inaccurate through mechanical error, further a diaphragm mechanism requiring high-degree of accuracy becomes unnecessary, thus total mechanism can be simplified. Also the actual stop down control according to the present invention has such special features that it can be satisfactorily used even if the brightness of an object changed with EE lock, since the amount of light to be received when the desired stop down step number is stopped down is computed in supposition against the value of intensity of light of object to be photographed just before stop down is made.

As has been listed above the numerous advantages which can be obtained as the exposure control method of the present invention is used will be quite many, and mechanical or electrical problems which have been incidental to exposure control can be eliminated totally, thus its advantages are very great.

What is claimed is:

1. An exposure control device for a camera comprising:
   (a) exposure information means for entering exposure information values into the exposure control device;
   (b) first control means having a plurality of actuating means for controlling a plurality of individual camera elements including a shutter screen;
   (c) a sequence control circuit means having at least one input terminal and at least one output terminal to supply first control signals for controlling said actuating means, wherein the sequence control circuit means produces in sequence from the output terminal control signals which correspond to the input values applied to the input terminal, said actuating means being thereby selectively driven corresponding to the first control signals;
   (d) a calculating circuit connected to said exposure information means and to said sequence control circuit means and responsive to the sequential control signals from the sequence control circuit means, wherein the calculating circuit has at least one output terminal and automatically performs a mathemetical calculation employing the adjusted exposure information values from exposure information means to determine various values in relation with the control signals;
   (e) a second control means connected to the output terminal of said calculating circuit and to the input terminal of said sequence control circuit means, wherein the second control means applies second control signals which correspond to the values determined by the calculating means to the sequence control circuit means so that control signals which correspond to the values determined by the calculating circuit are generated from the sequence control circuit means; and
(f) means for entering instantaneous values representing operating conditions of various individual camera elements of said first control means into said sequence control circuit means.

2. An exposure control device according to claim 1, wherein said first control means includes indicating means for indicating an exposure value in response to the control signal from said sequence control circuit means.

3. An exposure control device according to claim 1, wherein said exposure information means consist of digital switches which produce a digital electrical signal.

4. An exposure control device according to claim 1, wherein said first control means comprises indicating means for indicating an over exposure in response to the control signal from said sequence control circuit means.

5. An exposure control device according to claim 1, wherein said first control means comprises second indicating means for indicating an underexposure in response to the control signal from said sequence control circuit means.

6. An exposure control device according to claim 1, wherein said sequence control circuit means comprises:
(a) a program means generating various control signals corresponding to the selected address;
(b) an address register means to select the address of said program means; and
(c) an address control means to change the content designating the address of said address register means in correspondence with various input values.

7. An exposure control device according to claim 1, wherein said calculating circuit comprises:
(a) accumulator means for automatically performing a mathematical calculation employing the adjusted exposure information means; and
(b) an accumulator control means to perform said mathematical calculation in said accumulator means based on the control signals from said sequence control circuit means.

8. An exposure control device for a camera comprising:
(a) exposure information means for entering exposure information values into the exposure control device;
(b) first control means having a plurality of actuating means for controlling a plurality of individual camera elements;
(c) sequence control counter means having a series of different step positions and a series of output connections corresponding to the respective step positions, whereby the counter means produces first control signals from the respective output connections in sequence;
(d) connecting means for feeding the control signals from the respective output connections of the sequence control counter means to the plurality of actuating means of said first control means in sequence;
(e) an address control means having at least one input terminal and connected to said sequence control counter means for changing the step position of said sequence control counter means to different step positions in correspondence with the input values applied;
(f) means for entering instantaneous values representing operating conditions of various individual camera elements into said address control means;
(g) a calculating circuit connected to said exposure information means and to said sequence control counter means and responsive to the sequential first control signals, wherein the calculating circuit has an output terminal and automatically performs a mathematical operation employing the adjusted exposure information values from the exposure information means to determine various values in relation with the first control signals; and
(h) a second control means connected to the output terminal of said calculating circuit and to the input terminal of said address control means, wherein said second control means supplies to the address control means such second control signals corresponding to the values determined by the calculating means so that first control signals as correspond to the values determined by the calculating means are generated from the sequence control counter means.

9. An exposure control system for a camera comprising:
(a) an exposure control device which includes at least a shutter opening means, a shutter closing means and a diaphragm control means;
(b) an initiating means of a camera functionally coupled with said shutter opening means;
(c) an operating condition detecting means including at least a shutter release detection means and a shutter closing completion detection means, wherein said shutter release detection means is coupled with the initiating means of a camera while the shutter closing completion detection means is coupled with said shutter closing means;
(d) an exposure factor setting means for producing electrical signals which correspond to at least aperture value, shutter speed and film speed;
(e) a programmed control means connected to said exposure factor setting means and to said operating condition detecting means, wherein said programmed control means functions in correspondence with the address designated by the input signal and has information transfer path to take in said electrical signal from said exposure factor setting means and to provide a driving control signal to said exposure control device;
(f) address register means connected to said programmed control means and producing output signals to designate the address of said programmed control means;
(g) address control means connected to said address register means, wherein said address control means changes the content of the address designation by the address register means under a certain rule;
(h) a state judgment means being coupled with the operating condition detecting means and the programmed control means, wherein said state judgment means judges the output of the operating condition detecting means being designated in correspondence with the output signal from the programmed control means; and
(i) an address changing means which changes the address designation content of the address register means in correspondence with the output from the state judgment means to such content as is designated by said programmed control means.

10. An exposure control system according to claim 9, wherein the said state judgment means also judges the operating state of the said programmed control means.

11. An exposure control system according to claim 9, wherein the address control means changes the address designation content of the address register means in synchronism with clock pulses.

12. An exposure control system according to claim 9, wherein the address control means contains an addition circuit, which makes an addition of a certain value to the address register means in synchronism with clock pulses.

13. An exposure control system according to claim 12, wherein the addition value added by the addition circuit is "1".

14. An exposure control system according to claim 12, comprising further an auxiliary address register means which takes in and memorizes the address designation content before the change of the address register means is added when change is made to the content of the register means by the address change means.

15. An exposure control system according to claim 14, wherein said auxiliary address register means takes in the address designation content from the address register means through the addition circuit.

16. An exposure control system according to claim 15, wherein the address change means includes return control means to write in the address designation content of the auxiliary address register means into the address register means in correspondence with the output from the programmed control means.

17. An exposure control system according to claim 16, wherein the addition circuit functions in synchronism with clock pulses.

18. An exposure control system according to claim 9, wherein the programmed control means comprises:
 (a) a programming means, which provides output of instruction signal in correspondence with the designated address;
 (b) a light-sensing means, which generates an electric signal which corresponds to the brightness of an object;
 (c) an operating means, which is connected with the light-sensing means and the exposure information setting means for taking in and processing the information from at least the light-sensing means and the exposure information setting means;
 (d) a driving control means, which is connected to the exposure control device for having the exposure control device perform prescribed exposure control function; and
 (e) a central control means, which is connected to the programming means for providing a control signal to the operating means, the driving control means, the state judgment means, and the address change means.

19. An exposure control system according to claim 18, wherein the address control means comprises an addition circuit, which makes addition of a prescribed value to the address designation content of the address register means in correspondence with the clock pulse.

20. An exposure control system according to claim 19, which further comprises an auxiliary address register means which takes in and memorizes the address designation content before change is made to the content of the address register means by the address change means.

21. An exposure control system according to claim 20, wherein the auxiliary address register means passes through the addition circuit when the address designation content is taken from the address register part.

22. An exposure control system according to claim 21, wherein the address change means has a return control means to write in the address designation content of the auxiliary address register means into the address register means following the output from the central control means.

23. An exposure control system according to claim 18, wherein said state judgment means makes judgment of the operating state of the operating means.

24. An exposure control system according to claim 23, wherein the programming means generates at least one instruction signal out of an instruction code to be given to the central control means, an address change code to be given to the address change means, and a constant code to be given to the operating means.

25. An exposure control system according to claim 24, wherein the instruction code formed by the programming means is connected to and outputted as an instruction signal, at the central control means, continuing at least one of the process instruction signal for the operating means, the driving instruction signal of the exposure control device for the driving control means, the designation instruction signal of the operating condition detection means and the operating means for the state judgment means, and the address change instruction signal for the address change means.

26. An exposure control system according to claim 18, wherein the exposure factors set at the exposure factor setting means is a digital value and the operating means has an A-D conversion means to convert the analog electric signal obtained as a result of light-measuring from the light-measuring part into digital value.

27. An exposure control system according to claim 26, wherein the operating means comprises:
 (a) a main register means for operation;
 (b) at least one auxiliary register means;
 (c) an operating circuit in said main register to conduct operation in correspondence with the control signal from the central control means; and
 (d) a transmitting path to conduct transfer of data between the main register and the auxiliary register and to take in the digital information from the exposure information setting means designated in correspondence with the control signal from the central control means.

28. An exposure control system according to claim 27, wherein the programmed control means further comprises:
 (a) an actual time counting circuit, which counts actual time in correspondence with the instruction signal from the central control means based on the information on time and gives completion signal to the state judgment means when time counting is completed.

29. An exposure control system according to claim 28, wherein the actual time counting circuit comprises:
 (a) a time counting register;
 (b) a means connected to the time counting register for setting "1" at the minimum unit of the time counting register;

(c) a means connected to the time counting register for shifting the content of the time counting register to the upper unit side following the digital information concerning time;

(d) a means connected to the time register for subtracting "1" each time from the content of the time counting register in synchronism with the time counting clock; and (e) a means connected to the time counting register for detecting the fact that the content of the above mentioned time counting register becomes "1".

30. An exposure control system according to claim 27 further comprising:

(a) an indication register which is given by the operating means at least one digital information concerning the amount of exposure, exposure time and diaphragm aperture value and memorizes the same; and (b) a data indication means to indicate the data of the indication register.

31. An exposure control system for a camera comprising:

(a) an exposure control device which contains at least one out of a shutter opening means, a shutter closing means and a diaphragm control means;

(b) an initiating means of a camera, which is so provided as can be functionally coupled with said shutter opening means;

(c) an operating condition detecting means comprising at least one out of a shutter release detection means and a shutter closing completion detection means, wherein said shutter release detection means is coupled with the initiating means of the camera while the shutter closing completion detection means is coupled with said shutter closing means;

(d) an exposure factor setting means to produce such electrical signal as corresponds to at least one of such exposure factors as aperture value, shutter speed, and film speed;

(e) a light measuring means for producing an electrical signal corresponding to the intensity of light;

(f) an operating means connected to said light measuring means and said exposure factor setting means to receive information at least from said light measuring means and said exposure information setting means, wherein said operating means determines various values based on the information from said light-measuring means and said exposure information setting means;

(g) a driving control means connected with said exposure control device for driving each of the means of said exposure control device;

(h) a state judgment means connected to the operating condition detecting means and the operating means to judge the state of the output of said two means and to generate such various output signals based on the output of said operating condition detecting means and the operating means;

(i) a sequence control means generating control means based on the input signal and connected to the operating means, the driving control means and the state judgment means for giving control signal in sequence to each of said operating means, the driving control means and the state judgment means; and (j) a feedback path means connected to between the state judgment means and the sequence control means for supplying the output signal from said state judgment means to said sequence control means.

32. An exposure control system according to claim 31, wherein the sequence control means outputs instructional signal containing at least one of the signals out of the processing instructional signal supplied to said operating means, the driving instructional signal for the control device supplied to the driving control means, the designation instructional signal for the operating condition detecting means and operating means supplied to the state judgment means, and the designation instructional signal for the exposure factor setting means.

33. An exposure control system according to claim 32, wherein the exposure information setting means produces such digital value corresponding to the set exposure factor whereby said operating means conducts digital operation corresponding to the processing instruction signal from the sequence control means, and has an A-D conversion means to convert the analog electric signal obtained as a result of light-measuring from the light-sensing means to digital value and the take in the same.

34. An exposure control system according to claim 33, wherein the operating means comprises:

(a) a main register to conduct mathematical operation of various values;

(b) at least one auxiliary register;

(c) an operating circuit to perform mathematical operation in the main register based on the processing instructional signal from the sequence control means; and (d) a transmitting line to conduct transmission of data between the main register and the auxiliary register and to take in the digital information from the exposure information setting means being designated according to the designation instructional signal from the sequence control means.

35. An exposure control system according to claim 34, in which the operating means further comprises:

(a) an actual time counting circuit which counts actual time in correspondence with the instruction signal from the sequence control means based on the information on time and gives time counting completion signal to the state judgment means when time counting is completed.

36. An exposure control system according to claim 35, wherein the actual time counting circuit comprises:

(a) a time counting register;

(b) a set-up means to set "1" at the least significant bit of the time counting register;

(c) a shifting means to shift the content of the time counting register to the upper unit of figures following the digital information relating to time; and (d) a means to subtract a predetermined value from the content of the time counting register in synchronism with the time counting clock.

37. An exposure control system according to claim 36, wherein the predetermined subtraction value by the subtraction means is "1".

38. An exposure control system according to claim 36, wherein the digital information related to the time is a step number in a logarithmic series from the logarithmically compressed value of the reference time.

39. An exposure control system according to claim 38, wherein the programming means comprises a routine for outputting the following control signal for approximating the index expansion value of the information relating to the above mentioned time, $n + (\alpha/m)$ ($n, m, \alpha$ are integers) by $(1+ (\alpha/m)Z^n)$;

(a) a signal to write in data $m + \alpha$ by having the above set-up means and the shifting means alternately function on the lower unit of the figure side of the time counting register, wherein said set-up means makes selective function following the data $m + \alpha$;

(b) a signal to make the content of the above mentioned time counting register $(m + \alpha)Z^n$ by shifting the content $m + \alpha$ of the time counting register by as much as n steps of data to upper unit figure by the shifting means; and (c) a signal to conduct subtraction from the data $(m + \alpha)Z^n$ of the time counting register to the reference time as much as a predetermined value $\beta$ in synchronism with the time counting clock of $(\beta/m)$ by the subtraction circuit.

40. An exposure control system according to claim 32, wherein the diaphragm aperture value information set by the exposure factor setting means is selected in preference to the exposure time.

41. An exposure control system according to claim 40, wherein the operating condition detecting means comprises a diaphragm aperture preference detection means to detect the fact that the diaphragm aperture value information set by the exposure information setting means is selected in preference to the exposure time.

42. An exposure control system according to claim 41, wherein the above mentioned sequence control means gives the following process instruction to the operating means when the signal from the diaphragm aperture preference detection means is detected by the state judgment means;

so as to perform mathematical operation on an object brightness information obtained as a result of light measuring by the light measuring part, the diaphragm aperture value information taken in from the exposure factor setting means following the designation instruction signal from the sequence control means and film sensitivity information for computing information relating to exposure time.

43. An exposure control system according to claim 42, wherein the exposure factor setting means sets the information relating to at least one of the upper limit and the lower limit of allowable exposure time.

44. An exposure control system according to claim 43, wherein the sequence control means further gives the following process instruction to the arithmetic means;

an instruction to give to the state judgment means a signal which indicates the fact that the exposure time information obtained as a result of mathematical operation exceeds at least one of the informations concerning the upper limit or lower limit, when said information exceeds the same.

45. An exposure control system according to claim 44, further comprising an indication means to indicate that the limit value is exceeded, wherein, when it is detected by the state judgment means following the designation instruction from the sequence control means that the exposure time information obtained as a result of mathematical operation exceeds at least one of the information on the upper limit and the lower limit, the indication means cam makes visual indication of the same by the instruction signal from the sequence control means.

46. An exposure control system according to claim 44, wherein:

(a) the exposure information setting means generates digital value corresponding to the set exposure factors;

(b) the operating means performs digital mathematical operation following the process instruction signal from the sequence control means; and (c) the operating means has an A-D conversion part to take in the analog electric signal obtained as a result of light measuring at the light measuring means as the object brightness information being converted into digital value.

47. An exposure control system according to claim 32, wherein the exposure time information set by the exposure factor setting means is selected in preference to the diaphragm aperture value.

48. An exposure control system according to claim 47, wherein the operating condition detecting means comprises an exposure time preference detection means to detect the fact that the exposure time information set at the exposure information setting means is selected in preference to the diaphragm aperture value.

49. An exposure control system according to claim 48, wherein, when the signal from the exposure time preference detection means is detected by the state judgment means the sequence control means gives the following process instruction to the operating means;

an instruction to perform mathematical operation on the object brightness information obtained as a result of light measuring from the light measuring means, the exposure time information taken in from the exposure factor setting means following the designation instruction signal from the sequence control means, and film sensitivity information to compute information concerning diaphragm aperture value.

50. An exposure control system according to claim 49, wherein the exposure factor setting means further set the information on at least one of the allowable upper limit or lower limit of diaphragm aperture value.

51. An exposure control system according to claim 50, wherein the sequence control means further gives the following process instruction to the operating means;

an instruction to give a signal to the state judgment means that the diaphragm aperture value information obtained as a result of mathematical operation exceeds at least one of the information on the upper limit and the lower limit, when said information exceeds the same.

52. An exposure control system according to claim 51, further comprising an indication means to indicate that the limit value is exceeded, wherein when it is detected that the exposure time information obtained as a result of mathematical operation at the state judgment means following the designation instruction from the sequence control means exceeds at least one of the upper limit and the lower limit, said indication means visually indicates the same in correspondence with the instruction signal from the sequence control means.

53. An exposure control system according to claim 51, wherein the exposure factor setting means generates a digital value which corresponds to the set exposure factor, and the operating means performs digital mathematical operation following the process instruction signal from the sequence control means, further the operating means has an A-D conversion means to take in analog electric signal obtained as a result of light-sensing from the light-sensing means as the object brightness information is converted to digital value.

54. An exposure control system according to claim 32, wherein the operating condition detecting means has;
a diaphragm aperture preference detection means, and
an exposure time preference detection means
to detect which one of the diaphragm aperture value information or the exposure time information being set by the exposure factor setting means is selected preferentially.

55. An exposure control system according to claim 54, wherein the sequence control means has different sequence signal depending on a case when the diaphragm aperture preference detection means output is detected and a case when the exposure time preference detection means output is detected at the state judgment means.

56. An exposure control system according to claim 54, wherein, when neither one of the outputs of the diaphragm aperture preference detection means and of the exposure time preference detection means is detected at the state judgment means, the sequence control means gives to the operating means a process instruction to perform mathematical operation on the object brightness information obtained as a result of light-sensing from the light-sensing means and the film sensitivity information taken in from the exposure factor setting means following the designation instruction signal from the sequence control means to compute a certain combination of the diaphragm aperture value and the exposure time.

57. An exposure control system according to claim 56, wherein the exposure factor setting means further generates an electrical signal which corresponds to program constant, and said certain combination follows the program constant set at the exposure information setting means, further the electric signal corresponding to the program constant is taken into the operating means following the designation instruction signal from the sequence control means.

58. An exposure control system according to claim 44, wherein, when it is judged at the state judgment means that the exposure time information exceeds at least one of the information on the upper limit and the lower limit, the sequence control means gives the operating means a process instruction to perform mathematical operation on the diaphragm aperture value based on the exceeded information out of the information on the upper limit and the lower limit of the exposure time information.

59. An exposure control system according to claim 48, wherein:
the operating condition detecting means comprises a full automatic selection detection means, and
the sequence control means has the operating means perform mathematical operation on the diaphragm aperture value based on said exceeded information.

60. An exposure control system according to claim 51, wherein, when the diaphragm aperture value information is judged to be exceeding at least one of the information on the upper limit and the lower limit at the state judgment means, the sequence control means gives the operating means process instruction to perform mathematical operation on the exposure time based on the exceeded information out of the information on the upper limit and the lower limit of the diaphragm aperture information.

61. An exposure control system according to claim 60, wherein:
the operating condition detecting means comprises a full automatic selection detection means, and
the sequence control means has the operating means perform mathematical operation on the exposure time based on the exceeded information only when the output of said full automatic selection detection means is judged at the state judgment means.

62. An exposure control system according to claim 32, wherein if there is no output of the shutter release detection means when the designation instruction signal to judge the output of shutter release detection means is given by the sequence control means to the state judgment means out of the operating condition detection means, the sequence control means outputs the sequence control signal to return to the state before a certain step.

63. An exposure control system according to claim 32, wherein:
the operating condition detecting means comprises a lock selection detection means, and if there is no output of said lock selection detection means when the designation instruction signal to judge the output of said lock selection detection means is given by the sequence control means to the state judgment means, the sequence control means outputs repeatedly the sequence control signal containing the designation instruction signal to judge the output of the lock selection detection means to the state judgment means.

64. An exposure control system comprising:
(a) a light-measuring means to sense the brightness of an object through a photographing lens and to output an information signal which corresponds to the amount of light received;
(b) an exposure control device comprising at least one of a shutter full-open means, a shutter closing means and a diaphragm aperture control means, and being electrically controlled;
(c) an exposure information setting means, setting exposure information which constitutes a basis for exposure control and contains at least one of diaphragm aperture value, exposure time, film sensitivity and diaphragm aperture value of photographing lens at the time of light-measuring;
(d) an operating condition detecting means comprising at least one of a shutter release detection means and a shutter closing completion detection means;
(e) an operating means which takes in information at least from the light sensing means and the exposure information setting means to process the same;
(f) a driving control means to drive the exposure control device;
(g) a state judgment device to make state judgment of the operating condition detecting means and the operating means;
(h) a sequence control means to give sequence control signal to each of the operating means, a driving control means and the state judgment means; and
(i) a feedback line to feed back the output signal from the state judgment means to the sequence control means for having the sequence control means control its sequence control signal.

65. An exposure control system according to claim 64, wherein the operating means takes in the diaphragm aperture value of the photographing lens at the time of light-measuring from the exposure information setting means following the control signal from the sequence control means to make judgment whether said diaphragm aperture value is larger than a prescribed value or not; and the state judgment means judges the result at the operating means based on the control signal from the sequence control means to feed back the same to the sequence control means through the feedback line; further, when such judgment signal is received that the diaphragm aperture value of photographing lens at the time of light-measuring is larger than the prescribed value, the sequence control means has the operating means compute a value which adds the diaphragm aperture value of photographing lens at the time of light-measuring to the amount of light received as the value corresponding to the object brightness, while when such judgment signal is received that the diaphragm aperture value of photographing lens at the time of light-measuring is smaller than the prescribed value, the sequence control means has the operating means compute as the value equivalent to object brightness the value obtained by adding to the amount of light received the diaphragm aperture value of photographing lens at the time of light-measuring together with such value as obtained by multiplying the difference between said diaphragm aperture value of the lens at the time of lightmeasuring and the predetermined value by a suitable constant.

66. An exposure control system according to claim 65, wherein the exposure information setting means generates a digital value which corresponds to the set exposure information, and the operating means performs digital mathematical operation according to the control signal from the sequence control means, further, the operating means has an A-D conversion means to receive the analogic electric signal obtained as a result of light measuring from the light-measuring means as the amount of light received is converted to digital value.

67. An exposure control system according to claim 65, wherein the sequence control means has the operating means determine the diaphragm aperture value for exposure control based on at least one of the diaphragm aperture value computed by the value equivalent to object brightness and the exposure time information set at the exposure information setting means, or on the diaphragm aperture value set at the exposure information setting means, and the sequence control means has the operating means make judgment whether the diaphragm aperture value of photographing lens at the time of light-measuring has the value greater than the prescribed value or not, and when the diaphragm aperture value of the photographing lens at the time of light-measuring is smaller than said first prescribed value, the value obtained by multiplying the difference between the aperture value of the lens at the time of light-measuring and said first prescribed value by a first constant is made as a first correction amount, further a judgment is made whether the diaphragm aperture value for exposure control previously obtained is greater than the second predetermined value, and when said diaphragm aperture value for the exposure control is smaller than said second predetermined value, the value obtained by multiplying the difference between said diaphragm aperture value and said second prescribed value by the second constant is made as a second correction amount, and the value subtracting the second correction amount from the first correction amount is added to the amount of light received and at the same time, the diaphragm aperture control amount which is the difference between the diaphragm aperture value of the photographing lens at the time of light-measuring and the diaphragm aperture value for exposure control is subtracted, then the value obtained as a result is computed a presumed amount of light received to be obtained at the light-sensing means through the photographing lens when said lens is stopped down to the diaphragm aperture value for exposure control.

68. An exposure control system according to claim 67, wherein the sequence control means gives the diaphragm aperture control signal to the driving control means after at least the output of the shutter release detection means is judged at the state judgment means, and the actual amount of light received from the light-measuring means through the photographing lens which is being stopped down during said period is taken into the operating means, and when said actual amount of light received and the presumed amount of light became same, the judgment signal thereof is judged by the state judgment means to stop the diaphragm aperture control.

69. A photographic exposure control system having at least two different adjustable exposure regulating means which is controlled by a memorized signal provided by storing thereof prior to commencement of an exposure control cycle, comprising:
(a) first manual exposure value setting means for one of said regulating means, the first manual exposure value setting means producing a first output signal corresponding to a set exposure factor;
(b) second manual exposure value setting means for the other regulating means, the second manual exposure value setting means producing a second output signal corresponding to a set exposure factor;
(c) photometric circuit means for detecting levels of a scene brightness;
(d) preference mode setting means for selectively effectuating one of signals from said first and second manual exposure value setting means;
(e) arithmetic operating circuit means being functionally connected with the photometric circuit means and one of said first and second manual exposure value setting means which is preferentially effectuated and computing a proper exposure value which is the same signal as the output signal from the nonpreferential setting means;
(f) third manual exposure value setting means for one of said regulating means, the means being operable for setting and regulating means to the maximum and minimum exposure value thereof and producing a third output signal corresponding to the maximum or minimum value;
(g) fourth manual exposure value setting means for the other regulating means, the means being operable for setting the other regulating means to the maximum and minimum exposure value thereof and producing a fourth output signal corresponding to the maximum or minimum value;
(h) comparison means for comparing the proper exposure value with the setting values from said third and fourth manual exposure value setting means; and (i) memorizing means operatively connected to the arithmetic operating circuit means for memorizing a fifth output signal corresponding to the proper exposure value when the comparing result becomes a predetermined relation and memorizing at least one of the third and fourth output signals respectively corresponding to said maximum and minimum values when the comparing result does not become the predetermined relation.

70. A photographic exposure control system according to claim 69, further comprising a sequence control circuit having a read only memory and for controlling an operation sequence of said system in response to the fetched program from the read only memory.

71. A photographic camera having an exposure regulating means for automatically defining a proper exposure quantity in accordance with a scene brightness, comprising:
(a) photometric circuit means having photoelectric transducing means for producing an electric signal in accordance with the scene brightness and output means for providing the electric signal;
(b) storing means operatively connectable to the output means;
(c) exposure control means operatively connectable to the regulating means based on the stored content of the storing means;
(d) photometric sequence control means operatively connected at least to the storing means for setting the storing means into an initial state cyclically and effectuating a photometric sequence cycle repeatedly in cooperation with the photometric circuit means;
(e) exposure sequence control means operatively connected at least to the photometric sequence control means for executing an exposure sequence cycle through the actuation of the exposure regulating means; and
(f) sequence control means having a program memorizing means, said sequence control means operatively connected to the photometric sequence control means and exposure sequence control means for effectuating the photometric sequence control means and exposure sequence control means in response to the fetched program from the program memorizing means.

72. A photographic camera according to claim 71, further comprising selectively engageable inhibit means responsive to an initial actuation of said exposure sequence control means for preventing the carrying out of the exposure sequence cycle when the initial actuation of said exposure sequence control means does not execute.

73. A photographic camera according to claim 71, wherein the program memorizing means of said sequence control means includes a read only memory which is provided with a control code enabling the sequence cycle.

74. A photographic camera according to claim 71, wherein said sequence control means includes program memory means for storing a plurality of different instruction codes for the two sequence cycles, program process control means for effectuating one of the instruction codes within said program memory means and decoding means for fetching the instruction codes and sequentially providing the photometric sequence control means and exposure sequence control means with a signal in accordance with a fetched instruction code.

75. A photographic camera according to claim 71, further comprising interrupting means for blocking the photometric sequence cycle of said photometric sequence control means upon the completion of one photometric sequence cycle, the interrupting means including a means able to be actuated by an operator for effectuating thereof.

76. A photographic camera having an exposure regulating means for defining an exposure quantity in accordance with a scene brightness comprising:
(a) photometric circuit means having photoelectric transducing means for producing an analog signal in accordance with the scene brightness;
(b) exposure factor setting means for setting an exposure factor other than the exposure factor which has relation to said exposure regulating means;
(c) arithmetic operating circuit means operatively connected with the photometric circuit means and exposure factor setting means for computing a proper exposure value for the exposure regulating means;
(d) comparison means for comparing the proper exposure value with a predetermined value and producing a control signal when the proper exposure value is above or below the predetermined value;
(e) photometric sequence control means operatively connected at least to the photometric circuit means, the arithmetic operating circuit means, and the comparison means for repeatedly effectuating a photometric sequence cycle in response to the control signal; and
(f) sequence control means operatively connected at least to the photometric sequence control means for executing the photometric sequence cycle in the presence of the control signal and proceed the carrying out of an exposure sequence cycle through the actuation of the exposure regulating means in vacancy of the control signal.

77. A photographic camera according to claim 76, further comprising warning means for indicating an over or under exposure value in response to the control signal.

78. A photographic camera according to claim 76, wherein said sequence control means includes program memory means for storing a plurality of different instruction codes for the two sequence cycles, program process control means for effectuating one of the instruction codes within said program memory means, and decoding means for fetching the instruction codes and sequentially providing the photometric sequence control means with a signal in accordance with a fetched instruction code.

79. A photographic camera according to claim 78, wherein said program memory means consists of a read only memory.

80. A photographic camera system having an exposure regulating means and a camera body to be attached with the lens, the camera having a photometric means for producing an output signal in accordance with a scene light-brightness by measuring the light of the scene, passing through the full open aperture of the lens, the system comprises:
(a) first means for producing an aperture signal in accordance with the full open aperture value of the interchangeable lens;
(b) signal forming circuit means operatively connected with the first means for detecting a difference between the full open aperture value and a predetermined aperture value which represents a minimum aperture value to be caused by a light-measuring error through the full open aperture and producing a compensating signal based on the difference;

(c) computing means operatively connected with the signal forming circuit means for computing the aperture signal and the compensating signal in consideration together with the output signal of the scene light and producing a control signal; and (d) exposure control means operatively connected with the computing means and the exposure regulating means for defining the exposure quantity based on the control signal through the exposure regulating means.

81. A photographic camera system according to claim 80, further comprising sequence control means operatively connected at least to the first means, the signal forming means and the computing means for sequentially effectuating each means in a timed relation.

82. A photographic camera system according to claim 81, wherein the sequence control means is further operatively connected to the exposure control means for effectuating the exposure control means to actuate and control the regulating means in the presence of the control signal, the sequence control means having an inhibit means actuable by the operator in effectuating the exposure control means.

83. A photographic camera system according to claim 80, wherein the exposure regulating means is a shutter or a diaphragm and the system further comprises:

(a) 1st output means for producing a 1st setting signal commensurated with the setting value of the shutter or the diaphragm;

(b) 2nd output means for producing a 2nd setting signal commensurated with an exposure factor setting value other than the exposure regulating means; and (c) the computing means further computing 1st and 2nd setting signals and the control signal and producing a 2nd control signal in accordance with the defining value of the diaphragm or the shutter.

84. An automatic diaphragm aperture control device for use in a camera having an objective lens, a diaphragm having a diaphragm aperture, a shutter means and a shutter value setting means, the automatic diaphragm aperture control device comprising:

(a) light measuring means for measuring a light of a scene to be photographed in different ways, one of which is measuring the light passing through the objective lens and the full open aperture of the diaphragm and producing a first output signal indicative of such measurement, and the other of which is measuring the light passing through the objective lens and the stopped down aperture of the diaphragm and producing a second output signal indicative of such measurement;

(b) output means providing a 3rd output signal commensurate with the shutter value set by the setting means;

(c) light measuring means for storing an electrical signal corresponding to a stopped down aperture value for a proper exposure value in consideration of the 1st output signal and 3rd output signal;

(d) computing means operatively connected with the storing means for computing the real aperture value to be stopped down in consideration together with a compensation signal to be deleted from the content of the storing means, the computing means having a compensation signal forming part for generating the compensation signal based on a difference between the full open aperture value and a predetermined aperture value which represents a minimum aperture value to cause a light measuring error through the full open aperture; and (e) aperture control means operatively connected with the light measuring means and the computing means and locking the diaphragm aperture to insure the stopping-down of the aperture when the aperture becomes the real aperture value computed by the computing means.

85. An automatic diaphragm aperture control device according to claim 84, wherein said storing means stores the electrical signal together with the compensation signal for memorizing an aperture value which deletes a light measuring error through the full open aperture of the diaphragm.

86. An automatic diaphragm aperture control device for use in a camera having an objective lens, a diaphragm having a diaphragm aperture, a shutter means and a shutter value setting member, the automatic diaphragm aperture control device comprising:

(a) light measuring means for measuring a light of a scene to be photographed in different steps, one of which is measuring the light repeatedly passing through the objective lens and the full open aperture of said diaphragm and producing a first output signal indicative of such measurement and other of which is measuring the light passing through the objective lens and the stopped down aperture of said diaphragm and producing a 2nd output signal indicative of such measurement;

(b) output means providing a 3rd output signal commensurate with the shutter value set by the setting member;

(c) storing means operatively connected with the light measuring means and the output means for storing an electrical signal corresponding to an aperture value for a proper exposure in consideration of the first output signal and the 3rd output signal after the completion of the first step of the light measurement;

(d) first means for stopping down the diaphragm from the full open aperture prior to the commencement of an exposure control cycle during the second step of light measurement;

(e) means for locking the diaphragm aperture by stopping the actuation of first means;

(f) second means adapted for comparing the first storing signal with the 2nd signal during the second step and producing a control signal when the 1st and 2nd signals have a predetermined relation, the second means having a responsive means operatively connected to the first means for actuating the first means responsive to the control signal; and (g) step control programming means for sequentially designating an instruction to be executed the 1st and 2nd steps sequentially, the step conrol programming means operatively connected to at least the light measuring means for executing the instruction performing a repeated light measuring step and the determining aperture value step during the stopping down of the diaphragm.

87. The control device set forth in claim 86 wherein the light measuring means have a further executing step for compensating a measuring error caused by the full open light measuring step, which is executed prior to the second step, and light measuring means further comprises input means for inputting a correction signal during the 3rd step which is commensurate with the full open aperture value of the objective lens.

88. The control device set forth in claim 86 wherein further comprises, input effectuating means operatively connected to the input means for detecting the full open aperture value being below a predetermined aperture value and effectuate the input means.

89. A photographic exposure system having at least two different adjustable exposure regulating means, comprising:
(a) light measuring means for measuring the light passing through the objective lens and the diaphragm and producing a first output signal indicative of such measurement;
(b) output means providing a second output signal commensurate with the shutter setting value by a setting means;
(c) memorizing means operatively connected at least with light measuring means for storing an electrical signal corresponding to an aperture in consideration of the 1st and 2nd signals;
(d) first means for stopping down the diaphragm from the full open aperture prior to the commencement of an exposure control cycle;
(e) second means for detecting the diaphragm aperture status and producing a 3rd output signal when the diaphragm becomes the minimum value;
(f) third means for locking the diaphragm aperture by the actuation of the 1st means, the 3rd means having a control means operatively connected to the memorizing means for producing a control signal when the diaphragm aperture becomes a given value defined by the memorizing content of memorizing means; and
(g) programming means connected operatively with the 3rd means for actuating the 3rd means forcedly in response to the 3rd output signal of the 2nd means.

90. A photographic camera actuable to automatically and manually define an exposure regulating means such as a shutter and a diaphragm in accordance with the brightness level of a scene, comprising:
(a) output means providing a first output signal commensurate with the manually set value of the exposure regulating means and an exposure factor setting means other than the exposure regulating means;
(b) photometric means providing a 2nd output signal commensurate with the brightness level of the scene;
(c) input means for entering the 1st and 2nd output signals;
(d) memory means for storing at least one of said output signals through the input means; and
(e) processing means for performing a plurality of different routines employing at least one common subroutine, each routine and subroutine having a different sequence of states and for executing a plurality of different instructions being executed during at least one state of at least one routine or subroutine, the processing means being operatively connected to the photometric means and the input means so as to execute the subroutine for effectuating the photometric means and the routine for providing a 3rd output corresponding to at least one of a proper exposure value of the regulating means, said processing means including control means for designating each routine and sequentially each state thereof performed by the processing means, and said control means being operable upon completion of the called common subroutine for decoding the stored return code to designate the actuation of at least one of the regulating means to be performed by processing means.

91. A photographic camera having two different exposure regulating means such as a shutter and a diaphragm and two setting means for setting the regulating means respectively comprising:
(a) light measuring means for measuring a light of a scene to be photographed and providing a 1st output signal in accordance with the light brightness;
(b) exposure factor setting means for setting an exposure factor other than the exposure regulating means and providing a 2nd output signal;
(c) computing circuit means operatively connected with the light measuring means and exposure factor setting means for computing a proper exposure value and providing a 3rd output signal commensurate with the proper exposure value;
(d) first means for forming a setting signal, operatively connected with the two setting means;
(e) detection means operatively connected with the computing circuit means and first means for forming a warning signal when the 3rd signal and the setting signal become a predetermined relation; and
(f) warning means operatively connected with the detection means for warning an improper exposure condition in presence of the warning signal or indicating a proper exposure condition in absence of the warning signal.

92. A photographic camera having two different exposure regulating means such as a shutter and a diaphragm and two setting means for setting the regulating means respectively, each of the setting means having a setting member manually adjustable in a manual setting position and an automatic setting position and exposure control device operatively connected with the two regulating and setting means for regulating the regulating means to be adjusted in a manual mode or automatic mode in which one of the regulating means is regulated automatically in accordance with a scene light brightness, the exposure control device comprising:
(a) program exposure defining circuit means operatively connecting the setting means and for defining a diaphragm and shutter value in a program photographing relation based on the scene-brightness; and
(b) means for effectuating the program exposure defining circuit means and effectuated thereof only when the two setting means is set in the automatic setting positions.

93. A photographic camera according to claim 92, wherein said program exposure defining circuit means further comprises a means having a plurality of program constant values which is able to determine a valid relation between the diaphragm and the shutter values.

94. A photographic camera having an exposure regulating means such as a shutter, an actuating means for the regulating means and an exposure control device operatively connected with the regulating means for defining the exposure value by the regulating means, the camera, comprising:

(a) time setting means actuable by an operator for setting a predetermined self-timing value in a self-timer photographing mode, the means producing a signal in accordance with the setting value;

(b) self timer value-forming means, operatively connected with the time setting means for producing a timing control signal in accordance with the self timing value in a time-compressed relation;

(c) memorizing means for memorizing the time control signal;

(d) pulse input means for producing a timing pulse to read out the memorizing timing control signal and for defining an expanded self time in accordance with the setting value through the time setting means, the pulse input means having:
  (a) a pluse generator,
  (b) release means for initiating the actuation of the exposure regulating means, and
  (c) means for producing the read out pulse after the actuation of the release means; and (e) means for actuating the exposure control device after defining the expanded self time through the pulse input means and preparing for an exposure sequentially.

95. A photographic exposure control system for camera having at least two different adjustable exposure regulating means which is controlled by a memorized signal provided by storing thereof before a commencement of an exposure control cycle, comprising:

(a) first manual exposure value setting means for one of said regulating means, said first manual exposure value setting means producing a first electric output signal corresponding to a set exposure factor;

(b) second manual exposure value setting means for other regulating means, the second manual exposure value setting means producing a second electric output signal corresponding to a set exposure factor;

(c) photometric circuit means for detecting levels of a scene brightness;

(d) preference mode setting means for selectively effectuating one of the electric signals from said first and second manual exposure value setting means;

(e) arithmetic operating circuit means being functionally connected with the photometric circuit means and one of said first and second manual exposure value setting means which is preferentially effectuated and computing a proper exposure value which is the same signal as the output signal from the non-preferential setting means; and (f) memorizing means operatively connected to the arithmetic operating circuit means for memorizing a third electric output signal in accordance with the proper exposure value as the comparing result of said arithmetic operating circuit means.

96. A photographic exposure control system according to claim 95, further comprises sequence control means for carrying out the exposure control cycle of said system through the actuation of the exposure regulating means.

97. A photographic exposure control system according to claim 96, wherein said sequence control means includes program memory means for storing a plurality of different instruction codes for the exposure control cycle, program process control means for effectuating one of the instruction codes within said program memory means and decoding means for fetching the instruction codes and sequentially providing at least the two regulating means with a signal in accordance with a fetched instruction code.

* * * * *

UNITED STATES PATENT OFFICE
CERTIFICATE OF CORRECTION

Patent No. 4,103,307          Dated July 25, 1978

Inventor(s)  Nobuhiko Shinoda, T. Ito, et al

It is certified that error appears in the above-identified patent and that said Letters Patent are hereby corrected as shown below:

In the heading of the patent [75] and the line following [57] should read as follows:

[75] Inventors:  Nobuhiko Shinoda, Tokyo; Tadashi Ito, Yokohama; Soichi Nakamoto, Tokyo; Fumio Ito, Yokohama, all of Japan Change the line following [57]

"97 Claims, 56 Drawing Figures" to read-

"97 Claims, 59 Drawing Figures"

Signed and Sealed this

Seventeenth Day of April 1979

[SEAL]

Attest:

RUTH C. MASON  
*Attesting Officer*

DONALD W. BANNER  
*Commissioner of Patents and Trademarks*